(12) United States Patent
Tsunemi

(10) Patent No.: US 11,530,728 B2
(45) Date of Patent: Dec. 20, 2022

(54) IMPACT ABSORBING MEMBER

(71) Applicant: NIPPON STEEL CORPORATION, Tokyo (JP)

(72) Inventor: Yusuke Tsunemi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 269 days.

(21) Appl. No.: 16/957,666

(22) PCT Filed: Dec. 26, 2017

(86) PCT No.: PCT/JP2017/046611
§ 371 (c)(1),
(2) Date: Jun. 24, 2020

(87) PCT Pub. No.: WO2019/130420
PCT Pub. Date: Jul. 4, 2019

(65) Prior Publication Data
US 2020/0332854 A1    Oct. 22, 2020

(51) Int. Cl.
*B60J 7/00* (2006.01)
*F16F 7/12* (2006.01)
*B62D 21/15* (2006.01)

(52) U.S. Cl.
CPC .............. *F16F 7/12* (2013.01); *B62D 21/15* (2013.01); *F16F 2224/0208* (2013.01); *F16F 2228/005* (2013.01)

(58) Field of Classification Search
CPC ......... Y02E 60/10; Y02D 30/70; A61P 29/00; H04L 5/0007; A61K 2300/00;
(Continued)

(56) References Cited

U.S. PATENT DOCUMENTS

| 5,048,345 A | 9/1991 | Hagiwara et al. |
| 6,986,536 B1 * | 1/2006 | Heatherington ........ B60R 19/03 293/102 |

(Continued)

FOREIGN PATENT DOCUMENTS

| JP | 3-94137 A | 4/1991 |
| JP | 6-206576 A | 7/1994 |

(Continued)

OTHER PUBLICATIONS

Written Opinion of the International Searching Authority for PCT/JP2017/046611 (PCT/ISA/237) dated Mar. 13, 2018.

*Primary Examiner* — Kiran B Patel
(74) *Attorney, Agent, or Firm* — Birch Stewart Kolasch & Birch, LLP

(57) ABSTRACT

The present impact absorbing member includes: a hat-shaped member having a hat top section; and a plate-shaped member facing the hat top section. A deformation guidance section is provided on a wall section of at least one of the hat top section and the plate-shaped member. The deformation guidance section includes: a first high strength section having relatively higher buckling resistance in the wall section; and a pair of low strength sections having relatively lower buckling resistance and arranged on both sides of the first high strength section therebetween in a view along the longitudinal direction. Furthermore, the impact absorbing member includes a pair of second high strength sections disposed on both sides of the deformation guidance section to be adjacent to the pair of low strength sections in a view along the longitudinal direction and having a higher buckling strength relative to the low strength sections.

19 Claims, 26 Drawing Sheets

(58) Field of Classification Search
CPC ......... Y02T 10/12; Y02P 70/50; B29C 66/54;
B65D 2519/00273
See application file for complete search history.

(56) References Cited

U.S. PATENT DOCUMENTS

| | | |
|---|---|---|
| 2003/0075951 A1 | 4/2003 | Hanakawa et al. |
| 2006/0005503 A1* | 1/2006 | Bladow .................... E04C 3/28 |
| | | 156/130.7 |
| 2012/0152675 A1 | 6/2012 | Mori |
| 2014/0070552 A1* | 3/2014 | Shimotsu ................ B60R 19/18 |
| | | 293/102 |
| 2016/0347371 A1 | 12/2016 | Cazes et al. |
| 2017/0036623 A1* | 2/2017 | Suzumori ............... B60R 19/18 |
| 2017/0291644 A1 | 10/2017 | Hasegawa et al. |
| 2018/0345890 A1* | 12/2018 | Kuwabara ............... B60R 19/34 |
| 2020/0354036 A1* | 11/2020 | Cheng ...................... B32B 5/26 |

FOREIGN PATENT DOCUMENTS

| | | |
|---|---|---|
| JP | 11-43069 A | 2/1999 |
| JP | 2003-095132 A | 4/2003 |
| JP | 2013-216185 A | 10/2013 |
| JP | 2017-505232 A | 2/2017 |
| KR | 10-1242146 B1 | 3/2013 |
| WO | WO 2011/030453 A1 | 3/2011 |
| WO | WO 2016/021261 A1 | 2/2016 |
| WO | WO 2016/079272 A1 | 5/2016 |

* cited by examiner

FIG. 2
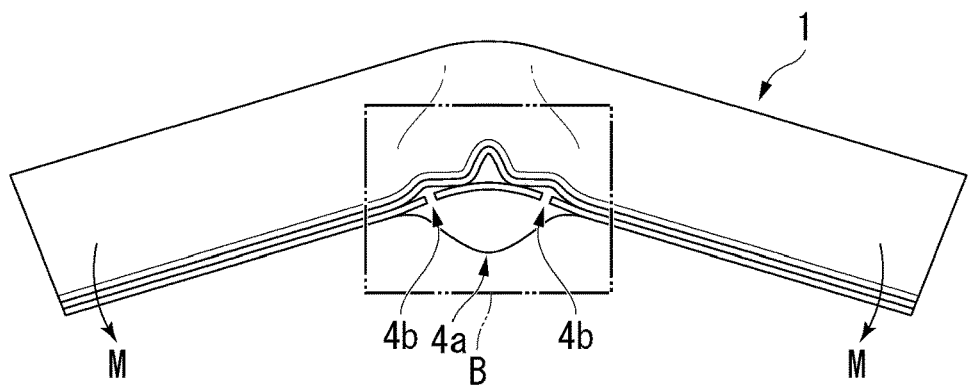
FIG. 3
(a)
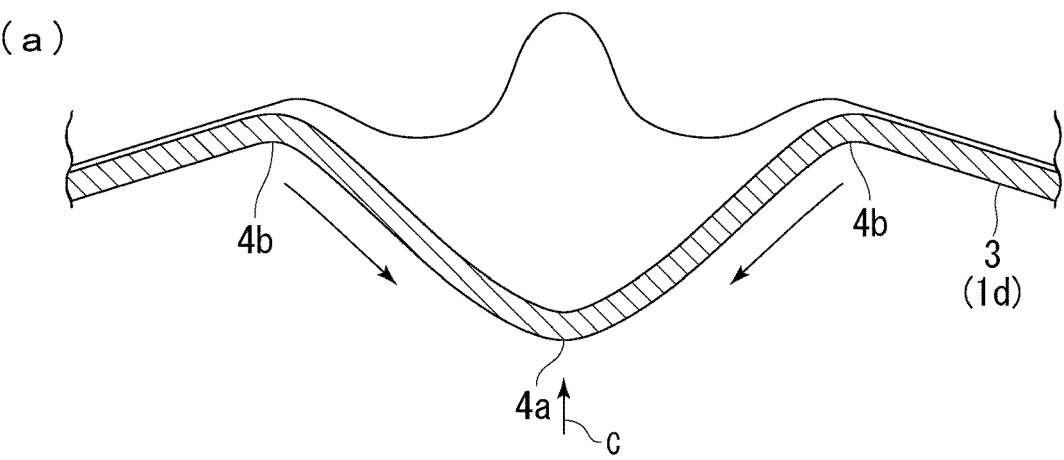
(b)
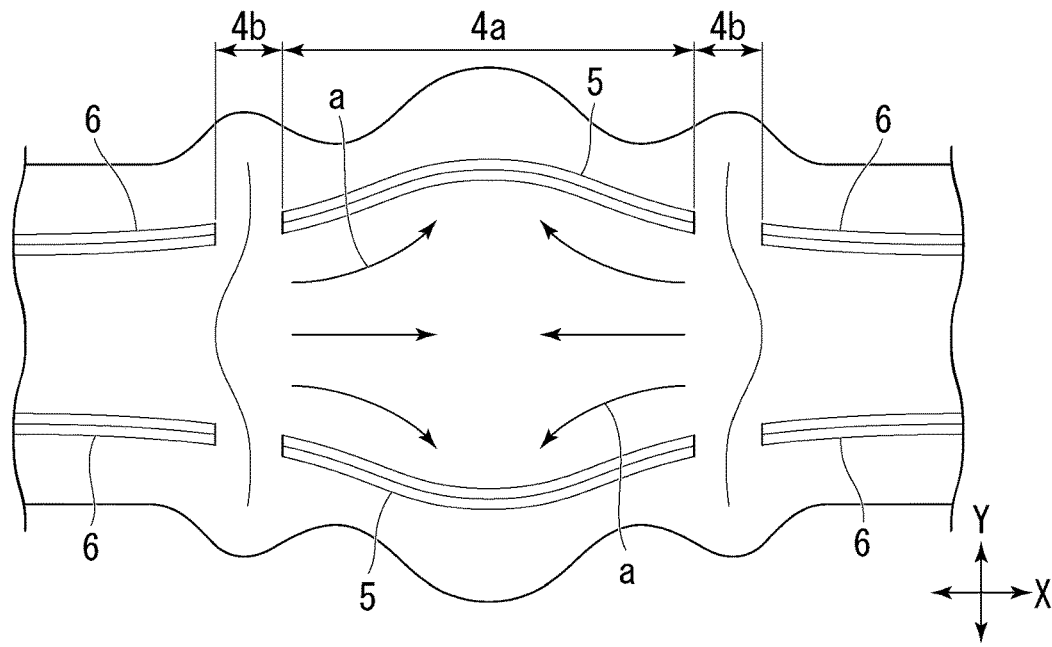

FIG. 4
(a)
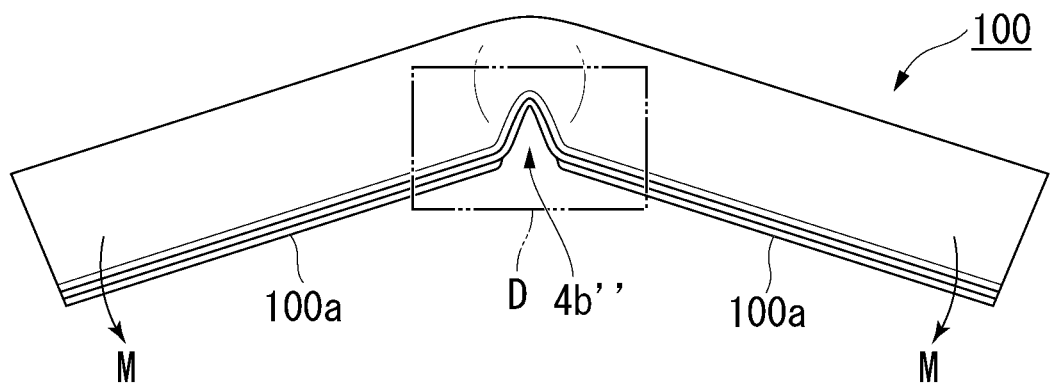
(b)
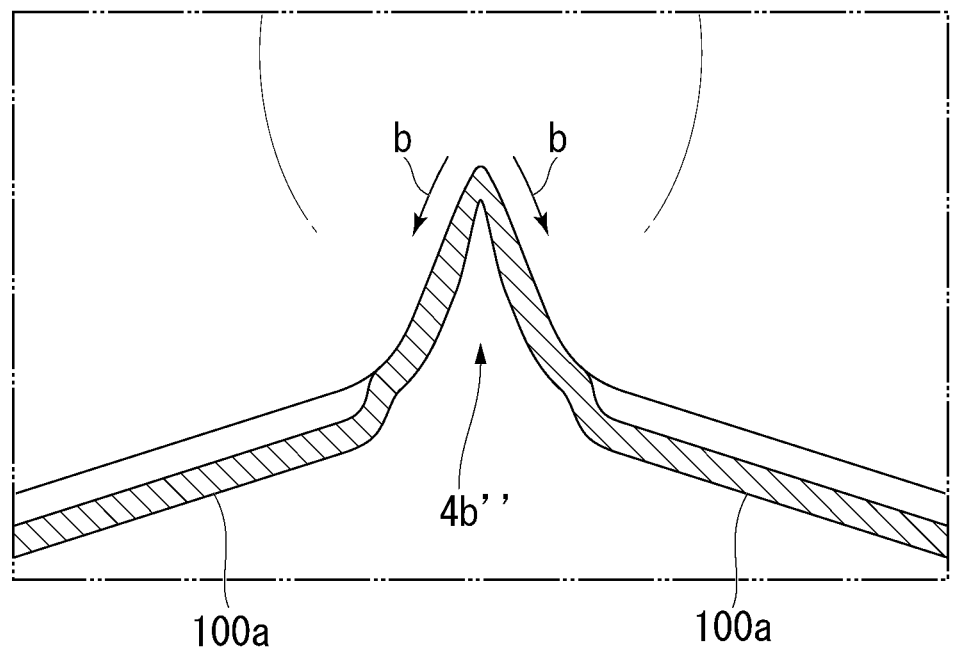

FIG. 10
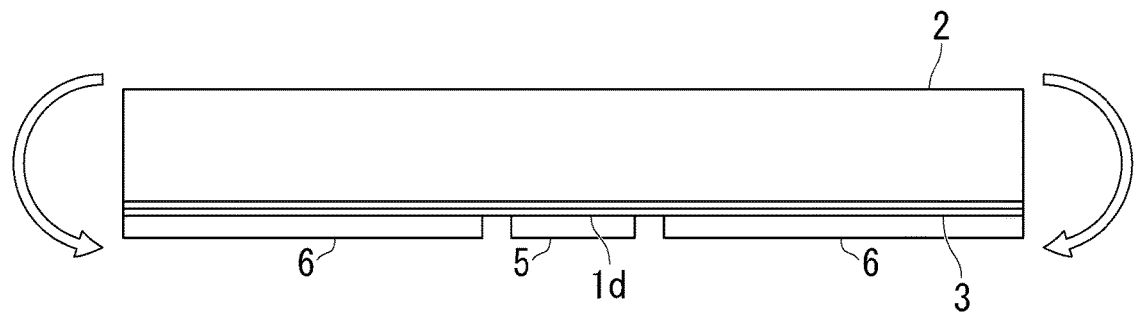
FIG. 11
(a)
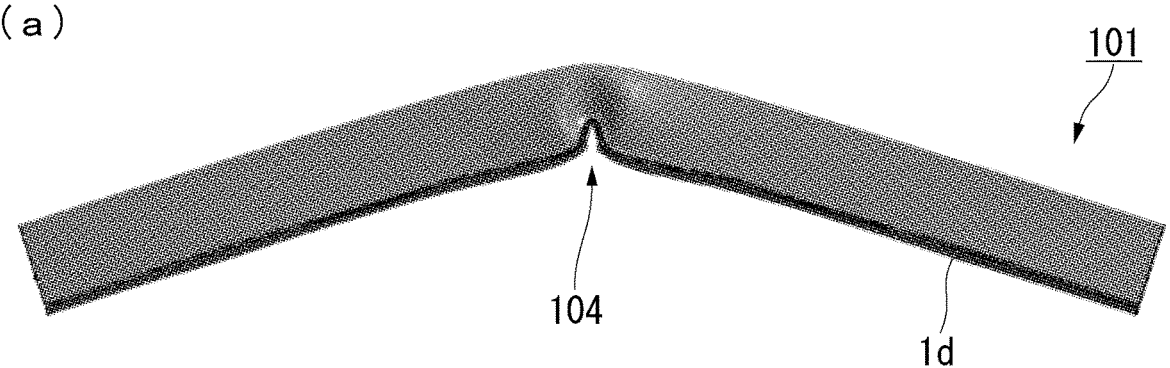
(b)
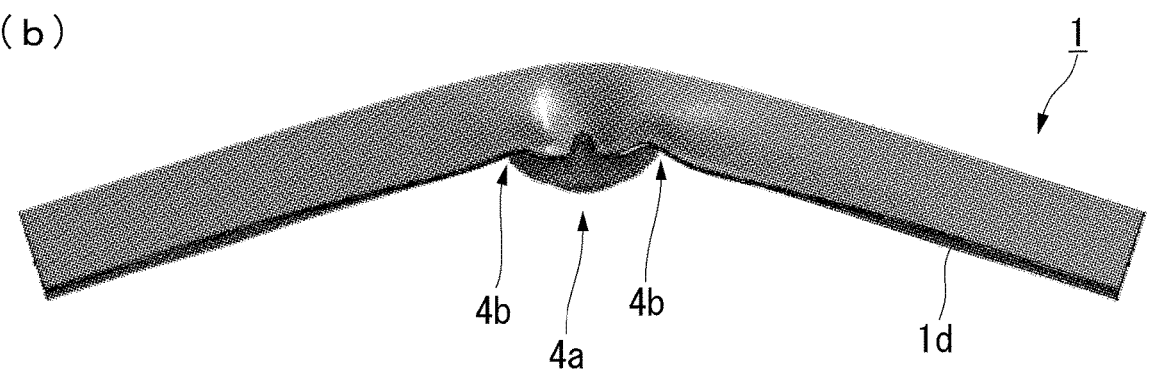

IMPACT ABSORBING MEMBER

TECHNICAL FIELD

The present invention relates to an impact absorbing member, and particularly, an impact absorbing member applicable to a frame member of a vehicle.

BACKGROUND ART

While a reduction in weight of automobiles is required to improve fuel efficiency, an increase in strength of a vehicle body is required to secure collision safety. A press-molded product obtained by press-molding a steel plate is used as a part of a frame member of vehicle bodies. A front side member which is an example of a press-molded product is arranged such that its longitudinal direction is directed from a center portion of the vehicle body toward a front portion of the vehicle body. Furthermore, if a collision load from outside of a vehicle is generated, the load is applied in a longitudinal direction of the front side member. In addition, if a magnitude of the load exceeds a limit value, the front side member buckles and deforms to absorb an impact.

If a thickness of the front side member is reduced to reduce its weight, the front side member is buckled and deformed by a small load and it is not possible to absorb a sufficient impact. On the other hand, if the thickness is increased, a sufficient impact absorbing capacity can be expected, but fuel efficiency cannot be improved due to increased weight. As described above, a reduction in weight and an improvement in collision resistance safety are contradictory characteristics. In addition, there is a demand for a frame member of a vehicle body which has both of these characteristics.

Patent Document 1 discloses an impact absorbing structure. The impact absorbing structure includes an impact absorbing member extending from one end side toward the other end side, a plurality of first deformation control sections formed on the impact absorbing member and configured to control the deformation of the impact absorbing member by adjusting the strength, and a plurality of second deformation control sections formed on the impact absorbing member and configured to control the deformation of the impact absorbing member by adjusting the strength, in which the plurality of first deformation control sections are arranged at predetermined spaces in a longitudinal direction in the impact absorbing member, the plurality of second deformation control sections are arranged at predetermined spaces in the longitudinal direction, at least one of the plurality of first deformation control sections is arranged between a pair of the second deformation control sections, and a first deformation control section of the plurality of first deformation control sections arranged closer to the other end side in the longitudinal direction includes a set configured to have a higher strength.

According to the impact absorbing structure, it is said that, when an impact is imparted in the longitudinal direction, the impact absorbing structure can be deformed in a bellows shape. Furthermore, at the time of the deformation, the impact absorbing member is sequentially deformed from one end side. Thus, it is said that, the compressive deformation of the impact absorbing member in an axial direction thereof is stabilized and the impact absorbing performance is improved.

Patent Document 2 discloses a bead disposition determination method. This bead disposition determination method is a bead disposition determination method for determining the disposition of beads on a strength member which receives a crush load and includes a step of obtaining a generation state of a buckling waveform immediately after a crush load exceeding a peak load point is imparted to the strength member without beads, and a step of disposing a concave type wall surface bead at a position in which the concave portion is generated when the generation state of a buckling waveform obtained in the step has a concave portion in which a wall surface of the strength member is recessed toward the inside of the surface and performing a determination so that a convex type wall surface bead is arranged at a position in which the convex portion is generated when the generation state of a buckling waveform has a convex portion in which the wall surface of the strength member protrudes outside of the surface.

According to this bead disposition determination method, it is said that it is possible to easily determine an optimum bead and its position as compared with the related art.

Patent Document 3 discloses a strength member for an automobile. This strength member for an automobile is a strength member for an automobile which absorbs impact energy at the time of a collision by providing beads on a long strength member having a polygonal cross section, in which: longitudinal beads extending in a longitudinal direction of the strength member are formed on a pair of opposing surfaces of the strength member; and the longitudinal beads are beads in which concave portions and convex portions are continuously, alternately, and repeatedly disposed on a surface. The strength member for an automobile causes buckling at boundary portions between the concave portions and the convex portions at the time of collision, to have cross sections alternately deformed at the boundary portions as boundaries, and cause buckling at a substantially central portion between a boundary portion and a neighboring boundary portion, thereby absorbing impact energy.

According to this strength member for an automobile, it is said that impact energy is absorbed through the buckling of the boundary portions between the concave portions and the convex portions of the longitudinal beads and the substantially central portion between a boundary portion and the neighboring boundary portion.

CITATION LIST

Patent Document

[Patent Document 1]
PCT International Publication No. WO2011/030453A1
[Patent Document 2]
Japanese Unexamined Patent Application, First Publication No. H3-94137
[Patent Document 3]
Japanese Unexamined Patent Application, First Publication No. H11-43069

SUMMARY OF INVENTION

Technical Problem

When impact energy is absorbed through the deformation of a member, it is necessary to appropriately deform the member in accordance with an application place thereof.

For example, although a member is deformed into a bellows to absorb impact energy in the case of Patent Document 1 described above, a member may not be crushed as expected in accordance with how impact energy is applied in some cases.

Also, although the optimal bead disposition is determined on the assumption that a predetermined impact energy is applied to a member in Patent Document 2, in this case as well, a member may not be crushed as expected in accordance with how impact energy is applied in some cases.

Furthermore, in Patent Document 3, longitudinal beads are deformed in a bellows manner by alternately being deformed at a boundary between a concave portion and a convex portion thereof. In this respect, there is the same problem as in Patent Document 1 described above.

The present invention was made in view of the above circumstances, and has an object of providing an impact absorbing member having an excellent absorbing capacity for impact energy.

In order to solve the above problems and achieve the related object, the present invention adopts the following aspects.

(1) An aspect of the present invention is an impact absorbing member which includes: a hat-shaped member which has a flange section and whose cross-sectional shape perpendicular to a longitudinal direction includes a hat top section; and a plate-shaped member joined to the flange section and facing the hat top section, wherein a deformation guidance section is provided on a wall section of at least one of the hat top section and the plate-shaped member; the deformation guidance section has a first high strength section having a relatively higher buckling resistance in the wall section and a pair of low strength sections having a relatively lower buckling resistance and arranged on both sides of the first high strength section therebetween in a view along the longitudinal direction; and a pair of second high strength sections which are arranged on both sides of the deformation guidance section to be adjacent to the pair of low strength sections and have a relatively higher buckling strength than the low strength sections in a view along the longitudinal direction.

(2) In the impact absorbing member set forth in (1), when a length of the first high strength section in the longitudinal direction is L1 (mm) and a distance between the hat top section and the plate-shaped member is H (mm), 0.8×H≤L1≤2.0×H may be satisfied.

In the impact absorbing member set forth in (1) or (2), when a length of the pair of low strength sections in the longitudinal direction is C (mm) and a distance between the hat top section and the plate-shaped member is H (mm), C≤0.6×H may be satisfied.

(4) In the impact absorbing member set forth in any one of (1) to (3), the first high strength section may have a first bead section provided in the longitudinal direction on the wall section.

(5) In the impact absorbing member set forth in (4), the following constitution may be adopted: the first high strength section has a pair of the first bead sections extending in the longitudinal direction and being parallel to each other; and a region of the pair of low strength sections adjacent to one end of at least one of the pair of the first bead sections is flat and a region of the pair of low strength sections adjacent to the other end of the at least one of the pair of the first bead sections is flat.

(6) In the impact absorbing member set forth in (5), regions of the pair of low strength sections adjacent to both ends of the pair of the first bead sections may be flat.

(7) In the impact absorbing member set forth in any one of (4) to (6), the following constitution may be adopted: the pair of second high strength sections have a pair of second bead sections which are provided on the wall section in the longitudinal direction and have one ends adjacent to the pair of low strength sections and the other ends extending to end portions of the impact absorbing member.

(8) In the impact absorbing member set forth in any one of (4) to (7), the following constitution may be adopted: when a height of the first bead section from a wall surface of the wall section on which the first bead section is provided is d (mm), a width of the first bead section is w (mm), and a plate thickness of the wall section on which the first bead section is provided is t (mm), at least one of d/t≥2.0 and w≥10 is satisfied.

(9) In the impact absorbing member set forth in any one of (1) to (8), the first high strength section may be a bulging portion which bulges outward in a plate thickness direction of the wall section on which the deformation guidance section is provided, when a load is applied in the longitudinal direction from an outer side.

(10) In the impact absorbing member set forth in any one of (1) to (9), the deformation guidance section and the pair of second high strength sections may be provided in each of the hat top section and the plate-shaped member.

(11) In the impact absorbing member set forth in (10), the following constitution may be adopted: in a view along the longitudinal direction, when a separation distance in the longitudinal direction between a central position of the first high strength section provided in the deformation guidance section of one of the hat top section and the plate-shaped member and a central position of the low strength section close to the first high strength section provided in the one deformation guidance section of the pair of low strength sections provided in the deformation guidance section of the other of the hat top section and the plate-shaped member is L2 (mm), and a distance between the hat top section and the plate-shaped member is H (mm), L2≤6.0×H is satisfied.

(12) In the impact absorbing member set forth in (10) or (11), the following constitution may be adopted: in each of the deformation guidance sections, when a separation distance between intermediate positions of the pair of low strength sections in a view along the longitudinal direction is L3 (mm) and a distance between the hat top section and the plate-shaped member is H (mm), 0.8×H≤L3≤2.0×H is satisfied.

(13) In the impact absorbing member set forth in any one of (10) or (12), in each of the deformation guidance sections, when a length of each of the pair of low strength sections in the longitudinal direction is C (mm) and a distance between the hat top section and the plate-shaped member is H (mm), C≤0.6×H may be satisfied.

Advantageous Effects of Invention

According to each of the above aspects of the present invention, it is possible to provide an impact absorbing member having an excellent impact energy absorbing capacity.

BRIEF DESCRIPTION OF DRAWINGS

FIG. 2 is a side view showing a state in which the impact absorbing member receives impact energy and is plastically deformed.

FIG. 3 is a diagram showing a portion B of the impact absorbing member in FIG. 2, wherein (a) of FIG. 3 is a vertical cross-sectional view at a central position thereof in a width direction, and (b) of FIG. 3 is a bottom view when (a) of FIG. 3 is viewed from an arrow C.

FIG. 4 is a diagram showing a state in which a conventional impact absorbing member receives impact energy and is plastically deformed, wherein (a) of FIG. 4 is a side view, and (b) of FIG. 4 is a vertical cross-sectional view at a central position thereof in a width direction of a portion D of (a) of FIG. 4.

FIG. 10 is a diagram showing an invention example in the first example and is a side view corresponding to that of (a) of FIG. 1.

FIG. 11 is a side view showing a state in which an impact absorbing member receives impact energy and is plastically deformed in the first example, wherein (a) of FIG. 11 corresponds to the comparative example shown in FIG. 8, and (b) of FIG. 11 corresponds to the invention example shown in FIG. 10.

DESCRIPTION OF EMBODIMENTS

Embodiments of an impact absorbing member according to the present invention will be described below with reference to the drawings.

First Embodiment

Figure 1:
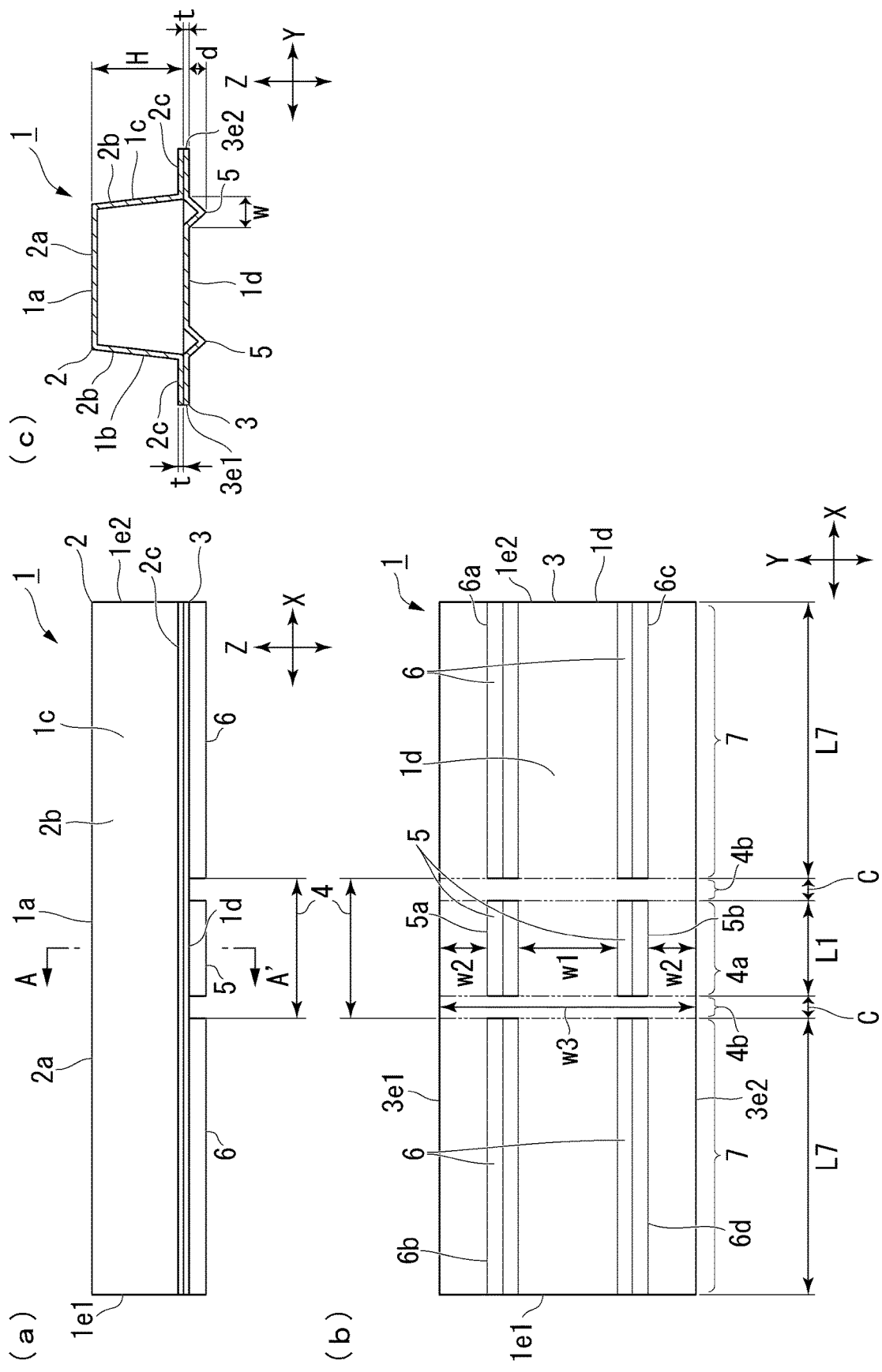
FIG. 1 is a diagram showing an impact absorbing member according to a first embodiment of the present invention, wherein (a) of FIG. 1 is a side view, (b) of FIG. 1 is a bottom view, and (c) of FIG. 1 is a cross-sectional view taken along a line A-A' of (a) of FIG. 1.

As shown in (a) to (c) of FIG. 1, an impact absorbing member 1 of the present embodiment has a hollow cross-sectional structure surrounded by four wall sections 1a to 1d. To be more specific, the impact absorbing member 1 has a tubular shape formed by the four wall sections 1a to 1d and being long in one direction. The one direction mentioned herein indicates a longitudinal direction of the impact absorbing member 1, and is a leftward/rightward direction on the paper (an X direction) as shown in (a) and (b) of FIG. 1 and a vertical direction on the paper as shown in (c) of FIG. 1.

One end side of each of the wall sections 1a to 1d in a longitudinal direction serves as a one end portion 1e1 which receives an impact load from outside. Although the one end portion 1e1 is on the left side of the paper shown in (a) of FIG. 1 in the present embodiment, the impact absorbing member 1 has a leftward/rightward symmetrical shape at a center of the impact absorbing member 1 in the longitudinal direction. Thus, the other end portion 1e2 on the right side of the paper may be configured to receive an impact load.

The impact absorbing member 1 in the present embodiment can be used as, for example, a front side member or a rear side member which is a frame member of an automobile. For example, when the impact absorbing member 1 is used as a front side member, one end side (the one end portion 1e1) of the impact absorbing member 1 in the longitudinal direction is arranged to face a front direction of the vehicle body and the other end side (the other end portion 1e2) of the impact absorbing member 1 in the longitudinal direction is arranged to face a cabin side.

As shown in (a) to (c) of FIG. 1, the impact absorbing member 1 includes two members, i.e., a molded body (a hat-shaped member) 2 formed by press-molding a metal plate and a plate-shaped member 3 joined to the molded body 2. In FIG. 1, the X direction indicates the longitudinal direction of the impact absorbing member 1, a Y direction indicates a width direction of the impact absorbing member 1, and a Z direction indicates a height direction of the impact absorbing member 1 which is a direction orthogonal to the two directions of the X direction and the Y direction.

The molded body 2 includes a web section 2a, a pair of vertical wall sections 2b connected to both side edges of the web section 2a in a width direction, and a pair of flange sections 2c connected to the vertical wall sections 2b. The molded body 2 has a hat-shaped cross-sectional shape in the cross section perpendicular to the longitudinal direction. The web section 2a has a rectangular shape in which the web section 2a is long in one direction. Each of the pair of vertical wall sections 2b also has a rectangular shape in which the vertical wall section 2b is long in one direction. Furthermore, as shown in (c) of FIG. 1, each of the pair of vertical wall sections 2b is integrally connected to the web section 2a at an angle slightly wider than a right angle. Thus, the pair of vertical wall sections 2b forms a trapezoidal shape together with the web section 2a in the cross sectional view perpendicular to the longitudinal direction. In addition, each of the flange sections 2c is integrally formed at an end edge of each of the pair of vertical wall sections 2b. The flange sections 2c each have a rectangular shape in which the flange section 2c is long in one direction and are parallel to each other.

The impact absorbing member 1 with a hollow cross-sectional structure is constituted by joining the plate-shaped member 3 to each of the flange sections 2c of the molded body 2. Furthermore, the web section 2a and the pair of vertical wall sections 2b of the molded body 2, and the plate-shaped member 3 serve as the four wall sections 1a to 1d forming the impact absorbing member 1. As a method for joining each of the flange sections 2c of the molded body 2 to the plate-shaped member 3, spot welding, linear welding, adhesion, mechanical joining units such as screws and bolts and nuts, and the like can be adopted.

As a material of the molded body 2 and the plate-shaped member 3, a metal plate is preferable, and a thin steel plate made of high-strength steel, an aluminum plate, an aluminum alloy plate, or the like is more preferable. In the case of a thin steel plate, an aluminum-plated steel plate or a zinc-plated steel plate may be used.

Among the wall sections 1a to 1d forming the impact absorbing member 1, only the wall section 1d formed of the plate-shaped member 3 includes a deformation guidance section 4. That is to say, the other wall sections 1a to 1c have a flat shape which do not have the deformation guidance section 4. The flat shape mentioned herein refers to, for example, a surface shape in which an average curvature of at least an outer surface is 0.0001 or less. Furthermore, it is desirable that a region with a flat shape correspond to an unprocessed portion which does not have a bead section or the like. Although the above rule regarding the flat shape is an example, the same may be applied to other embodiments and modified examples. The deformation guidance section 4 includes a high strength section 4a (also referred to as a "first high strength section") having a relatively higher buckling resistance and a pair of low strength sections 4b having a relatively lower buckling resistance than the high strength section 4a. The high strength section 4a and the pair of low strength sections 4b are arranged to be connected to each other without a gap therebetween in a line along the longitudinal direction of the wall section 1d. The high strength section 4a is arranged to be disposed between the pair of low strength sections 4b in the longitudinal direction of the wall section 1d. In the wall section 1d, the deformation guidance section 4 is arranged to be disposed between a pair of high strength sections 7 (also referred to as "second high strength sections") in the longitudinal direction of the wall section 1d. The low strength sections 4b is arranged to be disposed between the high strength section 4a and the high strength sections 7. Thus, in the entire wall section 1d, each of the low strength sections 4b is a region having a relatively lower buckling resistance.

In the example of FIG. 1, the high strength section 4a occupies a region of a substantially central portion of the wall section 1d in the longitudinal direction. Furthermore, the low strength sections 4b occupy regions around both sides of the high strength section 4a. Two bead sections 5 are provided on the high strength section 4a while the low strength sections 4b do not have the bead sections 5 and are flat.

The longitudinal direction of each of the bead sections 5 is parallel to the longitudinal direction of the wall section 1d. Furthermore, as shown in (c) of FIG. 1, each of the bead sections 5 protrudes from the wall section 1d toward the outside of the impact absorbing member 1. To be more specific, when viewed in a cross section perpendicular to the longitudinal direction, that is, when viewed in the cross section shown in (c) of FIG. 1, each of the bead sections 5 has a shape in which a triangular corner portion protrudes outward, and can be formed, for example, through press-molding. The shape of each of the bead sections 5 in the same cross section is not limited to only a triangular shape and may be, for example, other shapes such as a semicircular shape and a semi-elliptic shape.

Each of the low strength sections 4b is a region with a flat shape in which the bead sections 5 are not provided. Furthermore, the high strength section 4a is a region with a cross-sectional shape which has a pair of convex portions formed by each of the bead sections 5 and a region arranged between the pair of low strength sections 4b. Focusing on a length of the plate-shaped member 3 along a surface from one side edge 3e1 to the other side edge 3e2 in the Y direction shown in (b) and (c) of FIG. 1, by providing each of the bead sections 5, a length of the high strength section 4a which functions substantially effectively along the surface (hereinafter referred to as an "effective width") is longer than the effective width of the low strength sections 4b. That is to say, straight line dimensions of the low strength sections 4b and the high strength section 4a from a side edge 3e1 to a side edge 3e2 in the Y direction are the same when facing them, but the effective width of the high strength section 4a is increased by an extent that the high strength section 4a includes the pair of bead sections 5. To be more specific about this point, as shown in (b) of FIG. 1, the effective width of each of the low strength sections 4b is a straight line length shown as a side w3. On the other hand, the effective width of the high strength section 4a is longer than that in the case of a straight line shape because the bead sections 5 at two locations are undulating as shown in (c) of FIG. 1.

In this way, the buckling resistance of the high strength section 4a becomes relatively higher than the buckling resistance of each of the low strength sections 4b by making the effective width of the high strength section 4a wider than the effective width of the low strength sections 4b.

The buckling resistance of each of the high strength section 4a and the low strength sections 4b is represented by a sum of proof stresses F of sides of member compression side obtained using the following expressions (1) and (2). The sides on the member compression side refer to portions in which the bead sections 5 are not provided in the high strength section 4a and the low strength sections 4b in the cross-sectional shapes. For example, when viewed in a direction in the Y direction shown in (b) of FIG. 1, in the case of the high strength section 4a, the sides on the member compression side are a total of three sides, i.e., a cross-sectional portion of the side w1 between two bead sections 5, and two cross-sectional portions of the side w2 from the bead sections 5 to an end portion of the wall section 1d in the width direction. Furthermore, the side on the member compression side in the case of each of the low strength sections 4b is a cross-sectional portion of the side w3 in the width direction of the wall section 1d.

$$F = Ce \times t \times \sigma_y \quad \text{Expression (1)}$$

$$Ce = 1.9 \times t \times (E/\sigma_y)^{0.5} \times \{1 - 0.415 \times t1/w_e \times (E/\sigma_y)^{0.5}\} \quad \text{Expression (2)}$$

In Expressions (1) and (2), F is proof stress of each side, Ce is an effective width of each side represented by Expression (2), t1 is a plate thickness of each side, $\sigma_y$ is yield stress of a material forming each side, E is a Young's modulus of a material forming each side, and $w_e$ is a plate width of each side. Among the above parameters, the plate thicknesses t1 are different on each side. To be specific, when the plate thickness of the plate-shaped member 3 and the plate thickness of each of the flange sections 2c are assumed to have the same plate thickness t, in (b) and (c) of FIG. 1, t1=t is satisfied on the side w1 and t1=2×t is satisfied on the side w2.

Also, in the example of FIG. 1, bead sections 6 which are different from the bead sections 5 extend to both ends of the wall section 1d in the longitudinal direction. In other words, in the example of FIG. 1, the bead sections 6 are present in the high strength sections 7 which are regions of the wall section 1d in which the deformation guidance section 4 is excluded. To be more specific, the pair of bead sections 6 are provided on the high strength sections 7 around both ends of the deformation guidance section 4 in the longitudinal direction of the impact absorbing member 1. Moreover, a bead section 6a (6) on one of the high strength sections 7 is aligned with a bead section 5a (5) of the high strength section 4a and a bead section 6b (6) on the other of the high strength sections 7 on the same straight line. Similarly, the bead section 6c (6) on one of the high strength sections 7 is also aligned with a bead sections 5b (5) of the high strength section 4a and a bead section 6d (6) on the other of the high strength sections 7 on the same straight line. The form shown in FIG. 1 is an example. Thus, the bead sections 5a, 6a, and 6b may not be on the same straight line. Similarly, the bead sections 5b, 6c, and 6d may not be on the same straight line.

In this way, since the bead sections 6 having an enhanced buckling resistance are also present in regions (the high strength sections 7) in which the deformation guidance section 4 is excluded, the low strength sections 4b in the impact absorbing member 1 are limited to two regions in which the bead sections 5 and 6 are not provided in the longitudinal direction of the wall section 1d. Although the bead sections 6 are provided in the high strength sections 7 to limit regions of the low strength sections 4b in the present embodiment, the present invention is not limited only to this form. In addition, regions adjacent to the low strength sections 4b may have a relatively higher yield stress so that each of the low strength sections 4b is formed. For example, instead of providing the bead sections 6, the yield stress of the regions may be increased, for example, by partially increasing a plate thickness of the regions adjacent to the low strength sections 4b, thereby forming the high strength sections 7 and limiting the regions of the low strength sections 4b.

Dimensions of the high strength section 4a and the low strength sections 4b will be described below.

A length L1 (mm) of the high strength section 4a in the longitudinal direction of the wall section 1d is determined in accordance with a length of the bead sections 5 in a longitudinal direction. That is to say, it is desirable that the length L1 (mm) of the high strength section 4a be 0.8 times or more and 2.0 times or less of a space H (mm) between the wall section 1d having the deformation guidance section 4 provided thereon and another wall section 1a arranged to face the wall section 1d. Hereinafter, the space H (mm) between the wall section 1d and the wall section 1a is set to be a distance between an inner surface (an upper surface) of a flat portion of the wall section 1d and an outer surface (an upper surface) of a flat portion of the wall section 1a. For example, the space H (mm) is the same as a so-called hat height and is a height dimension from a lower surface of the flange section 2c to a flat region of the upper surface of the web section 2a which is a hat top section as shown in (c) of FIG. 1.

As described above, since it is reliably separate the pair of low strength sections 4b by defining the length L (mm) of the high strength section 4a, bending deformations occurring in the low strength sections 4b do not interfere with each other and it is possible to disperse bending deformation places.

In other words, if the length L1 (mm) of the high strength section 4a is 0.8 times or more of the space H (mm) between the wall sections 1d and 1a, the low strength sections 4b do not come to be too close to each other. Thus, a deformation region at the time of folding deformation can be expanded and an energy absorbing capacity at the time of impact load application can be further enhanced. That is to say, when L1≥0.8×H is satisfied, it is possible to prevent the bending deformation of one of the pair of low strength sections 4b and the bending deformation of the other thereof from being merged into substantial one-part bending deformation.

Also, if the length L1 (mm) of the high strength section 4a is 2.0 times or less of the space H (mm) between the wall sections 1*d* and 1*a*, bending deformation can be occurred in the deformation guidance section 4. That is to say, when L1≤2.0×H is satisfied, bending deformation can occur not only in one of the pair of low strength sections 4*b* but also in both of the pair of low strength sections 4*b*.

A length C (mm) of each of the low strength sections 4*b* in the longitudinal direction of the wall section 1*d* is determined in accordance with distances between the high strength section 4*a* (the first high strength section) and the high strength sections 7 (the second high strength sections). In the example of FIG. 1, the length C (mm) is determined in accordance with the spaces between the bead sections 5 and the bead section 6. It is desirable that the length C (mm) of each of the low strength sections 4*b* in the longitudinal direction of the wall section 1*d* be 0.6 times or less the space H (mm) described above.

When C≤0.6×H is satisfied, it is possible to limit a place in which bending deformation occurs to a narrow region. Thus, it is possible to further improve a function of dispersing a bending deformation place using the high strength section 4*a*. Furthermore, although the length C (mm) should be 0<C (mm), a lower limit of the length C (mm) may be 0.1×H (mm) or 0.2×H (mm).

Also, in order to cause the bending of the low strength sections 4*b*, it is desirable that a dimension L7 (mm) of each of the high strength sections 7 in the longitudinal direction (the X direction) be 0.8 times or more the space H (mm) described above. It is desirable that an upper limit of L7 be 2.0 times, 3.0 times, or 4.0 times the space H (mm). Alternatively, portions from the low strength sections 4*b* to end portions of the members may be the high strength sections 7.

It is desirable that a height d (mm) of the bead sections 5 shown in (c) of FIG. 1 be 2.0 times a thickness t (mm) of the wall section 1*d*. As described in (c) of FIG. 1, the height d (mm) is a maximum protruding height from a flat surface of the wall section 1*d*.

Also, it is desirable that a width w of the bead sections 5 be 10 mm or more. The regulation regarding a shape dimension of the bead sections 5 is applicable not only when the cross-sectional shape is a triangular shape but also when the cross-sectional shape is another cross-sectional shape such as a semi-circular shape or a semi-elliptical shape.

When at least one condition of d/t≥2.0 and w≥10 is satisfied, it is possible to effectively exhibit a buckling resistance difference between the high strength section 4*a* and the low strength sections 4*b*. As a result, it is possible to realize bending deformation at each position of each of the low strength sections 4*b* while maintaining a state in which the pair of low strength sections 4*b* is separated using the high strength section 4*a*. Although this effect can be obtained if one of d/t≥2.0 and w≥10 is satisfied, a more reliable effect can be expected if both of d/t≥2.0 and w≥10 are satisfied.

A cross-sectional shape dimension of the bead sections 6 provided on the high strength sections 7 may be the same as or different from a cross-sectional shape dimension of the bead sections 5 in the high strength section 4*a* as necessary. In the description of the present embodiment, a case in which the bead sections 5 and 6 have the same cross-sectional shape and are arranged side by side on the same straight line is described.

When an impact load in the longitudinal direction is applied to the one end portion 1*e*1 of the impact absorbing member 1 shown in (a) of FIG. 1, and as a result, bending deformation in which both ends of the impact absorbing member 1 get closer to a lower of the paper than a central portion thereof occurs, this bending deformation is mainly performed in the deformation guidance section 4 and the energy of the impact load is absorbed.

Absorption of impact energy by bending deformation of the impact absorbing member 1 at this time will be described below with reference to FIGS. 2 to 4.

As shown in FIG. 2, when a bending moment M due to the application of an impact load is applied to the impact absorbing member 1, the two low strength sections 4*b* separated from each other through the high strength section 4*a* disposed therebetween are bent to absorb the bending moment M. That is to say, when viewed macroscopically, the bending moment M is regarded to be absorbed at one place of the impact absorbing member 1 in the longitudinal direction. However, when viewed microscopically, the bending moment M is handled to be distributed to the two low strength sections 4*b*. Therefore, since the bending due to the application of the bending moment M can be dispersed at two places, the capacity for absorbing impact energy can be greatly increased.

Also, in addition to the mechanism described above, an increase in amount of impact energy to be absorbed due to the effect of the following mechanism can also be expected.

In other words, when the bending moment M due to the application of an impact load is applied to the impact absorbing member 1, each of the low strength sections 4*b* is deformed to be recessed inward. On the other hand, the high strength section 4*a* is deformed to expand outward. To be more specific, as shown in (a) of FIG. 3, as a result of bending deformation in each of the low strength sections 4*b*, the longitudinal direction dimension of the high strength section 4*a* of the plate-shaped member 3 (the wall section 1*d*) becomes shorter. Thus, the high strength section 4*a* is compressed toward a center of the high strength section 4*a* in the longitudinal direction. The high strength section 4*a* in the compressed state is deformed to expand toward the outside of the member because there is no escape space for the material.

When facing the high strength section 4*a* at this time as shown in (b) of FIG. 3, flows of the material indicated by arrows face with each other at a central position of the high strength section 4*a* in the longitudinal direction. As a result, although the material at the central portion of the high strength section 4*a* in the longitudinal direction attempts to escape in the width direction (an upward/downward direction of the paper of (b) of FIG. 3) of the high strength section 4*a* at this time, movement destinations thereof are blocked by the pair of bead sections 5 and the high strength section 4*a* is firmly joined to the molded body 2 through welding or the like. Thus, excessive deformation of the high strength section 4*a* in the width direction (the Y direction of (b) of FIG. 3) is suppressed.

In this way, when the high strength section 4*a* is subjected to compression and is deformed to form a bulging portion, the high strength section 4*a* functions as a tension rod. Thus, it is possible to spread the deformation over a wide range and effectively absorb impact energy. In order to form such a bulging portion, it is desirable that a flat region (for example, a flat plate portion) before being deformed be surrounded by a pair of bead sections and a pair of low strength sections. According to this constitution, after the deformation, the flat region easily forms the bulging portion through the above-described process.

On the other hand, a conventional structure in which the high strength section 4*a* and the pair of low strength sections 4*b* separated by the high strength section 4*a* are not provided cannot absorb sufficient impact energy. This will be explained using a member 100 of (a) and (b) of FIG. 4 as an example. The member 100 includes two sets of pairs of bead sections 100*a* formed to have spaces therebetween in a longitudinal direction. That is to say, when a flat portion is provided between the two sets of bead sections 100*a* as the space, only one low strength section 4*b*" is formed.

As shown in (a) of FIG. 4, when a bending moment M as in the case of that of FIG. 2 is applied to the member 100, a central portion of the low strength section 4*b*" in the longitudinal direction is bent to be convex toward an inside of the member. At this time, of course, not only the bending due to the bending moment M cannot be formed at a plurality of places in a dispersed manner, but also it is also impossible to form a bulging portion. In addition, as shown in (b) of FIG. 4, a pulling force indicated by arrows b is applied to an inner wall surface of a bent portion. As a result, a cross-sectional area at a position of the low strength section 4*b*" becomes smaller and weaker in response to bending. In addition, the deformation is concentrated on the single low strength section 4*b*". Therefore, the low strength section 4*b*" cannot absorb sufficient impact energy.

As described above, in the case of the member 100 according to the conventional structure, the bent portion of the low strength section 4*b*" is deformed inward and is thus stretched so that sufficient impact energy cannot be absorbed.

On the other hand, in the impact absorbing member 1 according to the present embodiment, by providing the high strength section 4*a* between the pair of low strength sections 4*b*, the bent portion can be deformed to bulge outward and can absorb energy through compression. Thus, it is possible to exhibit sufficient yield strength.

In order to understand the effect of the impact absorbing member 1 according to the present embodiment, it is necessary to correctly understand a difference between meandering deformation and bellows deformation.

In other words, as a deformation form of the impact absorbing member, in addition to meandering deformation which causes the bending deformation shown in FIG. 2 at a plurality of places, there is a mechanism for absorbing impact energy through bellows deformation as described in Patent Document 1 and the like described above. The bellows deformation refers to a deformation in which, although the out-of-plane deformation occurs on all of the side surfaces forming the member, a center line of the member in the longitudinal direction is hardly bent. On the other hand, the meandering deformation refers to a deformation in which the out-of-plane deformation mainly occurs on one of the side surfaces forming the member and a center line of the member in the longitudinal direction is also bent.

When the two deformation forms described above are compared, if an impact force is input from the ideal direction, it can be said that the bellows deformation has an amount of impact energy to be absorbed larger than that of the meandering deformation. However, when the bending as shown in FIG. 4 occurs as a result of a disturbance such as an input direction of an impact force, for example, being inclined with respect to the longitudinal direction of the impact absorbing member 1, in the structure in which the bellows deformation is assumed, an amount of impact energy to be absorbed is significantly reduced.

On the other hand, in the impact absorbing member 1 according to the present embodiment, as shown in FIG. 2, the deformation form is controlled so as to be the meandering deformation by disposing the high strength section 4*a* between the pair of low strength sections 4*b*. By performing such control, it is possible to stably absorb the impact energy even if the disturbance as described above occurs.

The impact absorbing member 1 according to the present embodiment described above will be summarized below.

The impact absorbing member 1 in the present embodiment includes the hat-shaped molded body (the hat-shaped member) 2 having the flange sections 2*c* and the web section 2*a* whose cross-sectional shape perpendicular to the longitudinal direction is a hat top section, and the plate-shaped member 3 joined to the flange sections 2*c* and facing the web section 2*a*. Furthermore, the deformation guidance section 4 is provided on the wall section 1*d* which is the plate-shaped member among the web section 2*a* and the plate-shaped member 3. The deformation guidance section 4 includes: the high strength section (the first high strength section) 4*a* having a relatively higher buckling resistance in the wall section 1*d*; and the pair of low strength sections 4*b* having a relatively lower buckling resistance and disposed on the both sides of the high strength section 4*a* so as to sandwich it therebetween when viewed in the longitudinal direction. In addition, the impact absorbing members 1 is provided with the pair of high strength sections (the second high strength sections) 7 which is disposed on both sides of the deformation guidance section 4 so as to be adjacent to the pair of low strength sections 4*b* in a view along the longitudinal direction and which has a relatively higher buckling strength with respect to the low strength sections 4*b*.

According to the impact absorbing member 1, it is possible to arbitrarily set a bending position and a bending direction at the time of receiving impact energy in accordance with the position of the deformation guidance section 4 in the longitudinal direction. Furthermore, since the bending deformation at this time occurs in each of the pair of low strength sections 4*b* separated from each other by the high strength section 4*a*, it is possible to perform dispersion of bending deformation occurring at two places while the bending deformation occurs at one place in the related art. As a result, since it is possible to expand a region subjected to bending deformation in the longitudinal direction of the wall section 1*d*, it is possible to increase an amount of impact energy to be absorbed.

Therefore, according to the impact absorbing member 1, when an impact is applied, it is possible to exhibit the high capacity for absorbing impact energy while the impact absorbing member 1 is subjected to bending deformation as expected.

Also, in the impact absorbing member 1, the deformation guidance section 4 is provided on the wall section 1*d* (the plate-shaped member 3) among the wall sections 1*a* to 1*d*. According to this constitution, since the wall section 1*d* integrally formed with the pair of flange sections 2*c* has a relatively higher buckling resistance as compared with the other wall sections, it is possible to further increase an amount of energy absorption by providing the deformation guidance section 4 so that the wall section 1*d* is subjected to bending deformation.

Furthermore, when the length of the high strength section 4*a* in the longitudinal direction is set to be L1 (mm) and the distance between the web section 2*a* which is a hat top section and the plate-shaped member 3 is set to be H (mm), the impact absorbing member 1 satisfies a relationship of $0.8 \times H \leq L1 \leq 2.0 \times H$.

According to the impact absorbing member 1 described above, since it is possible to reliably separate the pair of low strength sections 4*b*, it is possible to disperse and generate the bending deformations occurring in the low strength sections 4*b* without interference therebetween.

In addition, when the length of each of the pair of low strength sections 4b in the longitudinal direction is set to be C (mm) and the distance between the web section 2a and the plate-shaped member 3 is set to be H (mm), the impact absorbing member 1 satisfies a relationship of C≤0.6×H.

According to the impact absorbing member 1 described above, it is possible to achieve both of the limitation of bending deformation positions and the reliable bending deformations at the deformation positions.

Also, in the impact absorbing member 1, the high strength section 4a has the bead sections 5 (a first bead section) provided on the plate-shaped member 3 along the longitudinal direction.

According to the impact absorbing member 1 described above, since it is possible to form the bead sections 5 having an appropriate shape dimension at an appropriate position using a simple method such as pressing, it is possible to accurately set a reinforcement range and a degree of reinforcement using the bead sections 5.

Furthermore, as shown in (b) of FIG. 1, the high strength section 4a includes the pair of bead sections 5a and 5b extending in the longitudinal direction and parallel to each other. Moreover, among the pair of low strength sections 4b, the low strength section 4b which is a region adjacent to one ends (the left side of the paper) of both the pair of bead sections 5a and 5b is flat. Similarly, the low strength section 4b which is a region adjacent to the other ends (the right side of the paper) of both the pair of bead sections 5a and 5b is also flat.

In this way, it is possible to easily form the pair of low strength sections 4b by making the regions adjacent to both ends of the pair of bead sections 5a and 5b have flat and unprocessed regions.

In the above-described embodiment, the low strength sections 4b adjacent to both ends of the pair of bead sections 5a and 5b are flat. However, as described in other embodiments and the like which will be described later, constitutions other than the above-described configuration may be adopted, if only the relative strength at each position of the pair of low strength sections 4b is weakened comparing to the other places when viewed in the longitudinal direction of the impact absorbing member 1. Thus, as described in other embodiments and the like which will be described later, constitutions other than the above-described form may be adopted. To be specific, on one end side of the pair of bead sections 5a and 5b, the low strength section 4b adjacent to only one side instead of both sides thereof may be flat. Similarly, on the other end side of the pair of bead sections 5a and 5b, the low strength section 4b adjacent to only one side instead of both sides thereof may be flat.

As shown in (b) of FIG. 1, the pair of high strength sections 7 are provided on the wall section 1d in the impact absorbing member 1 in the longitudinal direction. Furthermore, one ends of the pair of high strength sections 7 include the bead sections (second bead sections) 6a to 6d adjacent to the pair of low strength sections 4b. To be specific, one of the pair of high strength sections 7 includes the bead sections 6b and 6d extending in the longitudinal direction between the one end portion 1e1 of the impact absorbing member 1 and one of the pair of low strength sections 4b. The other of the pair of high strength sections 7 includes the bead sections 6a and 6c extending in the longitudinal direction between the other end portion 1e2 of the impact absorbing member 1 and the other of the pair of low strength sections 4b.

According to the impact absorbing member 1 described above, it is possible to easily set a position and a length of the low strength sections 4b between the bead sections 5 and 6.

Also, as shown in (c) of FIG. 1, when a height of the bead sections 5 from a wall surface of the wall section 1d in which the bead sections 5 are provided is set to be d (mm), a width of the bead sections 5 is set to be w (mm), and a plate thickness of the wall section 1d in which the bead sections 5 are provided is set to be t (mm), both d/t≥2.0 and w≥10 are satisfied.

According to the impact absorbing member 1 described above, it is possible to subject the pair of low strength sections 4b to bending deformation while separating between the pair of low strength sections 4b. Thus, it is possible to more reliably absorb impact energy. Although this effect can be obtained if one of d/t≥2.0 and w≥10 is satisfied, it is possible to expect a more reliable effect if both are satisfied.

Furthermore, in the impact absorbing member 1, the high strength section 4a servers as a bulging portion which bulges outward in a plate thickness direction of the wall section 1d in which the deformation guidance section 4 is provided when receiving a load in the longitudinal direction from the outside.

According to the impact absorbing member 1 described above, since the high strength section 4a is deformed as a bulging portion at the time of the bending deformation and absorbs energy through compression, it is possible to exhibit sufficient proof stress. Thus, it is possible to effectively absorb impact energy as compared with a conventional structure having bending deformation at one place or having bellows deformation.

Although a case in which the two bead sections 5 provided on the high strength section 4a and the two bead sections 6 provided on each of the high strength sections 7 are provided has been described in the above-described embodiment, the present invention is not limited only to this constitution and the number of bead sections 5 and 6 may be one or three or more.

In addition, the number of bead sections 5 and 6 may be different from each other. For example, the number of bead sections 5 provided on the high strength section 4a may be two and the number of bead sections 6 provided on the high strength sections 7 may be one. Alternatively, the number of bead sections 5 provided on the high strength section 4a may be one and the number of bead sections 6 provided on the high strength sections 7 may be two.

Also, although the deformation guidance section 4 is provided on the wall section 1d in the above-described embodiment, the present invention is not limited only to this constitution and the deformation guidance section 4 may be provided on at least one of the wall sections 1a to 1d. When deformation guidance sections 4 are provided on a plurality of wall sections, for example, if the impact absorbing member 1 is bent in one direction, the deformation guidance sections 4 may be provided in the two wall sections arranged in the bending direction and facing each other. In this case, it is desirable that the other wall section in which the deformation guidance section 4 is not provided be flat (for example, a flat surface as it is).

Furthermore, the position of the deformation guidance section 4 is not limited only to the central position of the wall section 1d in the longitudinal direction and may be a position deviated to one side or the other side in the longitudinal direction.

Second Embodiment

Figure 5:
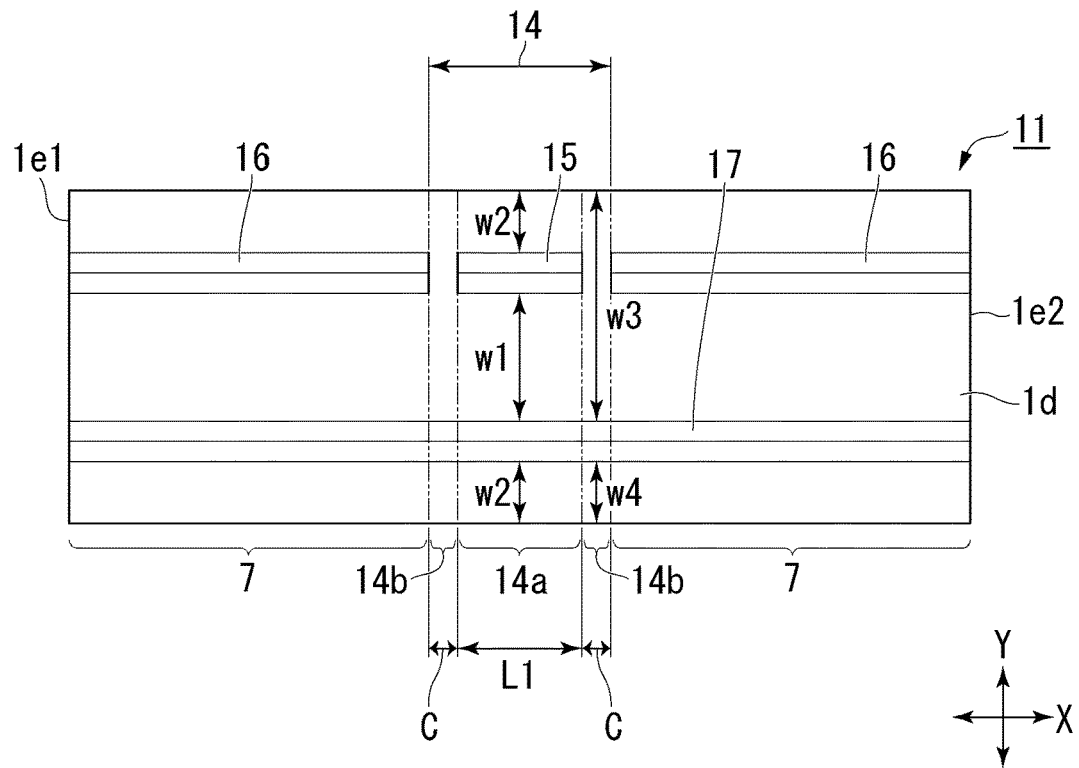
FIG. 5 is a diagram showing an impact absorbing member according to a second embodiment of the present invention and is a bottom view corresponding to that of (b) of FIG. 1.

Next, a second embodiment of the present invention will be described below with reference to FIG. 5. FIG. 5 is a diagram corresponding to (b) of FIG. 1. In the following description, a description will be provided by focusing on differences between the first embodiment and the second embodiment and duplicate description will be omitted assuming that the other constituent elements are the same as those of the first embodiment.

In an impact absorbing member 11 in the present embodiment, among a plurality of wall sections 1a to 1d, a deformation guidance section 14 is provided on only the wall section 1d including a plate-shaped member 3. The deformation guidance section 14 includes: a high strength section 14a (also referred to as a "first high strength section") having a relatively higher buckling resistance; and a pair of low strength sections 14b having a relatively lower buckling resistance than the high strength section 14a. The high strength section 14a and low strength sections 14b are arranged in a longitudinal direction of the wall section 1d. The high strength section 14a is disposed between the pair of low strength sections 14b in the longitudinal direction of the wall section 1d. In the wall section 1d, the deformation guidance section 14 is disposed between the pair of high strength sections 7 (also referred to as "second high strength sections") in the longitudinal direction of the wall section 1d. By disposing the low strength sections 14b between the high strength section 14a and the high strength sections 7, the low strength sections 14b serve as regions which have a relatively lower buckling resistance in the entire wall section 1d.

The high strength section 14a occupies a substantially central region of the wall section 1d in the longitudinal direction. Furthermore, the low strength sections 14b occupy two regions adjacent to both sides of the high strength section 14a without a gap.

The high strength section 14a has two bead sections 15 and 17 which are parallel to each other and present to extend in the longitudinal direction of the impact absorbing member 11. On the other hand, only the bead section 17 is present in regions occupied by the low strength sections 14b. Furthermore, other bead sections 16 are provided on both sides of the bead section 15 in the longitudinal direction with a space therebetween.

In other words, the wall section 1d includes: the bead section 15 provided at a center in the longitudinal direction; the other bead sections 16 provided on the same straight line with a space therebetween on both sides of the bead section 15 in the longitudinal direction; and the bead section 17 extending over the entire length of the wall section 1d in the longitudinal direction. The bead section 15 and each of the bead sections 16 are separated from each other in the longitudinal direction and portions between the bead sections 15 and 16 is not processed. In addition, the bead sections 15 and 16 and the bead section 17 are parallel to each other. A central portion of the wall section 1d in which the two bead sections 15 and 17 are present side by side in parallel with each other serves as the high strength section 14a. Furthermore, two regions which include flat portions (for example, an unprocessed portion) adjacent to both ends of the bead section 15 and extend in the Y direction of FIG. 5 serve as the pair of low strength sections 14b. Although the bead sections 15 and 16 are not present in the low strength sections 14b, the bead section 17 is present in the low strength sections 14b.

The bead sections 15 to 17 protrude from an outer surface of the wall section 1d toward the outside of the impact absorbing member 11. The shape of each of the bead sections 15 to 17 when viewed in a cross section perpendicular to the longitudinal direction of the wall section 1d is the same as those of the bead sections 5 and 6 described in the first embodiment. The effective width of the high strength section 14a in which the two bead sections 15 and 17 are provided is wider than the effective width of the low strength sections 14b in which only one bead section 17 is provided. As a result, the buckling resistance of the high strength section 14a is relatively higher than the buckling resistance of each of the low strength sections 14b.

The buckling resistances of the high strength section 14a and the low strength sections 14b are represented by a sum of proof stresses F of sides on the member compression side obtained by using the foregoing Expression (1), as in the first embodiment. Sides of the high strength section 14a are a total of three sides, i.e., a side w1 in a cross-sectional shape between the two bead sections 15 and 17 and two sides w2 in a cross-sectional shape from the bead sections 15 and 17 to both end portions of the wall section 1d in the width direction. On the other hand, sides of each of the low strength sections 14b are two sides w3 and w4 in a cross-sectional shape on both sides of the bead section 17 in the width direction.

Also, in the present embodiment, the bead sections 16 and 17 extend to both ends of the wall section 1d in the longitudinal direction. In other words, in the present embodiment, both of the bead sections 16 and 17 are continuously present in a region (the high strength section 7) of the wall section 1d in which the deformation guidance section 14 is excluded. In this way, since the bead sections 16 and 17 which enhance the buckling resistance of the region (the high strength section 7) in which the deformation guidance section 14 is excluded are present, when the impact absorbing member 11 is viewed in the longitudinal direction, each of the low strength sections 14b in which the bead section 17 is present but the bead section 16 is not present is a region which has a relatively lower buckling resistance than that around both ends in the longitudinal direction.

According to this constitution, if an impact load is applied to the one end portion 1e1 of the impact absorbing member 11, the deformation guidance section 14 is bent and deformed, as in the case of the first embodiment. At the time of deformation, the wall section 1d on which the deformation guidance section 14 is formed is deformed to be inside the bending. In this way, folded deformation occurs in the deformation guidance section 14 to absorb energy of an impact load.

Although the bead sections 16 are provided in the regions (the high strength sections 7) other than the deformation guidance section 14 to relatively weaken the buckling resistances in the regions of the low strength sections 14b in the present embodiment, the present invention is not limited to this constitution. As a constitution in which the buckling resistance of the high strength sections 7 is increased other than providing the bead sections 16 and 17, for example, it is conceivable to make the plate thickness of the high strength sections 7 of the wall section 1d relatively thicker.

The sectional dimension (L1 and C) of the high strength section 14a and the low strength sections 14b may be the same as those in the first embodiment. The length L1 of the high strength section 14a in the longitudinal direction is determined in accordance with the length of the bead section 15 in the longitudinal direction. Furthermore, the length C of the low strength sections 14b in the longitudinal direction of the wall section 1*d* is determined in accordance with the space between the bead section 15 and the bead sections 16. In addition, heights and widths of the bead sections 16 and 17 may be the same as or different from a height and a width of the bead section 15 in the high strength section 14*a*.

Third Embodiment

Figure 6:
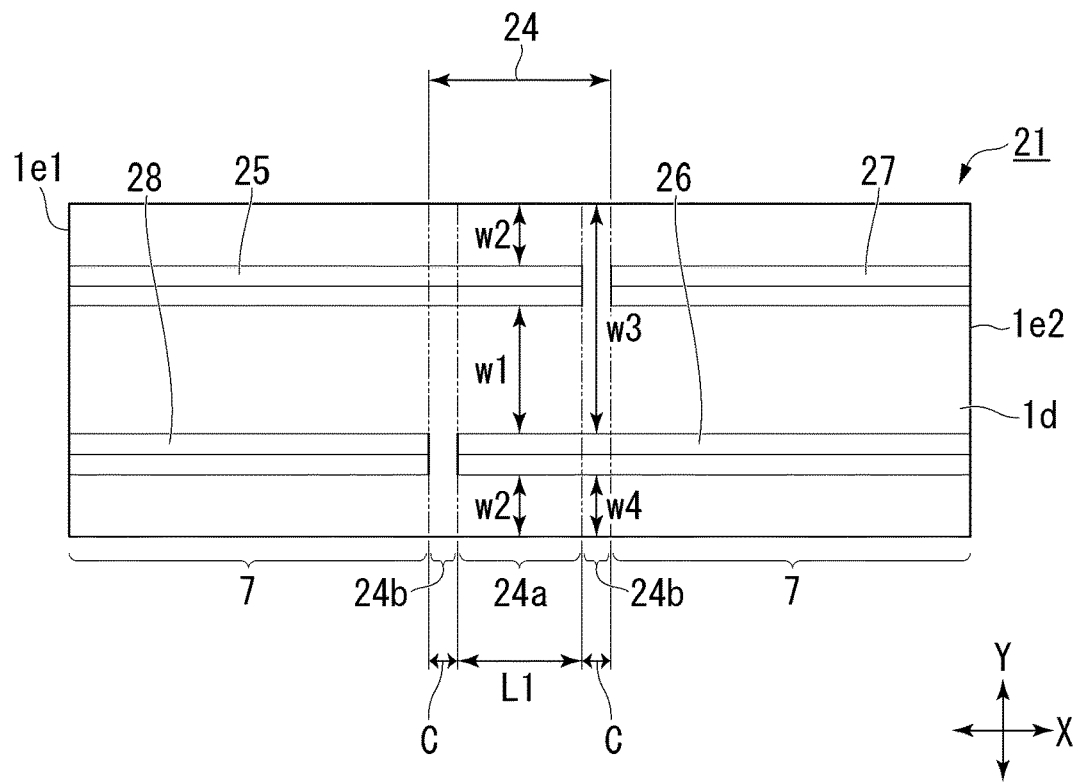
FIG. 6 is a diagram showing an impact absorbing member according to a third embodiment of the present invention and is a bottom view corresponding to that of (b) of FIG. 1.

FIG. 6 shows an impact absorbing member 21 according to a third embodiment of the present invention. FIG. 6 is a diagram corresponding to (b) of FIG. 1. In the following description, a description will be provided by focusing on differences between the first embodiment and the third embodiment and the duplicate description will be omitted assuming that the other constituent elements are the same as those of the first embodiment.

Among a plurality of wall sections 1*a* to 1*d* forming the impact absorbing member 21, a deformation guidance section 24 is provided on the wall section 1*d* formed by a plate-shaped member. The deformation guidance section 24 includes a high strength section 24*a* (also referred to as a "first high strength section") having a relatively higher buckling resistance and a pair of low strength sections 24*b* having a relatively lower buckling resistance than the high strength section 24*a*. The high strength section 24*a* and the low strength sections 24*b* are arranged in a longitudinal direction of the wall section 1*d*. The high strength section 24*a* is disposed between the pair of low strength sections 24*b* in the longitudinal direction of the wall section 1*d*. In the wall section 1*d*, the deformation guidance section 24 is disposed between the pair of high strength sections 7 (also referred to as "second high strength sections") in the longitudinal direction of the wall section 1*d*. By disposing the low strength sections 24*b* between the high strength section 24*a* and the high strength sections 7, the low strength sections 24*b* serves as the regions having relatively lower buckling resistance in the entire wall section 1*d*.

The high strength section 24*a* occupies a substantially central region of the wall section 1*d* in the longitudinal direction. Furthermore, the low strength sections 24*b* occupy regions adjacent to both sides of the high strength section 24*a*. Two bead sections 25 and 26 parallel to each other are present in the high strength section 24*a*. On the other hand, only one of the bead section 25 and the bead section 26 is present in each of the low strength sections 24*b*. In addition, another bead section 27 is present on the other end side of the bead section 25 in the longitudinal direction, and another bead section 28 is further present on one end side of the bead section 26 in the longitudinal direction.

In other words, the wall section 1*d* includes: the bead section 25 provided across a central portion of the wall section 1*d* in the longitudinal direction from one end (one end portion 1*e*1) side of the wall section 1*d* in the longitudinal direction; the bead section 26 provided across the central portion of the wall section 1*d* in the longitudinal direction from the other end (the other end portion 1*e*2) side of the wall section 1*d* in the longitudinal direction; and the other bead sections 27 and 28 on extension lines of the bead sections 25 and 26.

The bead section 25 and the bead section 27 are separated from each other and a portion between the bead sections 25 and 27 is a flat unprocessed portion. Similarly, the bead section 26 and the bead section 28 are separated from each other and a portion between the bead sections 26 and 28 is a flat unprocessed portion. The bead section 25 and the bead section 27 are on the same straight line. Similarly, the bead section 26 and the bead section 28 are also on the same straight line. Moreover, the bead section 25 and the bead section 27 are parallel to the bead section 26 and the bead section 28. Furthermore, the bead sections 25 and 26 have portions arranged side by side in parallel with each other at a center of the wall section 1*d* in the longitudinal direction. A central portion which has the bead sections 25 and 26 arranged side by side in parallel serves as the high strength section 24*a*.

One region which includes an unprocessed portion between the bead section 25 and the bead section 27 and extends in the Y direction of FIG. 6 is one of the pair of low strength sections 24*b*. Although the bead section 25 and the bead section 27 are not present in the one of the low strength sections 24*b*, the bead section 26 is present in the one of the low strength sections 24*b*.

Also, one region which includes an unprocessed portion between the bead section 26 and the bead section 28 and extends in the Y direction of FIG. 6 is the other of the pair of low strength sections 24*b*. Although the bead section 26 and the bead section 28 are not present in the other of the low strength sections 24*b*, the bead section 25 is present in the other of the low strength sections 24*b*.

Each of the bead sections 25 to 28 protrudes from the wall surface of the wall section 1*d* toward the outside of the impact absorbing member 21. The shape of each of the bead sections 25 to 28 when viewed in a cross section perpendicular to the longitudinal direction of the wall section 1*d* is the same as those of the bead sections 5 and 6 described in the first embodiment.

With the constitution described above, an effective width of the high strength section 24*a* in which the two bead sections 25 and 26 are present is wider than an effective width of each of the low strength sections 24*b* in which only one of the bead section 25 and the bead section 26 is present. As a result, the buckling resistance of the high strength section 24*a* is relatively higher than the buckling resistance of the low strength sections 24*b*.

The buckling resistances of the high strength section 24*a* and the low strength sections 24*b* are represented by a sum of proof stresses F of sides on the member compression side obtained through the foregoing Expression (1), as in the case of the first embodiment. Sides of the high strength section 24*a* are a total of three sides, i.e., one side w1 in a cross-sectional shape between the two bead sections 25 and 26 and two sides w2 in a cross-sectional shape from the bead sections 25 and 26 to an end portion of the wall section 1*d* in the width direction. On the other hand, sides of the low strength sections 24*b* are two sides w3 and w4 in a cross-sectional shape on both sides of the bead section 25 or 26 in the width direction.

Also, in the example of FIG. 6, each of the bead sections 25 to 28 extends to both ends of the wall section 1*d* in the longitudinal direction. In other words, in the example of FIG. 6, the bead sections 25 to 28 are present not only in the deformation guidance section 24 but also in the regions (the high strength sections 7) in which the deformation guidance section 24 is excluded. In this way, since the bead sections 25 to 28 which increase buckling resistance are present in the regions (the high strength sections 7) in which the deformation guidance section 24 is excluded, the low strength sections 24*b* in the impact absorbing member 21 is limited to a region in which only one bead section 25 (or 26) is present. Although the bead sections 25 to 28 are provided in the high strength sections 7 other than the deformation guidance section 24 to limit the regions of the low strength sections 24*b* in the present embodiment, the present invention is not limited to this constitution only. The buckling resistance of the high strength sections 7 other than the deformation guidance section 24 may be adjusted through a method other than providing the bead sections 25 to 28, for example, by partially increasing a plate thickness or increasing yield stress, and thus limiting the regions of the low strength sections 24b.

Dimensions (L1 and C) of the high strength section 24a and the low strength sections 24b may be the same as those in the case of the first embodiment. The length L1 of the high strength section 24a in the longitudinal direction of the wall section 1d is determined in accordance with the lengths of the bead sections 25 and 26 arranged side by side in parallel with each other. Furthermore, the length C of the low strength sections 24b in the longitudinal direction of the wall section 1d is determined in accordance with a space between the bead section 25 and the bead section 27 and a space between the bead section 26 and the bead section 28. In addition, the heights and widths of the bead sections 25 to 28 may be the same or different from each other.

As described above, the impact absorbing member 21 in the present embodiment includes a pair of a set of bead sections 25 and 27 and a set of bead sections 26 and 28. Moreover, the set of bead sections 25 and 27 which is one set of the pair of sets is continuously formed except for one side portion of the pair of low strength sections 24b. Furthermore, the set of bead sections 26 and 28 which is the other side of the pair of sets is continuously formed except for a portion on the other side of the pair of low strength sections 24b.

According to this constitution, if an impact load is applied to the one end portion 1e1 of the impact absorbing member 21 of FIG. 6, the deformation guidance section 24 is bent and deformed, as in the case of the first embodiment. At the time of deformation, the wall section 1d on which the deformation guidance section 24 is formed is deformed to be inside the bending. In this way, since folded deformation occurs in the deformation guidance section 24, the deformation guidance section 24 absorbs the energy of the impact load.

Fourth Embodiment

A fourth embodiment of the present invention will be described below with reference to FIG. 7. In the following description, a description will be provided by focusing on differences between the first embodiment and the fourth embodiment and the duplicate description will be omitted assuming that the other constituent elements are the same as those of the first embodiment.

Impact absorbing members 61 in the present embodiment includes a plurality of (three in the shown example) deformation guidance sections 64A, 64B, and 64C. That is to say, the deformation guidance section 64A is formed on a wall section 1d formed of a plate-shaped member 3, and the two the deformation guidance sections 64B and 64C are formed on a wall section 1a including a web section 2a of a molded body 2. The deformation guidance sections 64A to 64C are arranged to be separated from each other in a longitudinal direction of the impact absorbing members 61.

Each of the deformation guidance sections 64A to 64C includes high strength sections 64a (also referred to as "first high strength sections") having a relatively higher buckling resistance and a pair of low strength sections 64b having a relatively lower buckling resistance than the high strength sections 64a. The high strength sections 64a and the low strength sections 64b are arranged in a longitudinal direction of the wall sections 1a and 1d. The high strength sections 64a are arranged between the pair of low strength sections 64b in the longitudinal direction of the wall sections 1a and 1d. In each of the wall sections 1a and 1d, each of the deformation guidance sections 64A to 64C is arranged between high strength sections 64d (also referred to as "second high strength sections") in the longitudinal direction of the impact absorbing members 61. Since the low strength sections 64b are arranged between the high strength sections 64a and the high strength sections 64d, the low strength sections 64b are regions having a relatively lower buckling resistance than the high strength sections 64a and 64d which are the other regions in the wall sections 1a and 1d.

In the wall sections 1a and 1d, the high strength section 64a is a portion having a relatively higher buckling resistance and the low strength sections 64b are portions having a relatively lower buckling resistance. The high strength section 64a is provided in a substantially central region of the wall section 1d in the longitudinal direction. On the other hand, the two high strength sections 64a are provided on both side regions of the wall section 1a in the longitudinal direction. Furthermore, each of the low strength sections 64b is provided in regions adjacent to the high strength sections 64a.

Bead sections 65 are provided in the high strength sections 64a in the longitudinal direction of the impact absorbing members 61. On the other hand, the low strength sections 64b are flat unprocessed portions in which a bead section is not provided. One bead section 65 is provided in each of the high strength sections 64a of the wall section 1a, and two bead sections 65 are provided in each of the high strength sections 64a of the wall section 1d in parallel with each other.

Also, two sets of pairs of bead sections 66 are provided on the wall section 1d. One of the two sets of pairs extends between one of the pair of low strength sections 64b and the one end portion 1e1. Furthermore, the other of the two sets of pairs extends between the other of the pair of low strength sections 64b and the other end portion 1e2. The wall section 1a is provided with: a bead 67 adjacent to one of the pair of low strength sections 64b of the deformation guidance section 64B and extending to the one end portion 1e1; a bead section 67 extending in the longitudinal direction of the wall section 1a to be adjacent to both of the other of the pair of low strength sections 64b of the deformation guidance section 64B and one of the pair of low strength sections 64b of the deformation guidance section 64C; and a bead 67 adjacent to the other of the pair of low strength sections 64b of the deformation guidance section 64C and extending to the other end portion 1e2. The bead sections 65 and the bead sections 66 or the bead sections 65 and the bead sections 67 are arranged side by side on an extension line corresponding to each other to have the low strength sections 64b arranged therebetween.

When viewed in the longitudinal direction of the impact absorbing members 61, a length of the high strength sections 64a provided on the wall section 1a is relatively shorter than a length of the high strength sections 64a provided on the wall section 1d. On the other hand, the low strength sections 64b have the same length dimension in both of the wall section 1a and the wall section 1d.

The longitudinal directions of the bead sections 65 to 67 are parallel to the longitudinal directions of the wall sections 1a and 1d. Furthermore, as shown in (d) of FIG. 7, the bead sections 65 protrudes from the wall sections 1a and 1d toward the outside of the impact absorbing members 61. The bead sections 66 and 67 also have the same cross-sectional shape. The low strength sections 64b is a region having a cross-sectional shape in which none of the bead sections 65, 66, and 67 is provided. Furthermore, the high strength sections 64*a* are regions having a cross-sectional shape in which the bead sections 65 are provided and regions arranged between the pair of low strength sections 64*b*. Since the bead sections 65 are provided, the effective width of the high strength sections 64*a* is wider than the effective width of the low strength sections 64*b*. As a result, the buckling resistance of the high strength sections 64*a* is relatively higher than the buckling resistance of the low strength sections 64*b*.

The buckling resistances of the high strength sections 64*a* and the low strength sections 64*b* are represented by a sum of proof stresses F of sides on the member compression side obtained through the foregoing Expression (1), as in the case of the first embodiment. It is desirable that there be a difference between the buckling resistance of the deformation guidance section 64A on the wall section 1*d* and the total buckling resistance of the two deformation guidance sections 64B and 64C on the wall section 1*a* of 10% or more. Since such a difference is provided, it is possible to determine the bending directions of the impact absorbing members 61.

A side of the deformation guidance section 64A when the proof stresses F of the high strength sections 64*a* are obtained are a total of three sides, i.e., one side w between the two bead sections 65 and two sides w2 in a cross-sectional shape from the bead sections 65 to both ends of the wall section 1*d* in the width direction thereof. On the other hand, a side of each of the low strength sections 64*b* is one side w5 of the wall section 1*a* or 1*d* in the width direction thereof.

Figure 7:
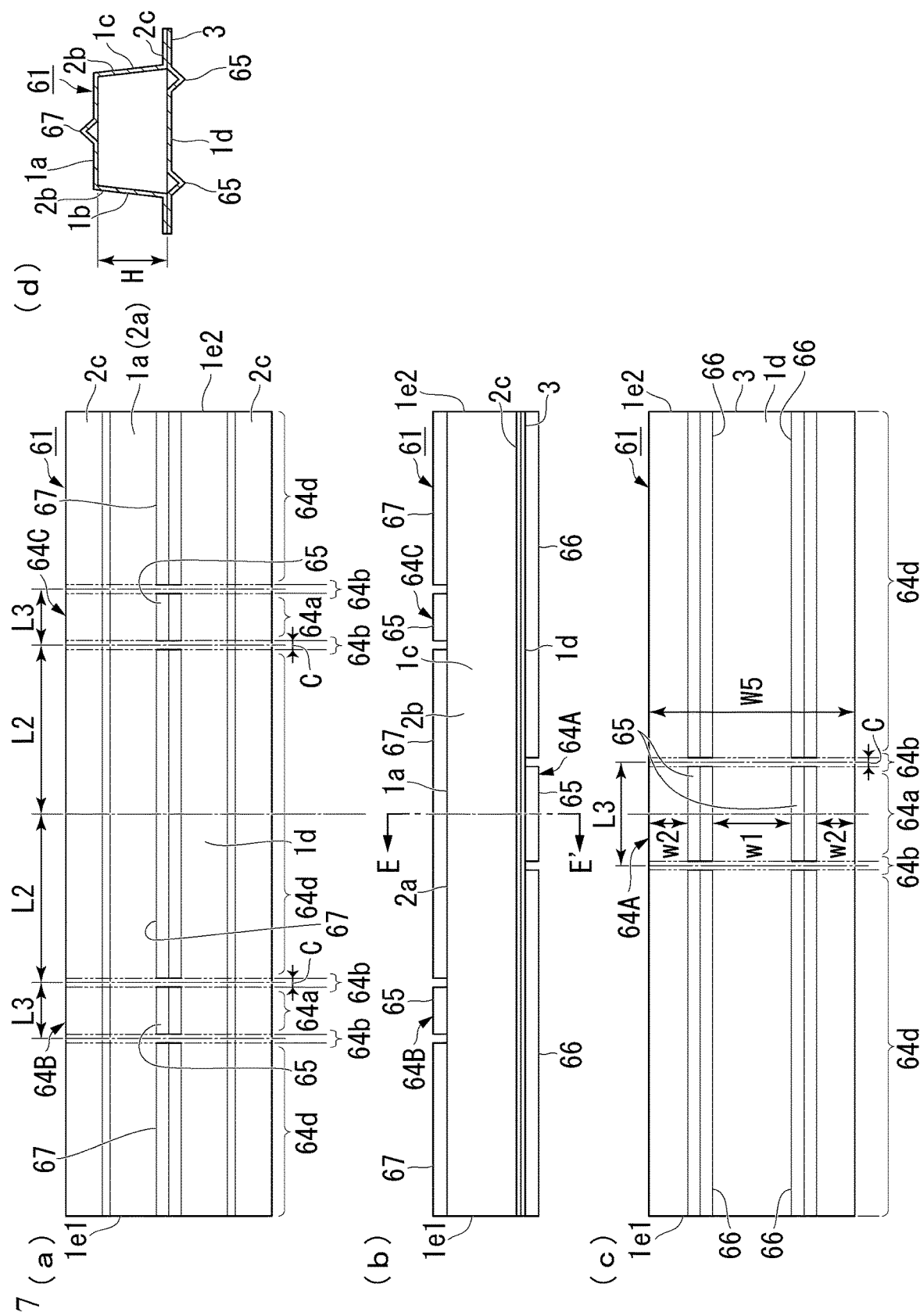
FIG. 7 is a diagram showing an impact absorbing member according to a fourth embodiment of the present invention, wherein (a) of FIG. 7 is a plan view, (b) of FIG. 7 is a side view, (c) of FIG. 7 is a bottom view, and (d) of FIG. 7 is a cross-sectional view taken along a line E-E' of (b) of FIG. 7.

If an impact load is applied to the one end portion 1*e*1 of each of the impact absorbing members 61 of FIG. 7, first, the wall section 1*a* is bent and deformed to be inside the bending in the deformation guidance section 64B close to the one end portion 1*e*1. Subsequently, the wall section 1*d* is bent and deformed to be inside the bending in the deformation guidance section 64A. Final, the wall section 1*a* is bent and deformed to be inside the bending in the deformation guidance section 64C. Through such a process, bending deformation sequentially occurs in the deformation guidance sections 64A to 64C. Thus, the energy of an impact load is absorbed. Moreover, when viewed in a side view shown in (b) of FIG. 7, the deformation at this time is bent to be convex downward in the deformation guidance section 64B, bent to be convex upward in the deformation guidance section 64A, and bent to be convex downward in the deformation guidance section 64C. Thus, the impact absorbing members 61 are meandering as a whole and deformed so that the total length of the impact absorbing members 61 becomes shorter.

In this way, in the impact absorbing members 61 shown in FIG. 7, the deformation guidance sections 64A to 64C are provided on the pair of wall sections 1*a* and 1*d* facing each other and the deformation guidance sections 64A to 64C are positioned to be arranged while separated from each other in the longitudinal direction of the wall sections 1*a* and 1*d*. Thus, the impact absorbing members 61 can be bent and deformed at a plurality of places in directions different from each other. That is to say, the impact absorbing member 61 can be deformed in a meandering shape instead of being deformed in a bellows shape in an axial direction. In this way, since bending deformation occurs at a plurality of places, it is possible to stably secure an amount of energy absorption of an impact load even when there is a disturbance such as a case in which a load input direction changes.

Moreover, when the deformation guidance section 64A is bent, the deformation guidance section 64A absorbs the impact energy while forming a bulging portion. Thus, it is possible to exert a higher impact energy absorption capacity.

Although the deformation guidance sections may be provided on the wall sections 1*a* and 1*d* facing each other when the plurality of deformation guidance sections are provided in the impact absorbing member, as in the present embodiment shown in FIG. 7, the present invention is not limited this form. For example, deformation guidance sections may be provided on wall sections adjacent to each other like the wall sections 1*d* and 1*b*. In this case, when viewed in the longitudinal direction, bending directions when the impact absorbing members are deformed can be alternately bent in different directions using ones adjacent to each other.

The impact absorbing member 61 according to the present embodiment described above will be summarized below.

The impact absorbing member 61 in the present embodiment has a tubular shape in which the impact absorbing member 61 is formed of the plurality of wall sections 1*a* to 1*d* and is long in one direction. The deformation guidance sections 64A to 64C are provided at positions separated from each other of each of the pair of wall sections 1*a* and 1*d* facing each other of the plurality of wall sections 1*a* to 1*d* when viewed in one direction. Furthermore, each of the deformation guidance sections 64A to 64C has the high strength section 64*a* having a relatively higher buckling resistance and the pair of low strength sections 64*b* having a relatively lower buckling resistance and having the high strength section 64*a* arranged therebetween when viewed in one direction.

Also, the high strength section (the second high strength section) 64*d* having the pair of bead sections 66 adjacent to each of the low strength sections 64*b* of the deformation guidance section 64A is formed on the wall section 1*d*. Furthermore, the high strength section (the second high strength section) 64*d* having the bead section 67 adjacent to each of the low strength sections 64*b* of the deformation guidance sections 64B and 64C is formed on the wall section 1*a*.

According to the impact absorbing member 61 having the above constitution, it is possible to arbitrarily set the bending position and the bending direction when impact energy is received in accordance with the positions of the deformation guidance sections 64A to 64C in the longitudinal direction. Furthermore, since the bending deformation at this time is performed independently at each position of the deformation guidance sections 64A to 64C, it is possible to disperse and absorb the impact energy. Moreover, at each position of the deformation guidance sections 64A to 64C, bending deformation occurs in each of the pair of low strength sections 64*b* separated from each other using the high strength section 64*a*. Thus, it is possible to perform dispersion of bending deformation occurring at two places of an impact absorbing member in which bending deformation occurs at one place in the related art. As a result, since a region to be bent and deformed can be expanded in the longitudinal direction of the wall section 1*d*, it is possible to increase the amount of impact energy to be absorbed.

Therefore, according to this impact absorbing member 61, when an impact is applied, it is possible to exert a high impact energy absorbing capacity while bending and deforming as expected.

Also, in the impact absorbing member 61 of the present embodiment, the wall section 1*d* which is one of the plurality of wall sections 1*a* to 1*d* is a plate-shaped member, and the other wall sections 1*a* to 1*c* are the molded body 2 forming a hat-shaped member having the pair of flange sections 2c joined to the plate-shaped member. Furthermore, among the deformation guidance sections 64A to 64C, the deformation guidance section 64A is provided on the wall section 1d and the other deformation guidance sections 64B and 64C are provided on the wall section 1a of the hat-shaped member facing the plate-shaped member.

According to the above constitution, since the impact absorbing member 61 can be deformed in a meandering shape, it is possible to further increase an amount of energy absorption of an impact load.

It is desirable that a shape dimensions and arrangements of constituent elements of the impact absorbing member 61 in the present embodiment adopt the following constitution.

In other words, as shown in FIG. 7, the impact absorbing member 61 in the present embodiment has: one deformation guidance section 64A provided on the wall section 1d which is one of the pair of wall sections 1a and 1d facing with each other; and the other deformation guidance sections 64B and 64C provided on the other wall section 1a and adjacent to one deformation guidance section 64A when viewed in one direction. Furthermore, when viewed in one direction, in a case in which a separation distance in the one direction between a central position of the high strength section 64a provided in one deformation guidance section 64A and a central position of the low strength section 64b close to the high strength section 64a provided in the one deformation guidance section 64A among the pair of low strength sections 64b provided in the other deformation guidance sections 64B and 64C is set to be L2 (mm) and the distance between the wall section 1d in which one deformation guidance section 64A is provided and the wall section 1a in which the other deformation guidance sections 64B and 64C are provided is set to be H (mm), it is desirable that $L2 \leq 6.0 \times H$ be satisfied.

According to the above constitution, since the deformation guidance sections 64A to 64C can be continuously bent and deformed when $L2 \leq 6.0 \times H$ is satisfied, it is possible to effectively absorb impact energy.

Therefore, it is possible to effectively absorb impact energy while causing the impact absorbing member 61 to be meandered and deformed as set.

In addition, in a case in which, in each of the deformation guidance sections 64A to 64C, when viewed in one direction, a separation distance between intermediate positions of the pair of low strength sections 64b is set to be L3 (mm) and a distance between the wall sections 1d and 1a in which each of the deformation guidance sections 64A to 64C is provided is set to be H (mm), it is desirable that the impact absorbing member 61 in the present embodiment satisfies $0.8 \times H \leq L3 \leq 2.0 \times H$.

According to the above constitution, first, since setting is performed so that $0.8 \times H \leq L3$ is satisfied, it is possible to prevent the bending deformation of one of the pair of low strength sections 64b and the bending deformation of the other from merging to form a substantially single bending. Furthermore, since setting is performed so that $L3 \leq 2.0 \times H$ is satisfied, it is possible to limit a place in which the bending deformation occurs to a narrow region and thus it is possible to enhance a function of dispersing bending deformation places using the high strength section 64a.

Therefore, it is possible to effectively absorb impact energy in each of the deformation guidance sections 64A to 64C.

Furthermore, in a case in which, in each of the deformation guidance sections 64A to 64C, the length of each of the pair of low strength sections 64b in one direction is set to be C (mm) and a distance between the wall sections 1d and 1a in which each of the deformation guidance sections 64A to 64C is provided is set to be H (mm), it is desirable that the impact absorbing member 61 in the present embodiment satisfy $C \leq 0.6 \times H$.

According to the above constitution, since setting is performed so that $C \leq 0.6 \times H$ is satisfied, it is possible to reliably cause bending deformation by appropriately weakening the buckling resistance at a position of each of the low strength sections 64b.

Also, in the impact absorbing member 61 of the present embodiment, the high strength sections 64a of each of the deformation guidance sections 64A to 64C have the bead sections 65 extending in one direction.

According to the above constitution, since the bead sections 65 having an appropriate shape dimension can be formed at an appropriate position through a simple method such as pressing, it is possible to accurately set the reinforcement range and the degree of reinforcement using the bead section 65.

In addition, in the impact absorbing member 61 in the present embodiment, in addition to the bead sections 65, the bead sections 66 and 67 are also formed.

According to this constitution, it is possible to accurately set a position and a length of the low strength section 64b using a space between the bead section 65 and the bead section 66, and a space between the bead section 65 and the bead section 67.

Furthermore, in the impact absorbing member 61 in the present embodiment, the high strength sections 64a of the deformation guidance section 64A forms a bulging portion which deforms outward when receiving a load from the outside.

According to the impact absorbing member 61 described above, since the high strength sections 64a of the deformation guidance section 64A are deformed as a bulging portion at the time of the bending deformation and absorbs the load by compressing energy absorption, it is possible to exert sufficient proof stress. Thus, impact energy can be effectively absorbed as compared with the conventional structure in which bending deformation or bellows deformation occurs at one place.

EXAMPLE

First Example

The results of investigating impact energy absorption performances of the impact absorbing members 1, 11, and 21 shown in the description of the first embodiment to the third embodiment will be described below. The impact absorbing members 101 and 201 shown in FIGS. 8 and 9 were used as comparison targets at the time of evaluating the performances of the impact absorbing members 1, 11, and 21.

Figure 8:
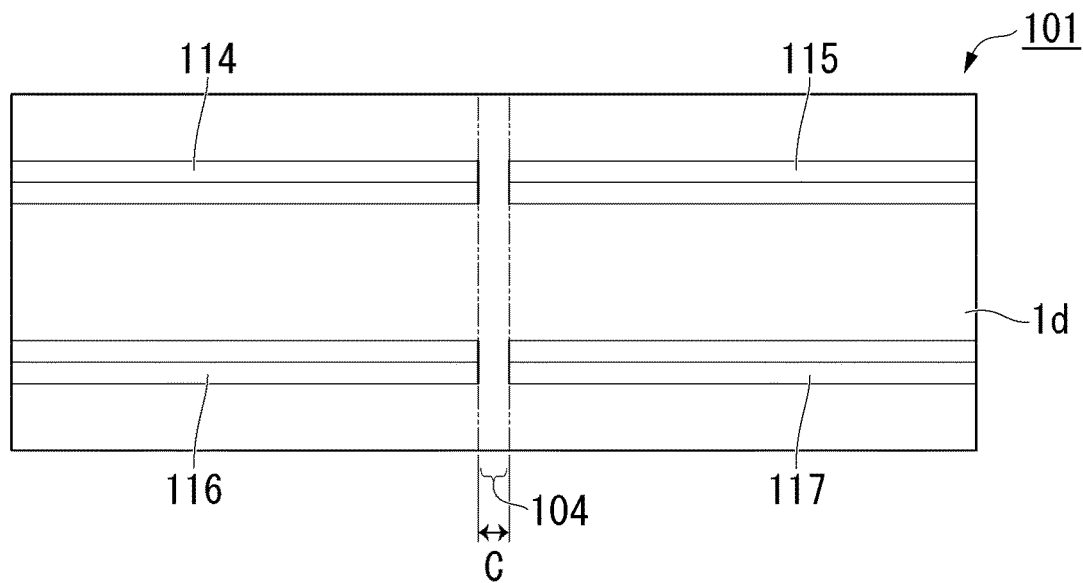
FIG. 8 is a diagram showing a comparative example in a first example and is a bottom view corresponding to that of (b) of FIG. 1.

The impact absorbing member 101 shown in FIG. 8 was a comparative example in a case in which one low strength section 104 was provided at a center of the impact absorbing member 101 in the longitudinal direction. That is to say, four bead sections 114 to 117 were provided on the wall section 1d of the impact absorbing member 101 shown in FIG. 8. The bead sections 114 and 116 were present to be arranged side by side in parallel with each other and the bead sections 115 and 117 were present to be arranged side by side in parallel with each other. Furthermore, the bead section 115 was present on the extension of the bead section 114 in the longitudinal direction and the bead section 117 was present on the extension of the bead section 116 in the longitudinal direction.

A portion between the bead sections 114 and 115 was a flat unprocessed portion of the wall section 1d as it was. Similarly, a portion between the bead sections 116 and 117 was a flat unprocessed portion of the wall section 1d as it was. Furthermore, a portion in which the bead sections 114 to 117 were not provided served as the low strength section 104. Since the bead section was not provided in the low strength section 104, an effective width thereof was smaller than those of the other portions. Thus, the low strength section 104 had a lower buckling resistance than the other portions. A width C of the low strength section 104 was 30 mm.

Figure 9:
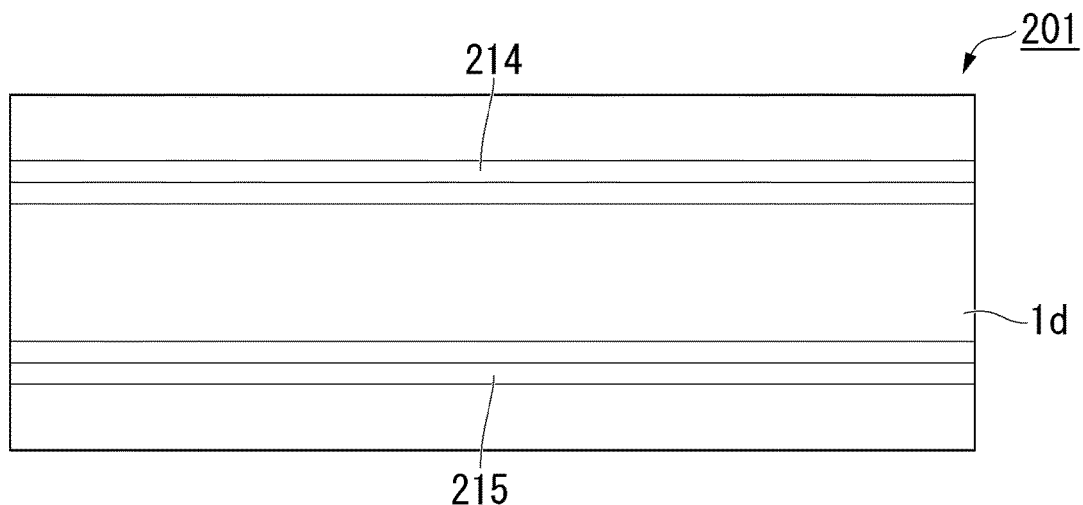
FIG. 9 is a diagram showing a comparative example in the first example and is a bottom view corresponding to that of (b) of FIG. 1.

Also, an impact absorbing member 201 shown in FIG. 9 was a comparative example in a case in which there is no low strength section. That is to say, two bead sections 214 and 215 were provided on a wall section 1d of the impact absorbing member 201 shown in FIG. 9 to be arranged side by side in parallel with each other. The impact absorbing member shown in FIG. 9 did not have a low strength section including an unprocessed portion because the bead sections 214 and 215 were continuously provided over the entire length of the wall section 1d in the longitudinal direction.

The impact absorbing members 1, 11, and 21 which were invention examples and had the constitution described above and the impact absorbing members 101 and 201 which were comparative examples and had the constitution described above were manufactured using a high-strength steel plate of a tensile strength 980 MPa class.

Also, as indicated by white arrows of FIG. 10, a moment was applied to both ends of each of the impact absorbing members 1, 11, 21, 101, and 201 in the longitudinal direction so that the wall section 1d side was inside the bending, and absorption energy when bending occurs until a bending angle was 20 was measured. The measurement results are shown in Table 1. Dimensions of impact absorbing members 1 (sample no. 1), 11 (sample no. 2), 21 (sample no. 3), 101 (sample no. 4), and 201 (sample no. 5) are as follows.

(The Same to all)
Full length: 700 mm
Width of each wall section: a wall section 1d was 140 mm and a wall section 1a was 80 mm
Height H of molded body: 50 mm
Width of flange section 2c: 20 mm
(Regarding Impact Absorbing Member 1)
Length L1 of high strength section 4a: 100 mm
Length C of each low strength section 4b: 30 mm
Space between central positions of both bead sections 5 in width direction thereof: 90 mm
Space between central positions of both bead sections 6 in width direction thereof: 90 mm
Shortest distance from a central position of each of the bead sections 5 and 6 in width direction thereof to end portion of wall section 1d in width direction thereof: 25 mm
(Regarding Impact Absorbing Member 11)
Length L1 of high strength section 14a: 100 mm
Length C of each of low strength sections 14b: 30 mm
Space between central positions of bead sections 15 and 16 in width direction thereof and a central position of bead section 17 in width direction thereof: 90 mm
Shortest distance from a central position of each of bead sections 15 to 17 in width direction thereof to end portion of wall section 1d in width direction thereof: 25 mm (Regarding Impact Absorbing Member 21)
Length L1 of high strength section 24a: 100 mm
Length C of each of low strength sections 24b: 30 mm
Space between central positions of bead sections 25 and 28 in width direction thereof: 90 mm
Space between central positions of bead sections 26 and 27 in width direction thereof: 90 mm
Shortest distance from central position of each of head sections 25 to 28 in width direction thereof to end portion of wall section 1d in width direction thereof: 25 mm
(Regarding impact absorbing member 101)
Length C of low strength section 104: 30 mm
Space between central positions of bead sections 114 and 116 in width direction thereof: 90 mm
Space between central positions of bead sections 115 and 117 in width direction thereof: 90 mm
Shortest distance from central position of each of bead sections 114 to 117 in width direction thereof to end portion of wall section 1d in width direction thereof: 25 mm
(Regarding Impact Absorbing Member 201)
Space between central positions of bead sections 214 and 215 in width direction thereof: 90 mm
Shortest distance from central position of each of bead sections 214 and 215 in width direction thereof to end portion of wall section 1d in width direction thereof: 25 mm

TABLE 1

| Sample no. | Conditions | Corresponding drawing | Absorption energy at time of deformation (kJ) | Rate of increase of absorption energy (%), (*) | Invention example/ Comparative example |
|---|---|---|---|---|---|
| 1 | Six bead sections in plate-shaped body (two low strength sections) | FIG. 1 | 3.2 | 39 | Invention example |
| 2 | Four bead sections in plate-shaped body (two low strength sections) | FIG. 5 | 3.3 | 43 | Invention example |
| 3 | Four bead sections in plate-shaped body (two low strength sections) | FIG. 6 | 3.5 | 52 | Invention example |
| 4 | Four bead sections in plate-shaped body (one low strength section) | FIG. 8 | 2.3 | — | Comparative example |
| 5 | Two bead sections in plate-shaped body (no low strength section) | FIG. 9 | 2.5 | 9 | Comparative example |

(*) A rate of increase of absorption energy when an amount of impact energy to be absorbed of sample no. 4 is used as a reference As shown in Table 1, it is found that absorption energies of the impact absorbing members 1 (sample no. 1), 11 (sample no. 2), and 21 (sample no. 3) which are the invention examples are significantly increased as compared with those of the impact absorbing members 101 (sample no. 4) and 201 (sample no. 5) which are the comparative examples.

FIG. 11 shows a schematic diagram of the impact absorbing members 1 (sample no. 1) and 101 (sample no. 4) which has been subjected to a bending test. (a) of FIG. 11 is a schematic side view of the impact absorbing member 101 which has been subjected to a bending test and is the comparative example shown in FIG. 8. (b) of FIG. 11 is a schematic side view of the impact absorbing member 1 which has been subjected to a bending test and is the invention example shown in FIG. 1.

As shown in (a) of FIG. 11, in the impact absorbing member 101 of the comparative example, bending deformation occurs in the low strength section 104 and places in which bending deformation occurs are concentrated in a narrow range. For this reason, it is estimated that an amount of energy absorption is relatively small.

On the other hand, as shown in (b) of FIG. 11, in the impact absorbing member 1 which is the invention example, bending deformation occurs to be dispersed in the pair of low strength sections 4b, bending deformation further occurs to bulge outward in the high strength section 4a between the pair of low strength sections 4b, and as a result, a range in which bending deformation occurs is dispersed. In this way, a deformation region expands in the longitudinal direction of the wall section 1d and bending deformation occurs in a relatively wider region. For this reason, it is estimated that the impact absorbing member 1 which is the invention example has a large amount of energy absorption.

In the impact absorbing members 1, 11, and 21 which are the invention examples described above, when an impact load is applied, the wall section 1d on which the deformation guidance sections 4, 14, and 24 are provided could be deformed to be bent inward. Since bending deformation occurred in the pair of low strength sections 4b, 14b, and 24b and the high strength sections 4a, 14a, and 24a were further present between the pair of low strength sections 4b, 14b, and 24b at the time of bending deformation, places in which bending deformation occurs were dispersed in the longitudinal direction. Thus, the deformation region expanded in the longitudinal direction of the wall section 1d and bending deformation occurred in a relatively wider region. As a result, it was possible to increase an amount of energy absorption when an impact load was applied. Furthermore, since it was possible to provide the deformation guidance sections 4, 14, and 24 at arbitrary places on the wall section 1d, it was possible to easily design for impact absorption.

Also, according to the impact absorbing members 1, 11, and 21, since the dimensions and arrangements of the high strength sections 4a, 14a, and 24a could be adjusted in accordance with the length adjustment and arrangement of the bead sections 5, 6, 15 to 17, and 25 to 28, it was possible to easily perform a design for impact absorption.

Furthermore, since a range in which the length of the high strength sections 4a, 14a, and 24a in the longitudinal direction of the wall section 1d was 0.8 times or more and 2.0 times or less the space (the hat height H) between the opposing wall sections 1d and 1a was provided, it was possible to reliably separate between the pair of low strength sections 4b and 4b (or between the pair of low strength sections 14b and 14b or between the pair of low strength sections 24b and 24b). Thus, the bending deformation occurring in each of the low strength sections 4b, 14b, and 24b could be dispersed and caused without interfering with each other.

In addition, since the length C of the low strength sections 4b, 14b, and 24b was 30 mm or less (C≤0.6×H), it was possible to limit a place in which bending deformation occurs to a specific place. Thus, it was possible to further enhance a function of dispersing bending deformation places using the high strength sections 4a, 14a, and 24a.

It was also effective that a height of each of the bead sections 5, 6, 15 to 17, and 25 to 28 was set to be 2.0 times or more a thickness of the wall section 1d and a width of thereof was set to be 10 mm or more, in order to provide a significant difference in buckling resistance between the high strength sections 4a, 14a, and 24a and the low strength sections 4b, 14b, and 24b.

Second Example

Figure 12:
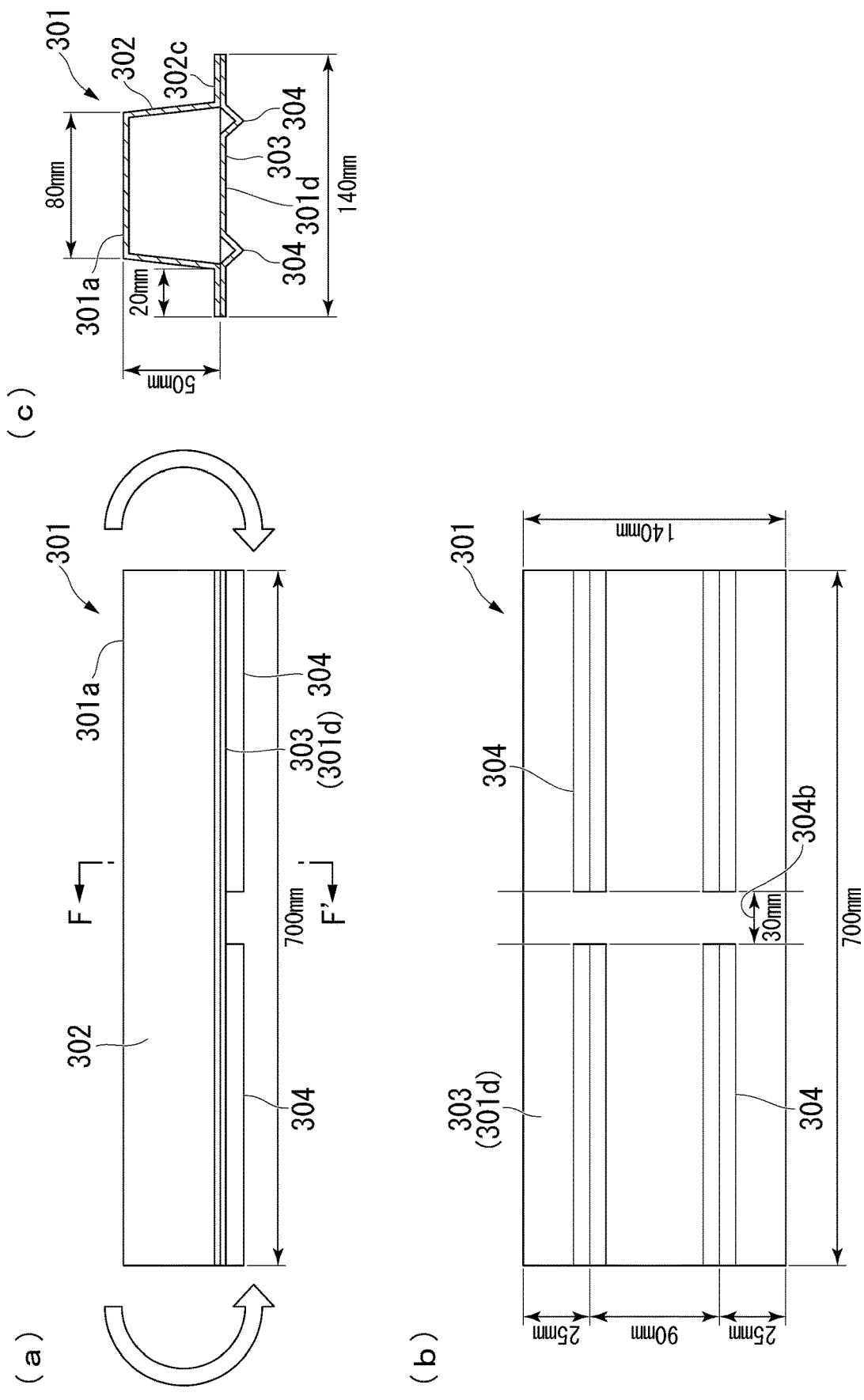
FIG. 12 is a diagram showing a comparative example in a second example, wherein (a) of FIG. 12 is a side view, (b) of FIG. 12 is a bottom view, and (c) of FIG. 12 is a cross-sectional view taken along a line F-F'.
Figure 13:
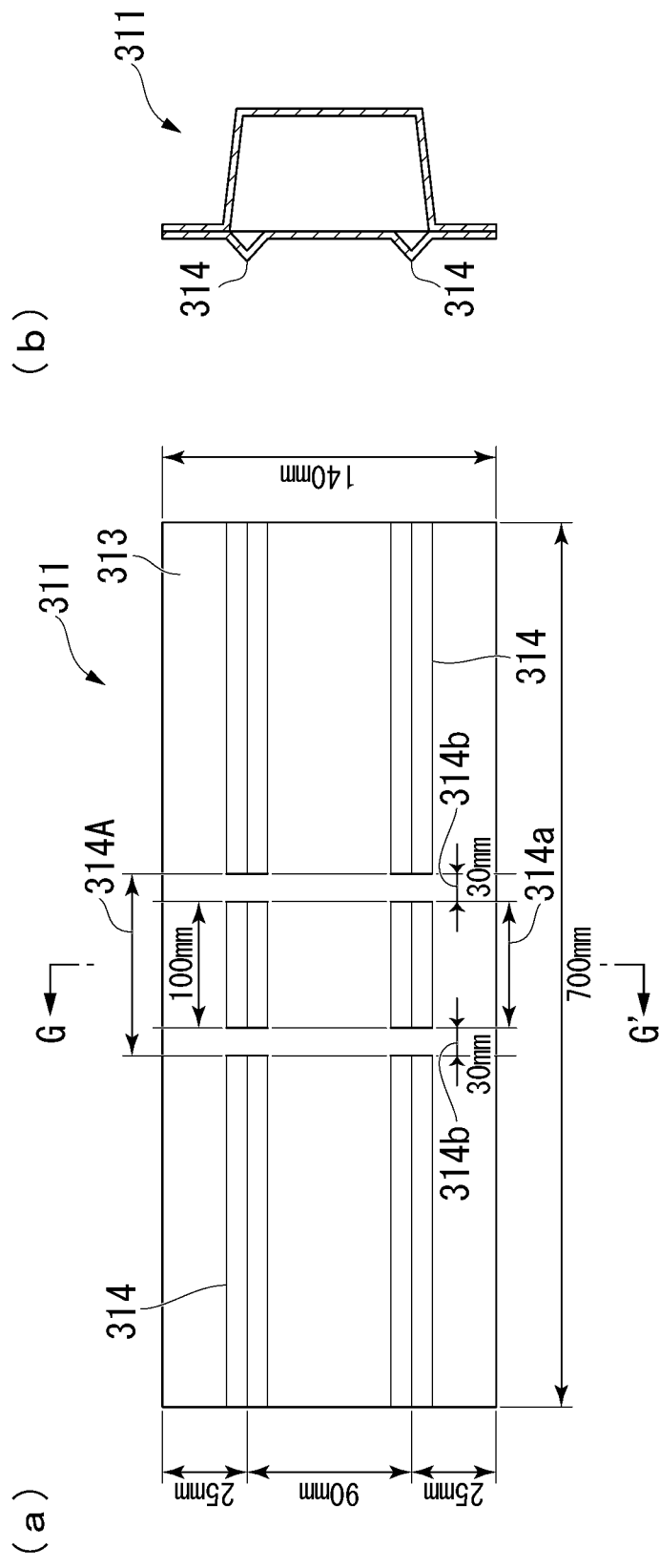
FIG. 13 is a diagram showing an invention example in the second example, wherein (a) of FIG. 13 is a bottom view, and (b) of FIG. 13 is a cross-sectional view taken along a line G-G' of (a) of FIG. 13.
Figure 14:
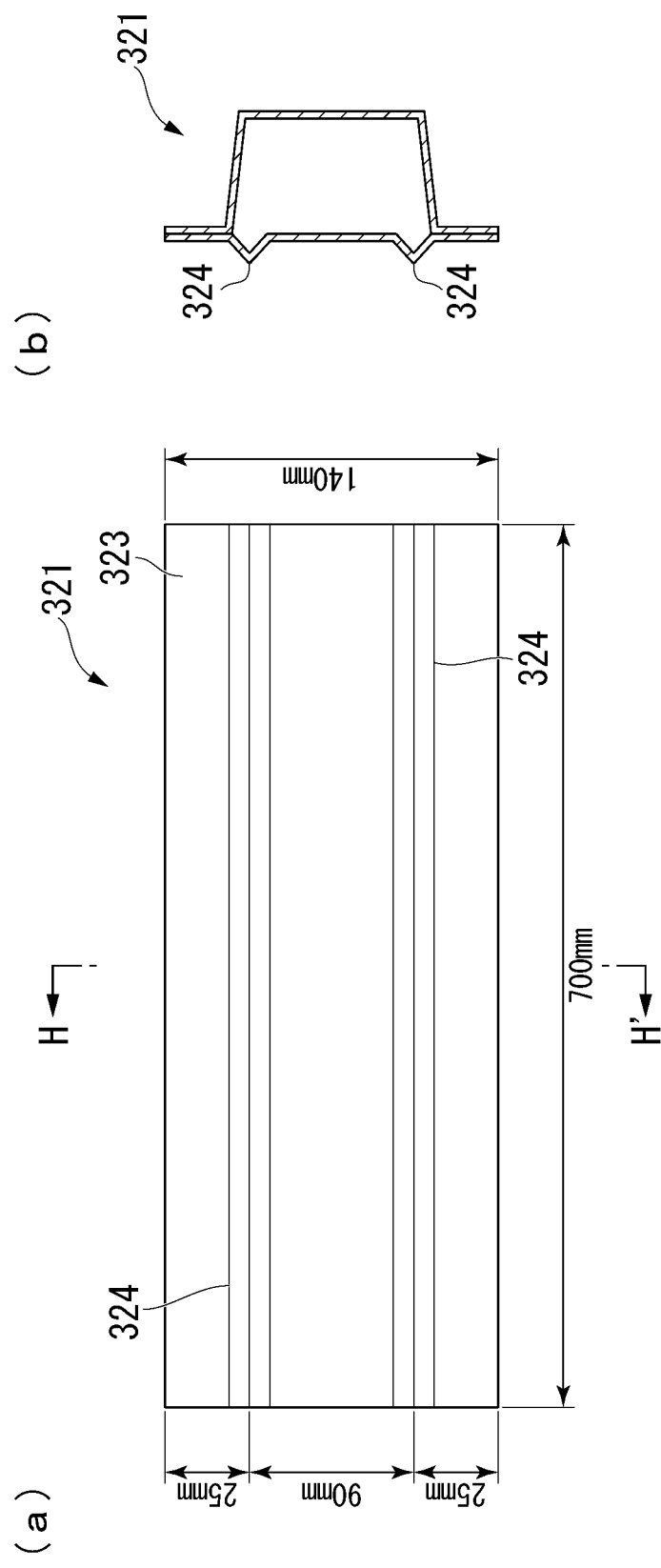
FIG. 14 is a diagram showing a comparative example in the second example, wherein (a) of FIG. 14 is a bottom view, and (b) of FIG. 14 is a cross-sectional view taken along a line H-H' of (a) of FIG. 14.
Figure 15:
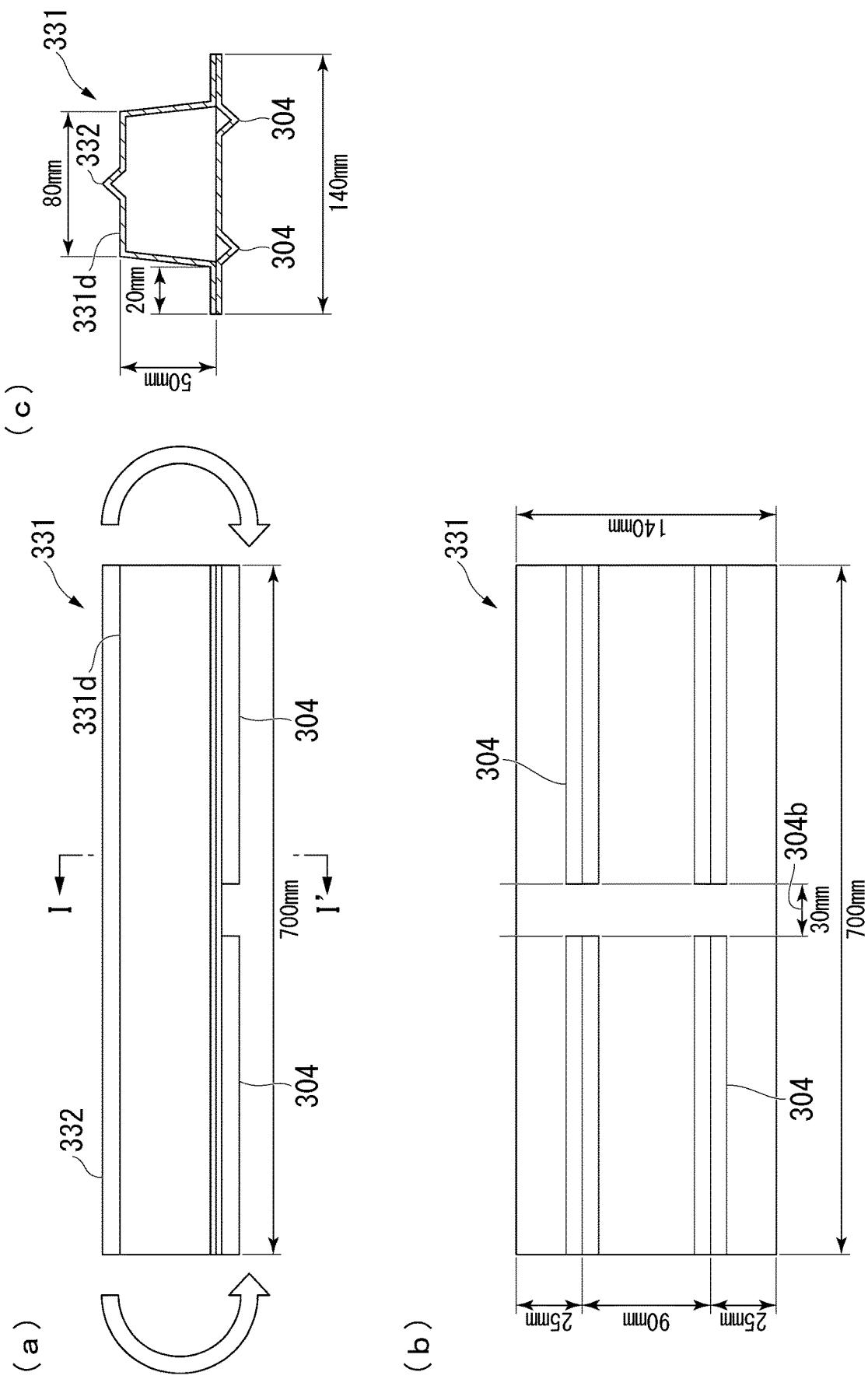
FIG. 15 is a diagram showing a comparative example in the second example, wherein (a) of FIG. 15 is a side view, (b) of FIG. 15 is a bottom view, and (c) of FIG. 15 is a cross-sectional view taken along a line I-I' of (a) of FIG. 15.
Figure 16:
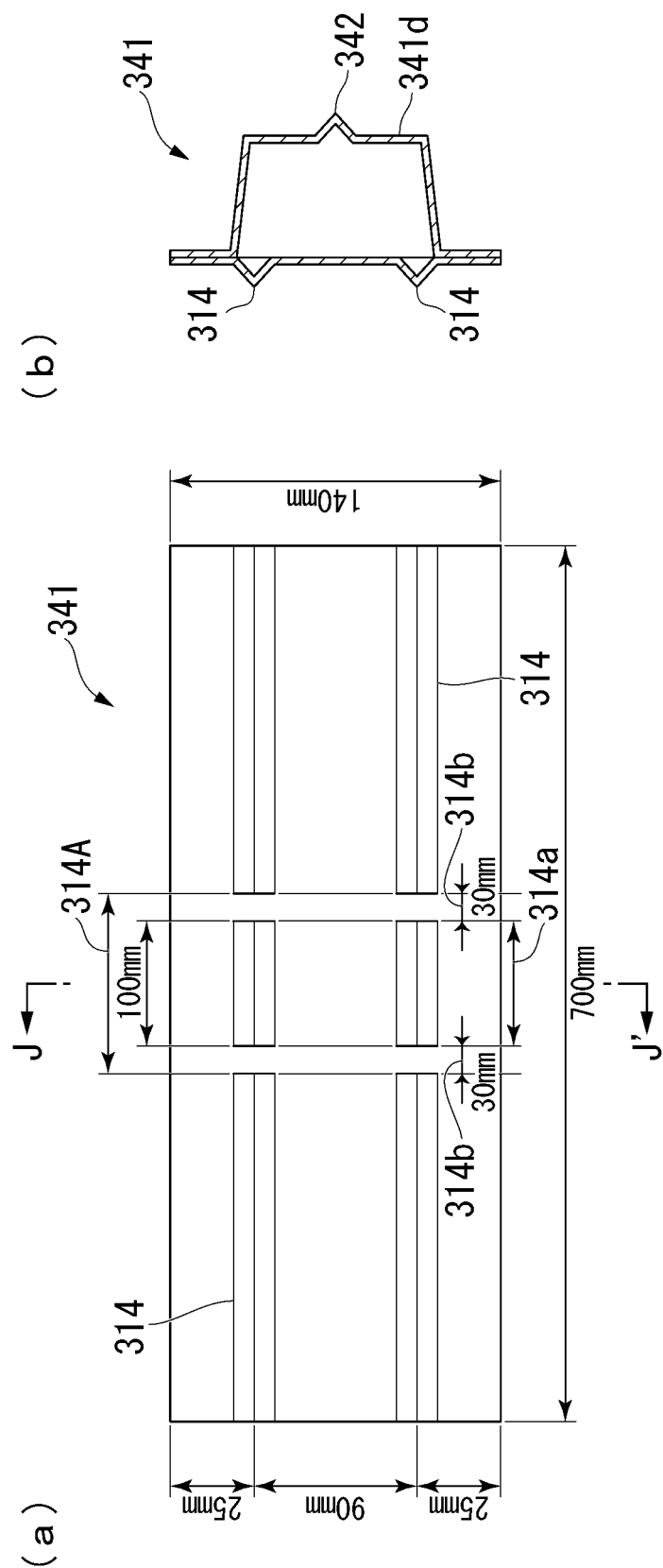
FIG. 16 is a diagram showing an invention example in the second example, wherein (a) of FIG. 16 is a bottom view, and (b) of FIG. 16 is a cross-sectional view taken along a line J-J' of (a) of FIG. 16.

In order to investigate an influence of the number of low strength sections on impact energy absorption performance, numerical analysis was performed for each of the forms shown in FIGS. 12 to 17. FIGS. 12, 14, 15, and 17 show comparative examples and FIGS. 13 and 16 show invention examples.

An impact absorbing member 301 shown in FIG. 12 includes a molded body (a hat-shaped member) 302 whose cross-sectional shape perpendicular to the longitudinal direction was a hat shape, and a plate-shaped member 303 joined to the molded body 302. Furthermore, on the plate-shaped member 303, two sets of a pair of bead sections 304 arranged side by side in the width direction and parallel to each other are formed along the longitudinal direction so as to sandwich a low strength section 304b therebetween. The low strength sections 304b are not reinforced and are flat (for example, a flat plate as they were) without the bead sections 304 formed therein. In the following description, the plate-shaped member 303 may be referred to as a "wall section 301d" and a hat top section facing the wall section 301d may be referred to as a "wall section 301a" in some cases.

The dimensions of each portion of the impact absorbing member 301 were as follows.

Full length of impact absorbing member 301: 700 mm

Width of each portion: a wall section 301d was 140 mm, a wall section 301a was 80 mm, and a flange section 302c was 20 mm Height H of molded body 302: 50 mm Dimensions and arrangements of each of bead sections 304: dimension of each of bead sections 304 was width 10 mm×height 5 mm×length 335 mm. Furthermore, a space between central positions of the pair of bead sections 304 in the width direction arranged side by side in the width direction was 90 mm. In addition, the low strength section 304b is located at one place in a center of the impact absorbing member 301 in the longitudinal direction and a length of each of the low strength section 304b in the longitudinal direction was 30 mm.

The dimensions of other constituent elements of an impact absorbing member 311 shown in FIG. 13 except for a shape of the bead section had the same dimension as those of the impact absorbing member 301.

In other words, in the impact absorbing member 311, three sets of a pair of bead sections 314 arranged side by side in the width direction of the impact absorbing member 311 and parallel to each other were formed along the longitudinal direction so as to sandwich a low strength sections 314b therebetween. Each of the low strength sections 314b was not reinforced and was flat (for example, a flat plate as it was) without the bead sections 314 formed therein.

All of the bead sections 314 had a width of 10 mm and a height of 5 mm and a space between a central position of the bead sections 314 in the width direction thereof which were adjacent to each other to be parallel to each other was 90 mm. The bead sections 314 had a total of six bead sections, i.e., four bead sections with a length of 270 mm and two bead sections with a length of 100 mm. When viewed from one direction to the other direction in the longitudinal direction of the impact absorbing member 311, the arrangement of the bead sections 314 was an arrangement in which two bead sections with a length of 270 mm, two bead sections with a space of 30 mm and a length of 100 mm, and two bead sections with a space of 30 mm and a length of 270 mm were arranged side by side. Furthermore, all of the bead sections 314 on one side of the impact absorbing member 311 in the width direction thereof were arranged on the same straight line. Similarly, all of the bead sections 314 on the other side of the impact absorbing member 311 in the width direction thereof were also arranged on the same straight line.

Therefore, the deformation guidance section 314A which includes one high strength section 314a including a pair of bead sections 314 with a length of 100 mm and a pair of low strength sections 314b having the high strength section 314a arranged therebetween and being flat (for example, a flat plate as they were) was provided at a central portion of the plate-shaped member 313 in the longitudinal direction. Moreover, four bead sections 314 with a length of 270 mm adjacent to the pair of low strength sections 314b and extending one end and the other end of the impact absorbing member 311 were provided and constituted a second high strength section.

Only a shape of bead sections of an impact absorbing member 321 shown in FIG. 14 was different from those of the impact absorbing member 301 and dimensions of the other constituent elements of the impact absorbing member 321 were the same as those of the impact absorbing member 301.

Two bead sections 324 of the impact absorbing member 321 both had a width of 10 mm and a height of 5 mm. Furthermore, a space between central positions of the bead sections 324 in the width direction thereof was 90 mm. Since both of the bead sections 324 were continuously formed from one end to the other end of the plate-shaped member 323, a constitution in which a low strength section was not formed was provided.

Constituent elements and a dimension of each portion of an impact absorbing member 331 shown in FIG. 15 were the same as those of the impact absorbing member 301 except that a bead section 332 was provided on a wall section 331d forming a hat top section. In FIG. 15, the constituent elements of the impact absorbing member 331 that were the same as those of the impact absorbing member 301 were denoted by the same reference numerals as the impact absorbing member 301 and a duplicate description thereof will be omitted. The bead section 332 had a width of 10 mm and a height of 5 mm and was formed continuously from one end to the other end of the impact absorbing member 331.

Constituent elements and a dimension of each portion of an impact absorbing member 341 shown in FIG. 16 were the same as those of the impact absorbing member 311 except that a bead section 342 was provided on a wall section 341d forming a hat top section. In FIG. 16, the constituent elements of the impact absorbing member 341 that were the same as those of the impact absorbing member 311 were denoted by the same reference numerals as the impact absorbing member 311 and a duplicate description thereof will be omitted. The bead section 342 has a width of 10 mm and a height of 5 mm and was formed continuously from one end to the other end of the impact absorbing member 341.

Figure 17:
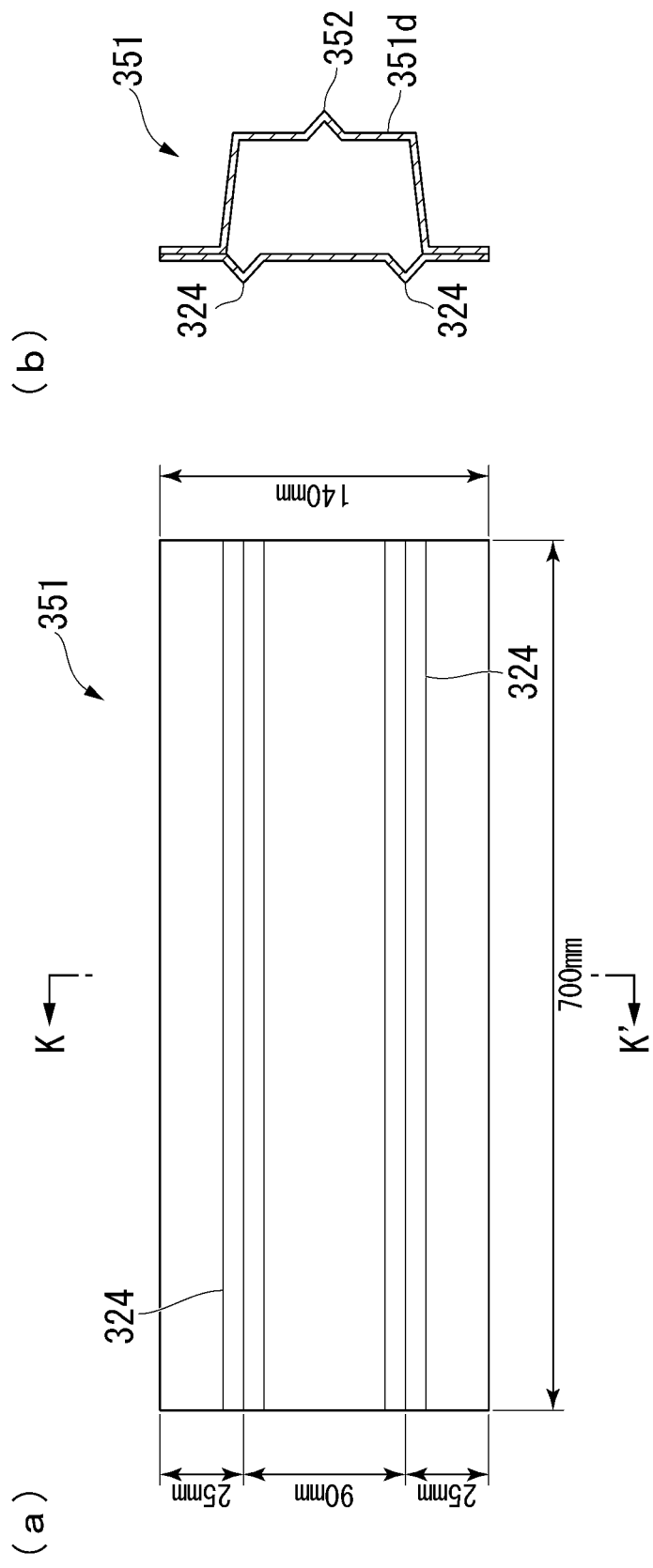
FIG. 17 is a diagram showing a comparative example in the second example, wherein (a) of FIG. 17 is a bottom view, and (b) of FIG. 17 is a cross-sectional view taken along a line K-K' of (a) of FIG. 17.

Constituent elements and a dimension of each portion of an impact absorbing member 351 shown in FIG. 17 were the same as those of the impact absorbing member 321 except that a bead section 352 was provided on a wall section 351d forming a hat top section. In FIG. 17, the constituent elements of the impact absorbing member 351 that were the same as those of the impact absorbing member 321 were denoted by the same reference numerals as the impact absorbing member 321. The bead section 352 has a width of 10 mm and a height of 5 mm and was formed continuously from one end to the other end of the impact absorbing member 351.

A force was applied to the impact absorbing members 301 (sample no. 6), 311 (sample no. 7), 321 (sample no. 8), 331 (sample no. 9), 341 (sample no. 10), and 351 (sample no. 11) which had the constitution described above while holding both ends thereof in the longitudinal direction of the impact absorbing members, for example, as indicated by arrows of (a) of FIG. 12 so that each plate-shaped member 303 side was benttobeinsidethebendingandabsorptionenergywhenbendingwasperformeduntila bending angle was 20° was obtained. The analysis results are shown in Table 2.

TABLE 2

| Sample no. | Sample | Corresponding drawing | Absorption energy at time of 20° deformation (kJ) | Rate of increase of absorption energy (%), (*) | Invention example/ Comparative example |
|---|---|---|---|---|---|
| 6 | Four bead sections in plate-shaped body (one low strength section) | FIG. 12 | 2.3 | — | Comparative example |
| 7 | Six bead sections in plate-shaped body (two low strength sections) | FIG. 13 | 3.2 | 39 | Invention example |
| 8 | Two bead sections in plate-shaped body (no low strength section) | FIG. 14 | 2.5 | 9 | Comparative example |
| 9 | Four bead sections in plate-shaped body (one low strength section) + one bead section in hat top section | FIG. 15 | 2.3 | 2 | Comparative example |
| 10 | Six bead sections in plate-shaped body (two low strength 10sections) + one bead section in hat top section | FIG. 16 | 3.2 | 39 | Invention example |

TABLE 2-continued

| Sample no. | Sample | Corresponding drawing | Absorption energy at time of 20° deformation (kJ) | Rate of increase of absorption energy (%), (*) | Invention example/ Comparative example |
|---|---|---|---|---|---|
| 11 | Two bead sections in plate-shaped body (no low strength section) + one bead section in hat top section | FIG. 17 | 2.5 | 10 | Comparative example |

(*) A rate of increase of absorption energy when an amount of impact energy to be absorbed of sample no. 6 is used as a reference As shown in Table 2, it was confirmed that rates of increase of amounts of impact energy to be absorbed of impact absorbing members 311 (sample no. 7) and 341 (sample no. 10) which were invention examples were significantly increased, as compared with impact absorbing members 301 (sample no. 6), 321 (sample no. 8), 331 (sample no. 9), and 351 (sample no. 11) which were comparative examples. Furthermore, it was also confirmed that, even when a bead section is added to a hat top section, the bead section had almost no effect on a rate of increase.

In sample nos. 6 to 11 described above, a case was confirmed in which at least a pair of bead sections were formed on a plate-shaped member to be parallel to each other and a position in a longitudinal direction of a space between bead sections for forming low strength sections was formed at the same position between both bead sections adjacent to each other.

On the other hand, a case in which bead sections were not arranged in parallel and a case in which positions of spaces in a longitudinal direction forming low strength sections are mutually shifted between bead sections adjacent to each other were examined below. That is to say, numerical analysis was performed for each of the forms shown in FIGS. 18 to 21 and comparison was performed.

Figure 18:
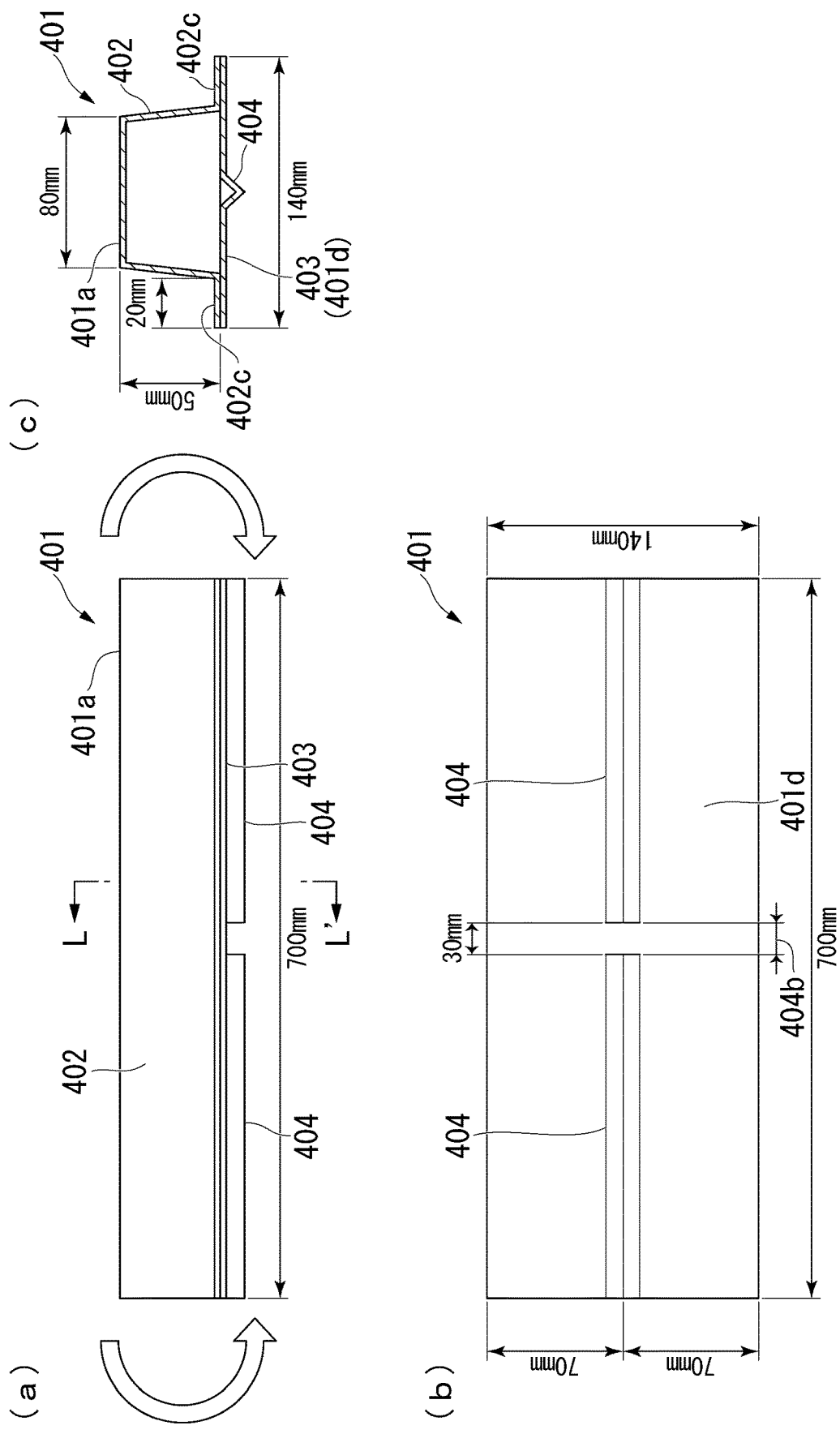
FIG. 18 is a diagram showing a comparative example in the second example, wherein (a) of FIG. 18 is a side view, (b) of FIG. 18 is a bottom view, and (c) of FIG. 18 is a cross-sectional view taken along a line L-L' of (a) of FIG. 18.

An impact absorbing member 401 shown in FIG. 18 included a molded body (a hat-shaped member) 402 whose cross-sectional shape perpendicular to the longitudinal direction was a hat shape and a plate-shaped member 403 joined to the molded body 402. Furthermore, two bead sections 404 were formed in the plate-shaped member 403 in the longitudinal direction. The bead sections 404 were formed on the same straight line and to have a space at one place in a central position of the plate-shaped member 403 in the longitudinal direction. The space was not reinforced and was flat (for example, a flat plate as it was). In the following description, the plate-shaped member 403 may be referred to as a wall section 401*d* and a hat top section facing the wall section 401*d* may be referred to as a wall section 401*a* in some cases.

The dimensions of each portion of the impact absorbing member 401 of FIG. 18 was as follows.

Full length of impact absorbing member 401: 700 mm
Width of each portion: the wall section 401*d* was 140 mm, the wall section 401*a* was 80 mm, and the flange section 402*c* was 20 mm
Height H of molded body 402: 50 mm
Dimensions and arrangements of each of bead sections 404: both of these were a width of 10 mm and a height of 5 mm. The two bead sections 404 with a length of 335 mm from one end to the other end thereof in the longitudinal direction and arranged side by side on a straight line with a space of 30 mm in the longitudinal direction were at a central position of the plate-shaped member 403 in the width direction thereof. Moreover, the space at a center in the longitudinal direction forms one low strength section 404*b*.

Figure 19:
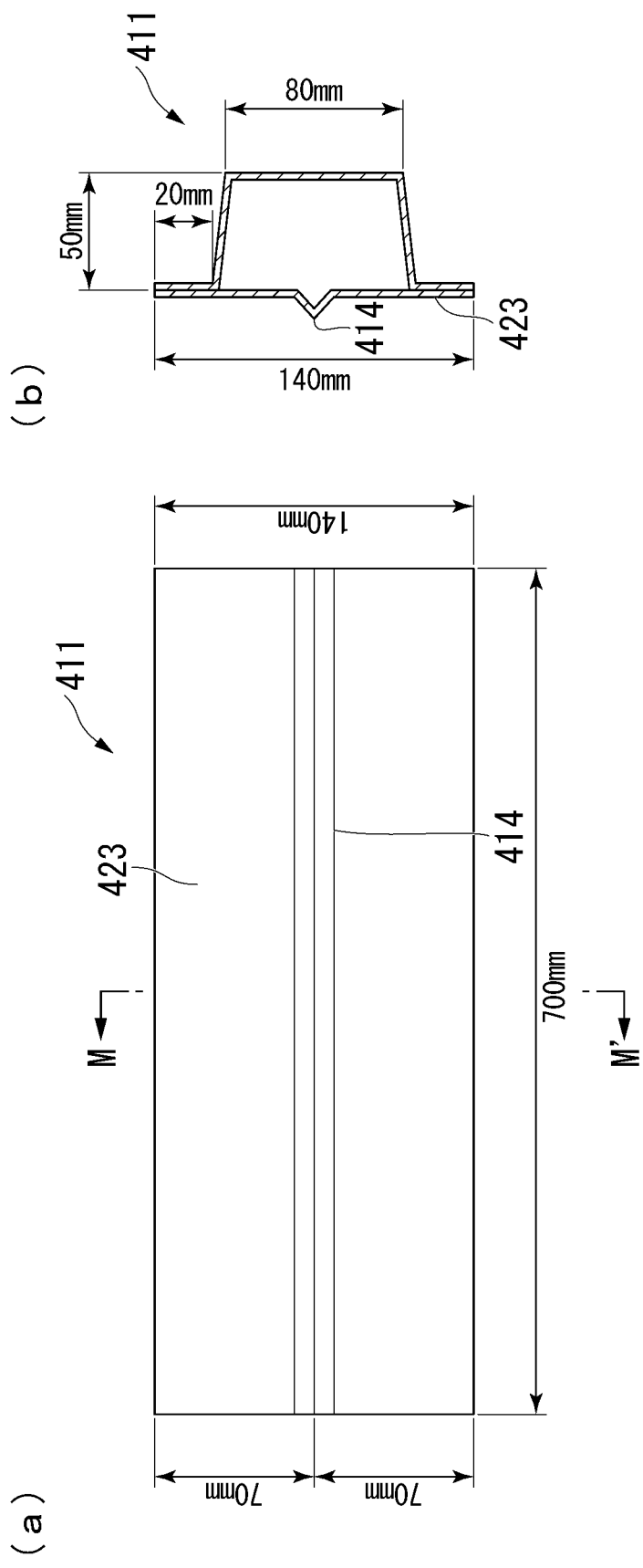
FIG. 19 is a diagram showing a comparative example in the second example, wherein (a) of FIG. 19 is a bottom view, and (b) of FIG. 19 is a cross-sectional view taken along a line M-M' of (a) of FIG. 19.

Only a shape of a bead section of an impact absorbing member 411 shown in FIG. 19 was different from that of the impact absorbing member 401 and a dimension of each of the other portions was the same as that of the impact absorbing member 401.

A bead section 414 of the impact absorbing member 411 had a width of 10 mm and a height of 5 mm. The bead section 414 had a constitution in which the bead section 414 continuously extended from one end to the other end of a center of a plate-shaped member 423 in the width direction thereof and a low strength section was not formed.

Figure 20:
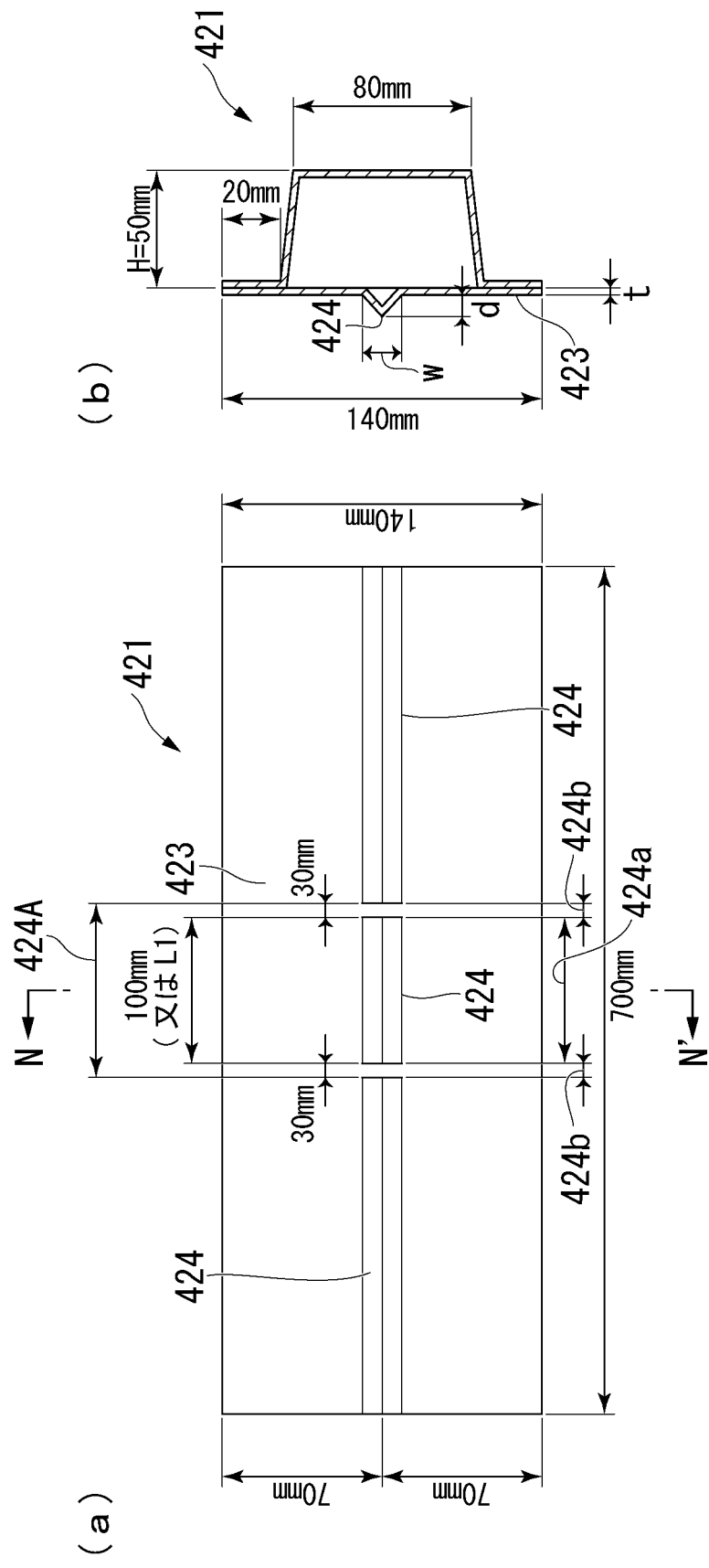
FIG. 20 is a diagram showing an invention example in the second example, wherein (a) of FIG. 20 is a bottom view, and (b) of FIG. 20 is a cross-sectional view taken along a line N-N' of (a) of FIG. 20.

A dimension of each of the other portions of an impact absorbing member 421 shown in FIG. 20 was the same as that of the impact absorbing member 401, except for a shape of a bead section.

Three bead sections 424 of the impact absorbing member 421 all had a width of 10 mm and a height of 5 mm. The bead sections 424 were arranged side by side on the same straight line from one end to the other end of a center of the plate-shaped member 423 in the width direction thereof and two spaces of 30 mm in the longitudinal direction are presented in the vicinity of the center of the plate-shaped member 423. Furthermore, the intermediate bead section 424 of the three bead sections 424 was arranged between the two spaces. Therefore, a deformation guidance section 424A which includes one high strength section 424*a* and a pair of low strength sections 424*b* having the high strength section 424*a* arranged therebetween was provided at a central portion of the plate-shaped member 423 in the longitudinal direction. Moreover, the two bead sections 474 adjacent to the pair of low strength sections 424*b* and extending to one end and the other end of the plate-shaped member 423 were provided and form second high strength sections. The spaces were not reinforced and were flat (for example, a flat plate as it was) and form the low strength sections 424*b*.

Figure 21:
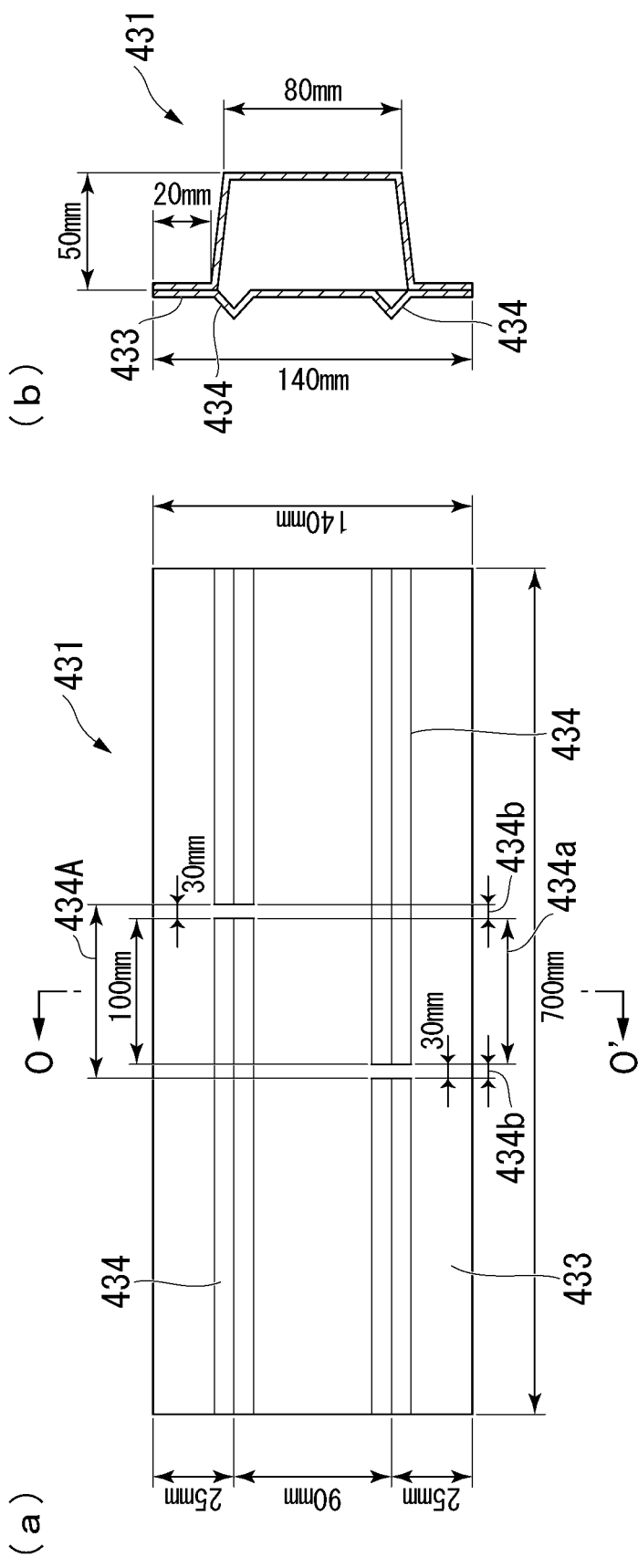
FIG. 21 is a diagram showing an invention example in the second example, wherein (a) of FIG. 21 is a bottom view, and (b) of FIG. 21 is a cross-sectional view taken along a line O-O' of (a) of FIG. 21.

The dimension of each of the other portions of an impact absorbing member 431 shown in FIG. 21 were the same as that of the impact absorbing member 401, except for a shape of a bead section.

In the impact absorbing member 431, two sets of pairs of bead sections 434 arranged side by side in the width direction of the impact absorbing member 431 and parallel to each other were formed to have spaces. The spaces were not reinforced and were flat (for example, a flat plate as it was).

The bead sections 434 included a total of four bead sections 434, i.e., two bead sections 434 with a length of 270 mm and two bead sections 434 with a length of 400 mm and all of these had a width of 10 mm and a height of 5 mm. A space between central positions of the bead sections 434 in the width direction thereof having a positional relationship in which the bead sections 434 were adjacent to each other to be parallel to each other was 90 mm. Moreover, one bead section 434 with a length of 270 mm and one bead section 434 with a length of 400 mm were arranged side by side on the same straight line to have a space of 30 mm. In addition, two sets of such combinations were formed in parallel with each other and adjacent to each other. Here, with regard to the spaces, the positions of the impact absorbing member 431 in the longitudinal direction were relatively shifted and the shifted portion is a high strength section 434*a*.

Therefore, a deformation guidance section 434A which includes one high strength section 434a and a pair of low strength sections 434b having the high strength section 434a arranged therebetween was provided at a central portion of a plate-shaped member 433 in a longitudinal direction.

A force was applied to impact absorbing members 401 (sample no. 12), 411 (sample no. 13), 421 (sample no. 14), and 431 (sample no. 15) which have the constitution described above while holding both ends thereof in the longitudinal direction of the impact absorbing members, for example, as indicated by arrows of (a) of FIG. 18 so that each plate-shaped member side was bent to be inside the bending and absorption energy when bending was performed until a bending angle was 20 was obtained. The analysis results are shown in Table 3.

TABLE 3

| Sample no. | Sample | Corresponding drawing | Absorption energy at time of 20° deformation (kJ) | Rate of increase of absorption energy (%), (*) | Invention example/ Comparative example |
|---|---|---|---|---|---|
| 12 | One bead section in plate-shaped body (one low strength section) | FIG. 18 | 2.3 | — | Comparative example |
| 13 | One bead section in plate-shaped body (no low strength section) | FIG. 19 | 2.5 | 9 | Comparative example |
| 14 | Three bead sections in plate-shaped body (two low strength sections) | FIG. 20 | 3.2 | 39 | Invention example |
| 15 | Four bead sections in plate-shaped body (two low strength sections) | FIG. 21 | 3.4 | 47 | Invention example |

(*) A rate of increase of absorption energy when an amount of impact energy to be absorbed of sample no. 12 is used as a reference As shown in sample nos. 12 to 14 in Table 3, it was confirmed that a rate of increase of absorption energy of the impact absorbing member 421 (sample no. 14) of an invention example in which two low strength sections are provided was significantly increased, as compared with the impact absorbing members 401 (sample no. 12) and 411 (sample no. 13) which were comparative examples. Furthermore, as shown in the results of the impact absorbing member 431 (sample no. 15), it was confirmed that, even when the pair of low strength sections 434b were formed by shifting a relative position of spaces between the bead sections 434, similarly high rates of increase were obtained.

In the sample nos. 12 to 15 described above, a case in which the bead section was formed in the plate-shaped member and bending deformation was caused to occur so that the plate-shaped member was inside the bending was confirmed. On the other hand, a case in which the bead section was provided in the hat top section (the web section) and bending deformation was caused to occur so that the hat top section was inside the bending will be examined below. That is to say, numerical analysis was performed for each of the forms shown in FIGS. 22 to 25 and comparison was performed. In Table 4 which will be described later, as a reference, the same case as the sample no. 15 is shown as sample no. 19.

Figure 22:
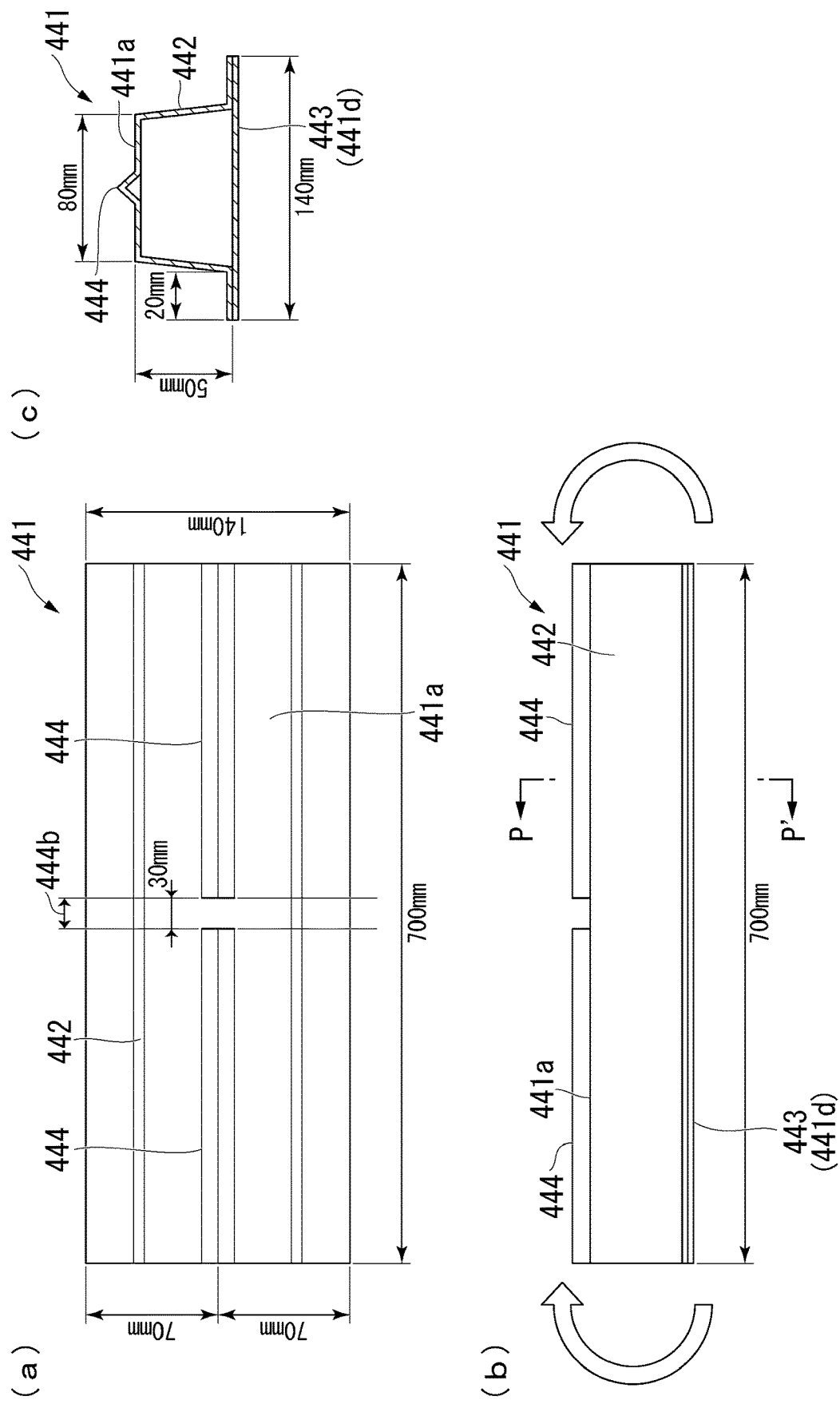
FIG. 22 is a diagram showing a comparative example in the second example, wherein (a) of FIG. 22 is a plan view, (b) of FIG. 22 is a side view, and (c) of FIG. 22 is a cross-sectional view taken along a line P-P' of (b) of FIG. 22.

An impact absorbing member 441 shown in FIG. 22 includes a molded body (a hat-shaped member) 442 whose cross-sectional shape perpendicular to the longitudinal direction was a hat shape and a plate-shaped member 443 joined to the molded body 442. Furthermore, two bead sections 444 were formed on a wall section 441a which was a hat top section of the molded body 442 in the longitudinal direction. The two bead sections 444 were arranged side by side on the same straight line to have a space from one end to the other end of a center of the wall section 441a in the width direction thereof. The space was not reinforced using a bead section and was flat (for example, a flat plate as it was).

The dimensions of each portion of the impact absorbing member 441 of FIG. 22 were as follows.

Full length of impact absorbing member 441: 700 mm
Width of each portion: a wall section 441d was 140 mm, the wall section 441a was 80 mm, and the flange section 442c was 20 mm
Height H of molded body 442: 50 mm
Dimensions and arrangements of bead sections 444: at a central position of the wall section 441a in the width direction thereof, two bead sections 444 with a length of 335 mm from one end to the other end in the longitudinal direction were arranged side by side on the same straight line in a state of having a space of 30 mm in the longitudinal direction. Furthermore, both of the bead sections 444 had a width of 10 mm and a height of 5 mm. In addition, one low strength section 444b was formed using the space.

Figure 23:
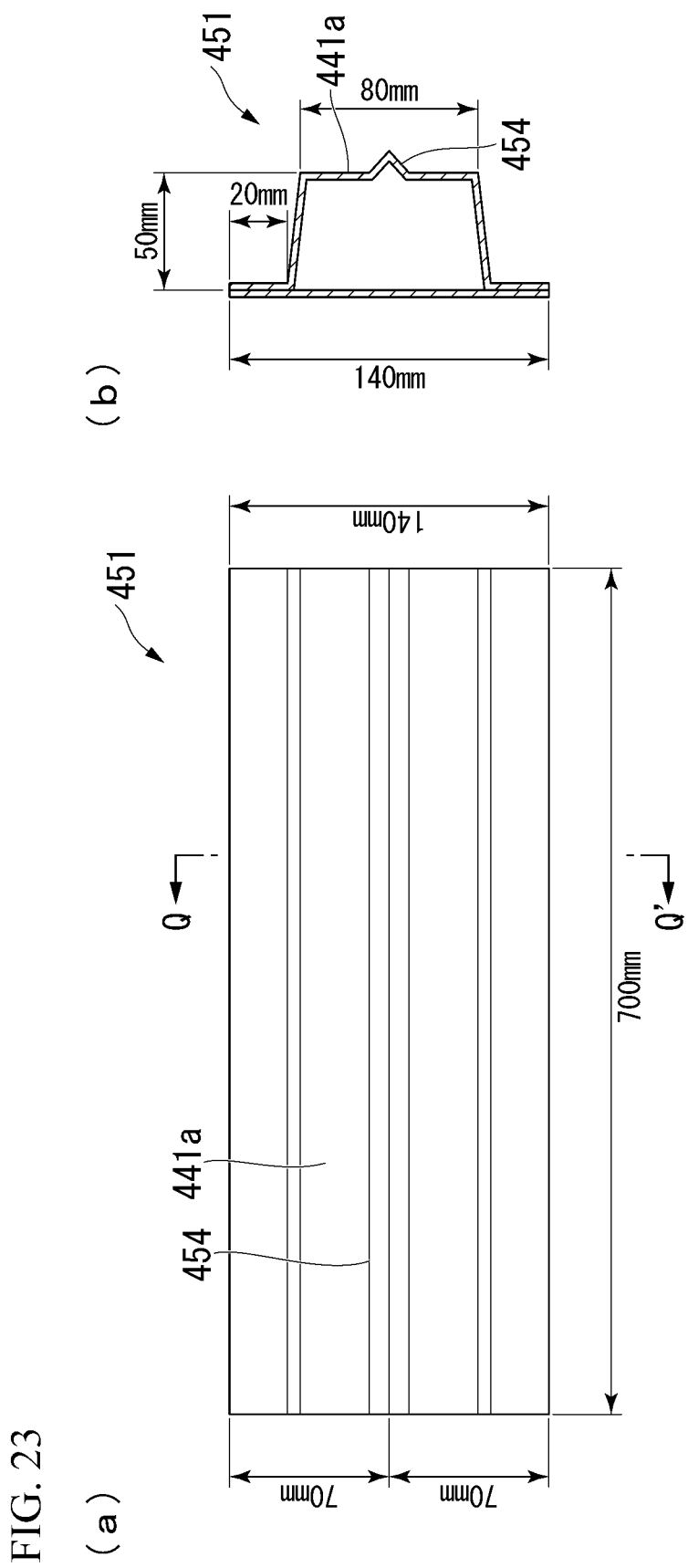
FIG. 23 is a diagram showing a comparative example in the second example, wherein (a) of FIG. 23 is a plan view, and (b) of FIG. 23 is a cross-sectional view taken along a line Q-Q' of (a) of FIG. 23.

Only a shape of a bead section of an impact absorbing member 451 shown in FIG. 23 was different from that of the impact absorbing member 441 and a dimension of each of the other portions was the same as that of the impact absorbing member 441.

A bead section 454 of the impact absorbing member 451 had a width of 10 mm and a height of 5 mm. The bead section 454 had a constitution in which the bead section 454 extended continuously from one end to the other end of a center of the wall section 441a in the width direction thereof and a low strength section is not formed.

Figure 24:
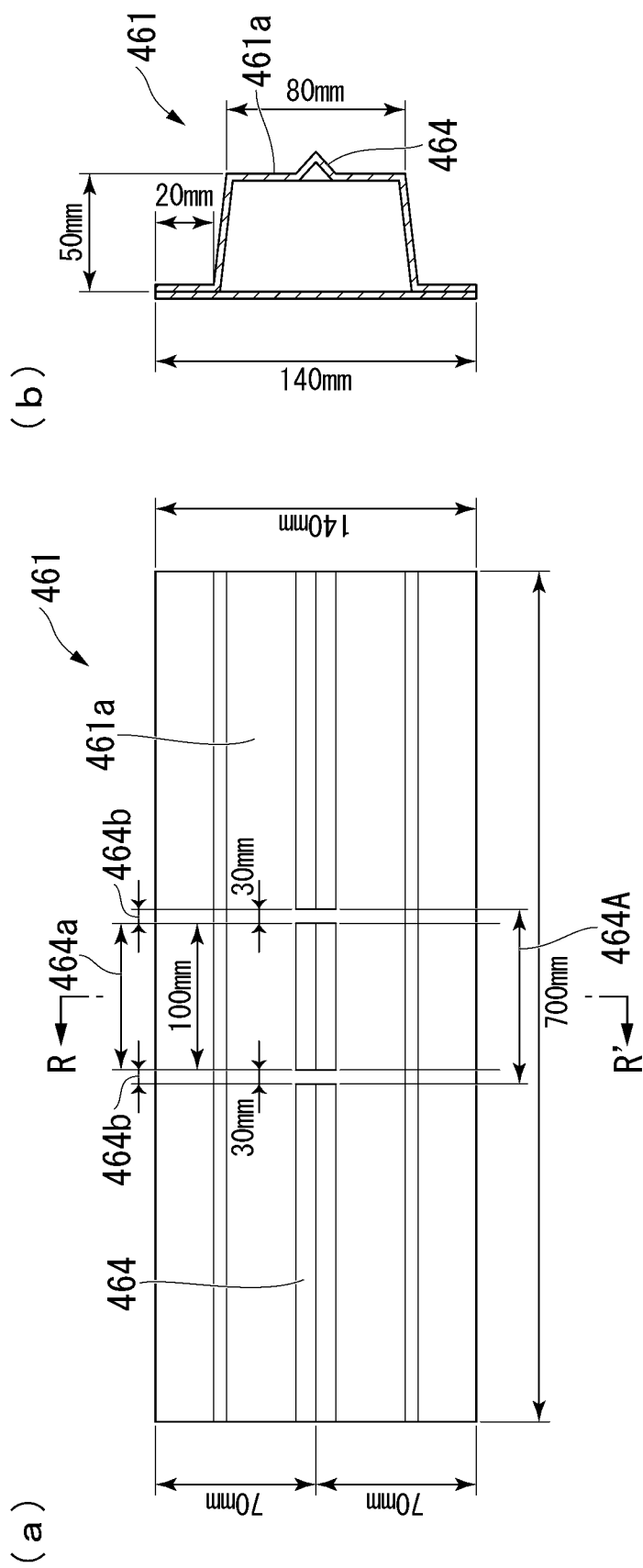
FIG. 24 is a diagram showing an invention example in the second example, wherein (a) of FIG. 24 is a plan view, and (b) of FIG. 24 is a cross-sectional view taken along a line R-R' of (a) of FIG. 24.

The dimensions of each of the other portions of an impact absorbing member 461 shown in FIG. 24 were the same as that of the impact absorbing member 441, except for a shape of a bead section.

The impact absorbing member 461 had three bead sections 464 and all of the bead sections 464 had a width of 10 mm and a height of 5 mm. The bead sections 464 were arranged side by side on the same straight line from one end to the other end of a center of the wall section 461a in the width direction thereof and two spaces of 30 mm in the longitudinal direction are provided in the vicinity of the center thereof. Furthermore, the intermediate bead section 464 of the three bead sections 464 was arranged between the two spaces. Therefore, a deformation guidance section 464A which included one high strength section 464a and a pair of low strength sections 464b having the high strength section 464a arranged therebetween was provided at a central portion of the wall section 461a in the longitudinal direction.

Figure 25:
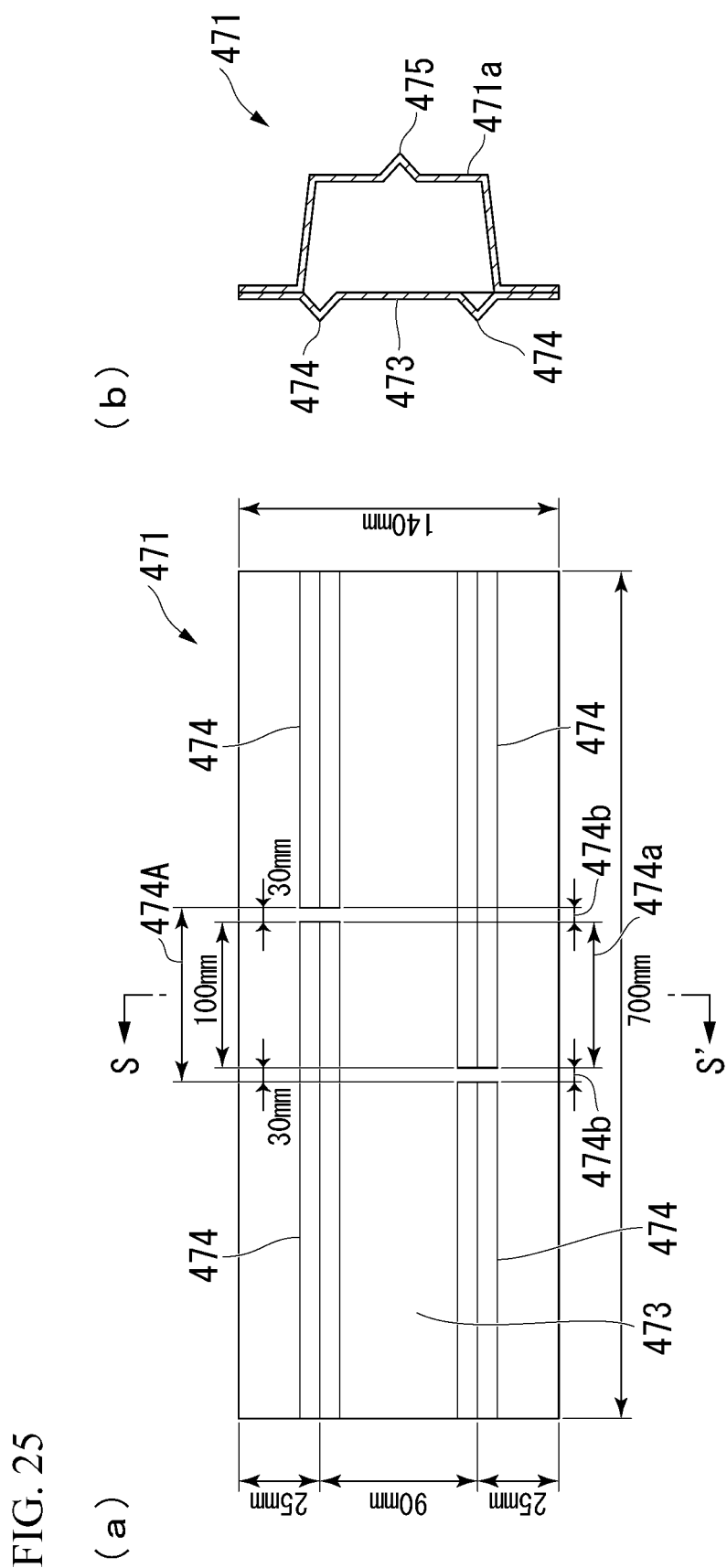
FIG. 25 is a diagram showing an invention example in the second example, wherein (a) of FIG. 25 is a bottom view, and (b) of FIG. 25 is a cross-sectional view taken along a line S-S' of (a) of FIG. 25.

The dimensions of each of the other portions of an impact absorbing member 471 shown in FIG. 25 were the same as that of the impact absorbing member 441, except for a shape of a bead section.

One bead section 475 was provided on a wall section 471a of the impact absorbing member 471 from one end to the other end in the longitudinal direction. Furthermore, four bead sections 474 were provided in the plate-shaped member 473 of the impact absorbing member 471.

The bead section 475 had a length of 700 mm, a width of 10 mm, and a height of 5 mm.

On the other hand, the bead sections 474 included a total of four bead sections 474, i.e., two bead sections 474 with a length of 270 mm and two bead sections 474 with a length of 400 mm and all of these had a width of 10 mm and a height of 5 mm. A space between central positions in the width direction of the bead sections 474 having a positional relationship in which the bead sections 474 were adjacent to each other to be parallel to each other was 90 mm. Furthermore, one bead section 474 with a length of 270 mm and one bead section 474 with a length of 400 mm were arranged side by side on the same straight line to have a space of 30 mm. In addition, two sets of such combinations were formed to be parallel to each other and adjacent to each other. Here, with regard to the space, positions of the impact absorbing member 471 in the longitudinal direction were relatively shifted and the shifted portion is a high strength section 474a. The space was not reinforced and was flat (for example, a flat plate as it was).

Therefore, a deformation guidance section 474A which includes one high strength section 474a and a pair of low strength sections 474b having the high strength section 474a arranged therebetween was provided at a central portion of the plate-shaped member 473 in the longitudinal direction.

A force was applied to impact absorbing members 441 (sample no. 16), 451 (sample no. 17), 461 (sample no. 18), and 471 (sample no. 19) which have the constitution described above while holding both ends thereof in the longitudinal direction of the impact absorbing members, for example, as indicated by arrows of (b) of FIG. 22 so that each hat top section side was bent to be inside the bending and absorption energy when bending was performed until a bending angle was 20 was obtained. The analysis results are shown in Table 4.

TABLE 4

| Sample no. | Sample | Corresponding drawing | Absorption energy at time of 20° deformation (kJ) | Rate of increase of absorption energy (%), (*) | Invention example/ Comparative example |
|---|---|---|---|---|---|
| 16 | Two bead sections in hat top section (one low strength section) | FIG. 22 | 2.3 | — | Comparative example |
| 17 | One bead section in hat top section (no low strength section) | FIG. 23 | 2.5 | 9 | Comparative example |
| 18 | Three bead sections in hat top section (two low strength sections) | FIG. 24 | 3.2 | 39 | Invention example |
| 19 | One bead section in hat top section + four bead sections in plate-shaped body (two low strength sections) | FIG. 25 | 3.4 | 47 | Invention example |

(*) A rate of increase of absorption energy when an amount of impact energy to be absorbed of sample no. 16 is used as a reference As shown in sample nos. 16 to 19 of FIG. 4, even when a place in which a bead section is formed was a hat top section, it was confirmed that a rate of increase of the impact absorbing member 461 (sample no. 18) which was an invention example in which two low strength sections were provided was significantly increased, as compared with the impact absorbing members 441 (sample no. 16) and 451 (sample no. 17) which were comparative examples. Furthermore, it was also confirmed that the impact absorption performance using the impact absorbing member 461 (sample no. 18) was increased as high as that of the impact absorbing member 471 (sample no. 19).

Third Example

When bead sections were provided at both a plate-shaped member of an impact absorbing member and a hat top section facing the plate-shaped member and flat regions (here, unprocessed portions of a flat plate as it was) remained in the bead sections, an influence of a separation distance of each of the unprocessed portions in the longitudinal direction on the impact energy absorption performance was investigated. That is to say, numerical analysis was performed while changing a separation space L2 shown in FIG. 26.

Figure 26:
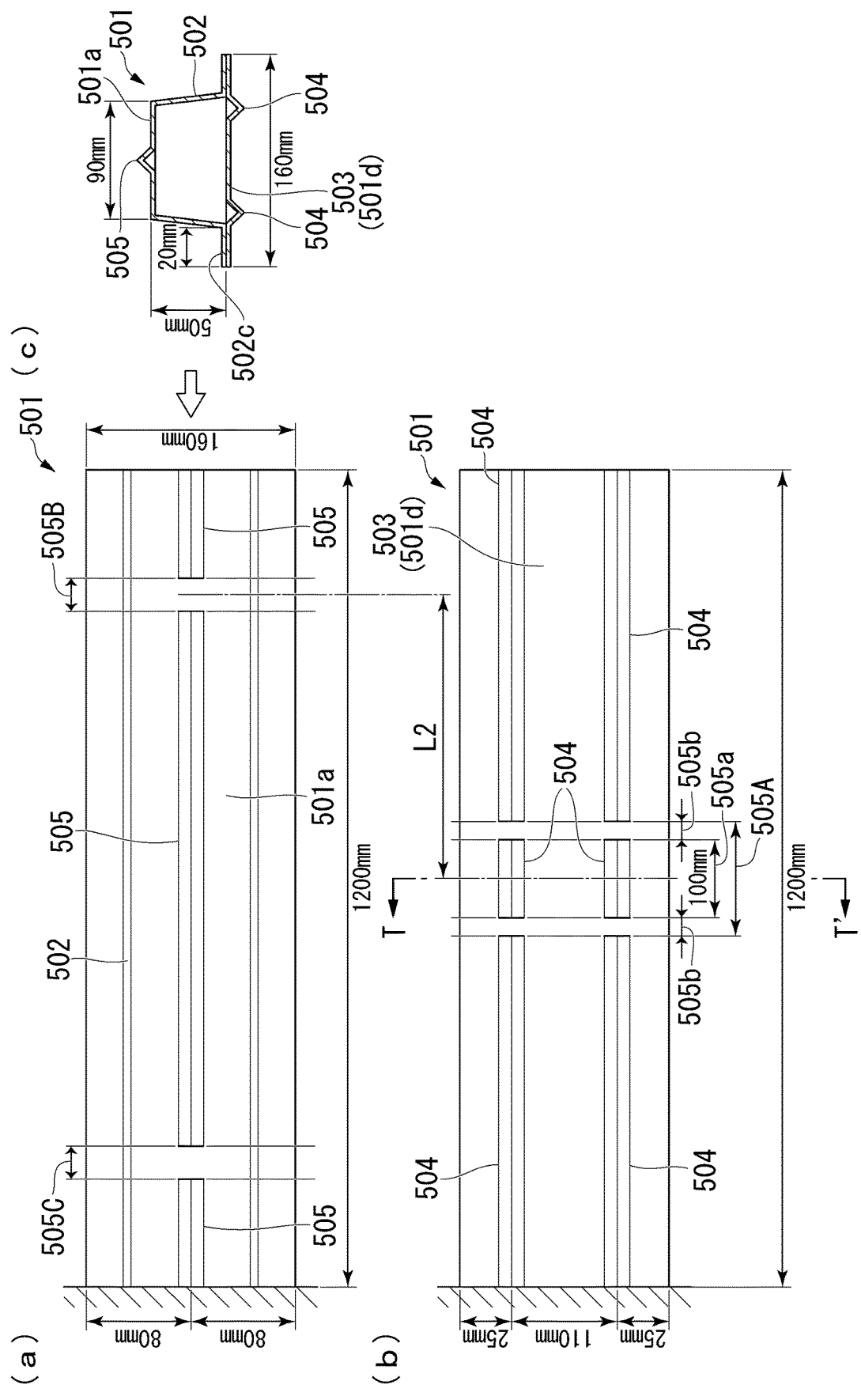
FIG. 26 is a diagram showing an invention example in a third example, wherein (a) of FIG. 26 is a plan view, (b) of FIG. 26 is a bottom view, and (c) of FIG. 26 is a cross-sectional view taken along a line T-T' of (b) of FIG. 26.

An impact absorbing member 501 shown in FIG. 26 includes a molded body (a hat-shaped member) 502 whose cross-sectional shape perpendicular to the longitudinal direction was a hat shape and a plate-shaped member 503 joined to the molded body 502.

Also, three sets of pairs of bead sections 504 arranged side by side in the width direction of the plate-shaped member 503 and parallel to each other were formed in the plate-shaped member 503 to have the two low strength sections 505b arranged therebetween in the longitudinal direction. Each of the low strength sections 505b was not reinforced and was flat (for example, a flat plate as it was) without a bead section 504 to be formed.

All of the bead sections 504 had a width of 10 mm and a height of 5 mm and a space between central positions of the bead sections 504 in the width direction thereof which were adjacent to each other to be parallel to each other was 110 mm. The bead sections 504 includes a total of six bead sections 504, i.e., four bead sections 504 with a length of 530 mm and two bead sections 504 with a length of 100 mm. The bead sections 504 were arranged so that two bead sections 504 with a length of 530 mm, two bead sections 504 with a space of 20 mm and a length of 100 mm, and two bead sections 504 with a space of 20 mm and a length of 530 mm were arranged side by side when viewed from one side to the other side of the impact absorbing member 501 in the longitudinal direction. Furthermore, all of the bead sections 504 on one side of the impact absorbing member 501 in the width direction thereof were arranged side by side on the same straight line. Similarly, all of the bead sections 504 on the other side of the impact absorbing member 501 in the width direction thereof were also arranged side by side on the same straight line.

Therefore, a deformation guidance section 505A which includes one high strength section 505a formed of a pair of bead sections 504 with a length of 100 mm and a pair of flat (for example, a flat plate as it was) strength sections 505b having the high strength section 505a arranged therebetween was provided at a central portion of the plate-shaped member 503 in the longitudinal direction. Furthermore, the two bead sections 504 adjacent to the pair of low strength sections 505b and extending to one end and the other end of the plate-shaped member 503 were provided and formed second high strength sections.

Three bead sections 505 were also formed on a wall section 501a which was a hat top section of the molded body 502. The bead sections 505 were formed to be arranged side by side on a straight line from one end of to the other end in the longitudinal direction at a center of the wall section 501a in the width direction thereof. A space of 20 mm was provided between the bead sections 505 which were adjacent to each other and only this portion was not reinforced and was flat (for example, a flat plate as it was). As a result, a deformation guidance section 505B formed of one low strength section and a deformation guidance section 505C formed of one low strength section were provided in the vicinity of both ends of the wall section 501a in the longitudinal direction. Moreover, when the impact absorbing member 501 was viewed in the longitudinal direction, relative positions of the deformation guidance section 505A and the deformation guidance section 505B were separated from each other. Similarly, relative positions of the deformation guidance section 505A and the deformation guidance section 505C were also separated from each other. To be more specific, when the impact absorbing member 501 was viewed in the longitudinal direction, a separation distance L2 was provided between a central position of the high strength section 505a of the deformation guidance section 505A and a central position of the deformation guidance section 505B. Similarly, a separation distance L2 was also provided between a central position of the high strength section 505a of the deformation guidance section 505A and a central position of the deformation guidance section 505C.

Numerical analysis was performed on the impact absorbing members (sample nos. 20 to 26) in which a separation distance L2 was changed within the range of 100 mm to 400 mm. Other shapes were the same and set as follows. The analysis results are shown in Table 5 which will be shown later.

Full length of impact absorbing member 501: 1200 mm

Width of each portion: a wall section 501d was 160 mm, a wall section 501a was 90 mm, and a flange section 502c was 20 mm Height H of molded body 502: 50 mm Dimensions and arrangements of bead sections 504 and 505: both had a width of 10 mm and a height of 5 mm. A length of a portion serving as a high strength section 505a was 100 mm and a length of an unprocessed portion serving as a low strength sections 505b was 20 mm. Similarly, a length of deformation guidance sections 505B and 505C (unprocessed portions) formed as low strength sections was also 20 mm.

TABLE 5

| Sample no. | Condition: L (mm) | Corresponding drawing | Absorption energy at time of 100 mm deformation (kJ) | Invention example/ Comparative example |
|---|---|---|---|---|
| 20 | 100 | FIG. 26 | 6.1 | Invention example |
| 21 | 150 | FIG. 26 | 6.2 | Invention example |
| 22 | 200 | FIG. 26 | 6.8 | Invention example |
| 23 | 250 | FIG. 26 | 6.9 | Invention example |
| 24 | 300 | FIG. 26 | 6.9 | Invention example |
| 25 | 350 | FIG. 26 | 5.0 | Invention example |
| 26 | 400 | FIG. 26 | 4.8 | Invention example |

As shown in sample nos. 20 to 24 of Table 5, it was confirmed that the impact energy absorption performance was increased until the separation distance L2 reached 300 mm if the separation distance L2 was gradually increased from 100 mm. When this point was expressed using a ratio of the separation distance L2 and the height H of the molded body 302 of 50 mm, it was confirmed that the impact energy absorption performance was gradually increased as L2/H was increased from 2.0 to 6.0.

On the other hand, as shown in sample nos. 25 and 26 of Table 5, it was confirmed that the impact energy absorption performance was decreased if the separation distance L2 exceeded 300 mm. That is to say, in terms of L2/H, when L2/H exceeded 6.0, it was confirmed that the impact energy absorption performance was decreased.

From the above results, it was found that it is desirable to adopt 6.0 or less as L2/H.

In sample nos. 20 to 26 described above, the pair of bead sections 504 which were adjacent to each other in the width direction thereof were provided in the plate-shaped member 503. On the other hand, a case in which three bead sections were provided in the plate-shaped member and the bead sections were arranged on the same straight line was confirmed below. That is to say, as shown in (a) to (c) of FIG. 27, numerical analysis was performed on an impact absorbing member 511 in which a molded body (a hat-shaped member) 512 whose cross-sectional shape perpendicular to the longitudinal direction was a hat shape and a plate-shaped member 513 joined to the molded body 512 were provided and three bead sections 514 and 515 were provided for each of both the plate-shaped member 513 and a wall section 511a.

The other shapes were the same as those of the impact absorbing member 501 described above and set as follows. The analysis results are shown in Table 6.

Full length of impact absorbing member 511: 1200 mm

Width of each portion: a wall section 511d was 160 mm, a wall section 511a was 90 mm, and a flange section 512c was 20 mm Height H of molded body 512: 50 mm Dimensions and arrangements of bead sections 514 and 515: both had a width of 10 mm and a height of 5 mm. The length of a portion which was a high strength section 515a was 100 mm and a length of an unprocessed portion which was a low strength section 515b was 20 mm. Similarly, the length of deformation guidance sections 515B and 515C which were unprocessed portions formed as low strength sections was also 20 mm.

TABLE 6

| Sample no. | Condition: L2 (mm) | Corresponding drawing | Absorption energy at time of 100 mm deformation (kJ) | Invention example/ Comparative example |
|---|---|---|---|---|
| 27 | 100 | FIG. 27 | 6.0 | Invention example |
| 28 | 150 | FIG. 27 | 6.1 | Invention example |
| 29 | 200 | FIG. 27 | 6.6 | Invention example |
| 30 | 250 | FIG. 27 | 6.8 | Invention example |
| 31 | 300 | FIG. 27 | 6.8 | Invention example |
| 32 | 350 | FIG. 27 | 5.1 | Invention example |
| 33 | 400 | FIG. 27 | 4.8 | Invention example |

As shown in sample nos. 27 to 31 of Table 6, it was confirmed that the impact energy absorption performance was increased until the separation distance L2 reached 300 mm if the separation distance L2 was gradually increased from 100 mm. When this point was expressed by a ratio of the separation distance L2 to a height H of the molded body 512 of 50 mm, it was confirmed that the impact energy absorption performance was gradually increased when L2/H was increased from 2.0 to 6.0.

On the other hand, as shown in sample nos. 32 and 33 of Table 6, it was confirmed that the impact energy absorption performance was decreased if the separation distance L2 exceeded 300 mm. That is to say, in terms of L2/H, it was confirmed that the impact energy absorption performance was decreased when L2/H exceeded 6.0.

Figure 27:
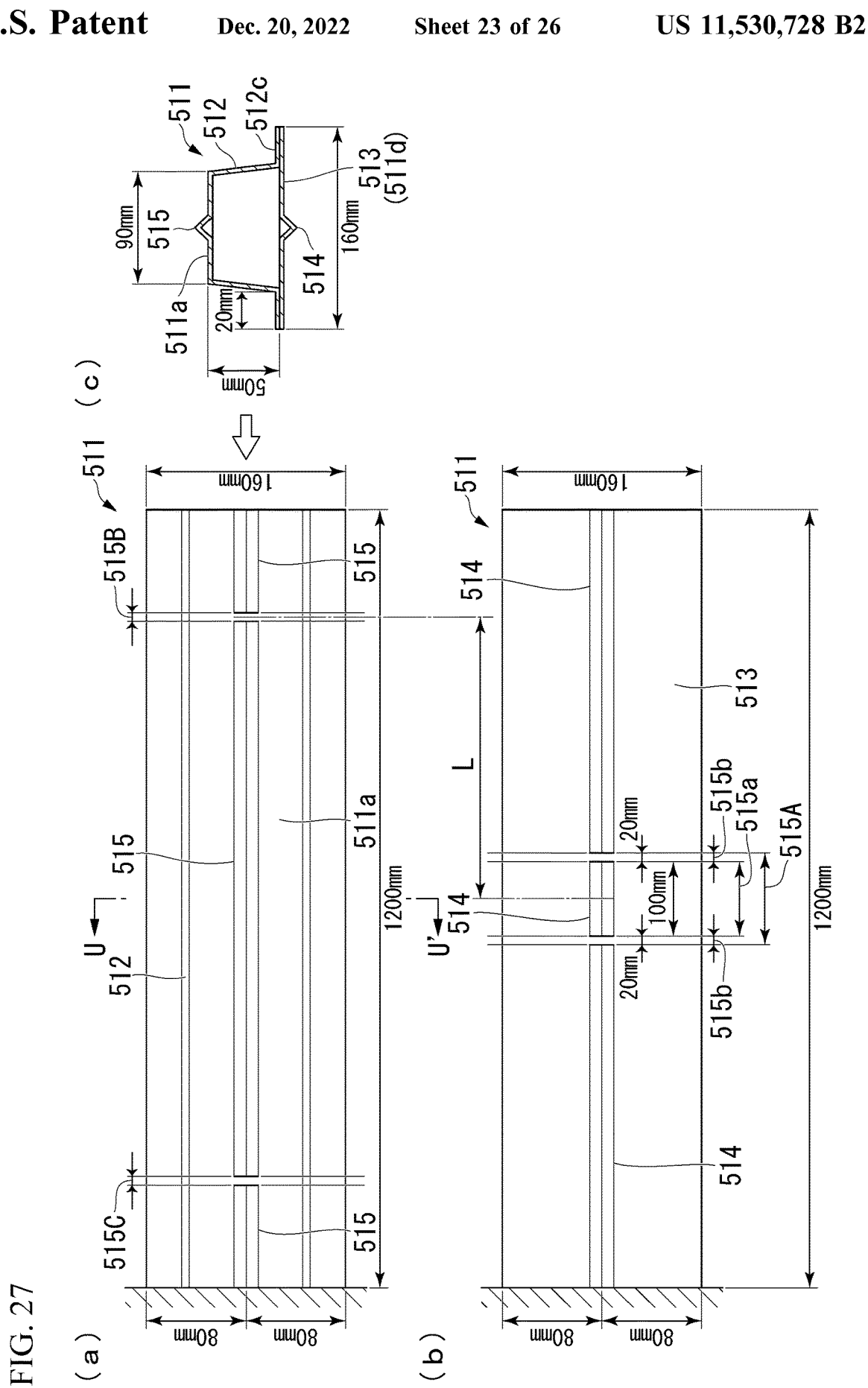
FIG. 27 is a diagram showing an invention example in the third example, wherein (a) of FIG. 27 is a plan view, (b) of FIG. 27 is a bottom view, and (c) of FIG. 27 is a cross-sectional view taken along a line U-U' of (a) of FIG. 27.

From the above results, it was found that also in the impact absorbing member 511 shown in FIG. 27, it is desirable to adopt 6.0 or less of L2/H. Therefore, it was confirmed from the results of Tables 5 and 6 that a length of the separation distance L2 was more dominant than the number of bead sections in view of the impact energy absorption performance.

Fourth Example

Figure 28:
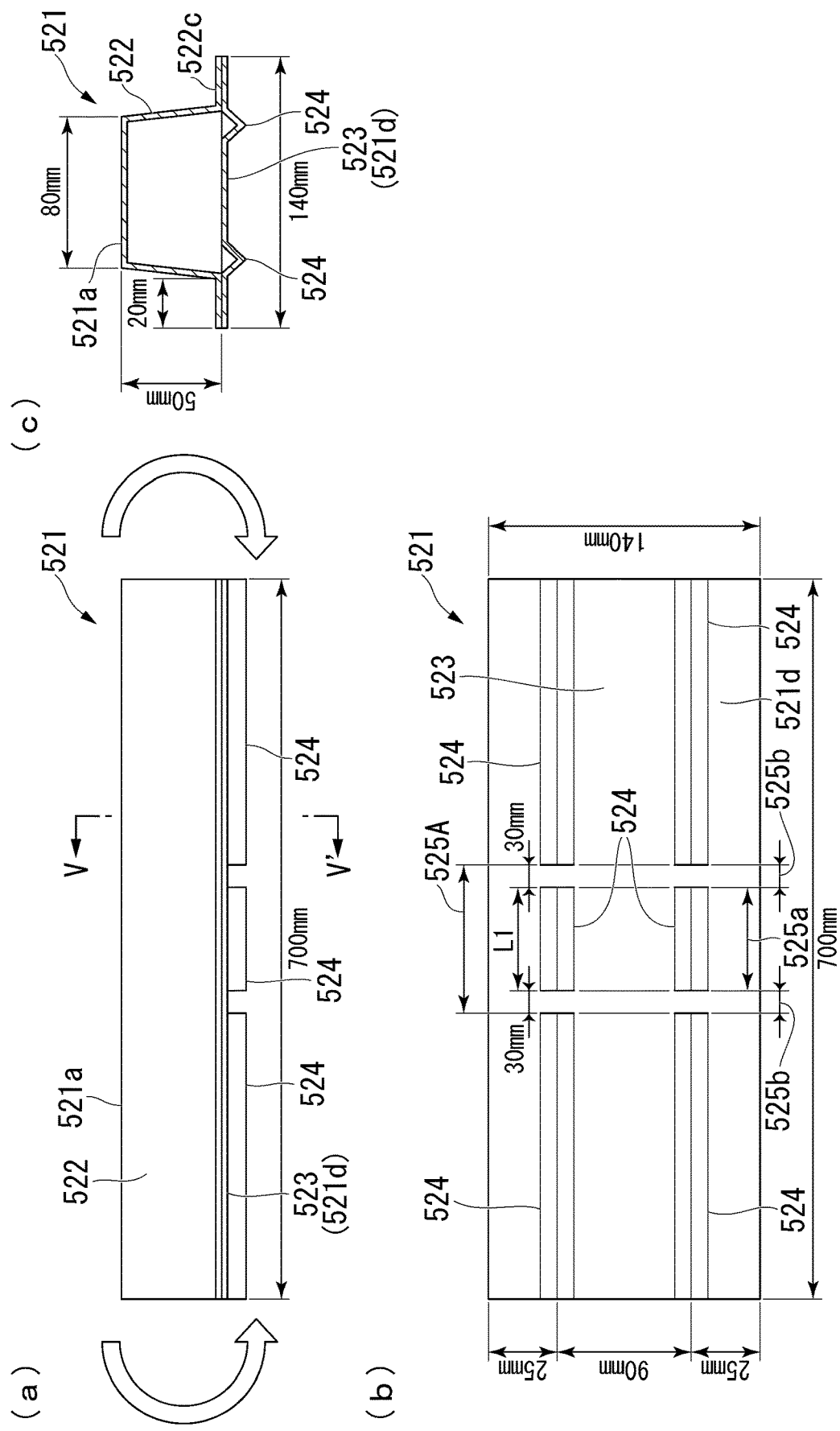
FIG. 28 is a diagram showing an invention example in a fourth example, wherein (a) of FIG. 28 is a side view, (b) of FIG. 28 is a bottom view, and (c) of FIG. 28 is a cross-sectional view taken along a line V-V' of (a) of FIG. 28.

In order to investigate an influence of a length of a high strength section in a deformation guidance section on the impact energy absorption performance, for the form shown in FIG. 28, numerical analysis was performed while changing a length L1 of a high strength section 525a.

An impact absorbing member 521 shown in FIG. 28 included a molded body (a hat-shaped member) 522 whose cross-sectional shape perpendicular to the longitudinal direction was a hat shape and a plate-shaped member 523 joined to the molded body 522.

Also, three sets of pairs of pair of bead sections 524 arranged side by side in the width direction of the plate-shaped member 523 and parallel to each other were formed in the plate-shaped member 523 to have two low strength sections 525b arranged therebetween in the longitudinal direction. Each of the low strength sections 525b was not reinforced and was flat (for example, a flat plate as it was) without a bead sections 524 to be formed. As a result, a deformation guidance section 525A in which a pair of low strength sections 525b having one high strength section 525a arranged therebetween was formed was provided at a central position of a wall section 521d in a longitudinal direction.

The dimensions of each portion of the impact absorbing member 521 were as follows. Furthermore, the analysis results are shown in Table 7.

Full length of impact absorbing member 521: 700 mm
Width of each portion: a wall section 521d was 140 mm, a wall section 521a was 80 mm, and a flange section 522c was 20 mm
Height H of molded body 522: 50 mm
Dimensions and arrangements of bead sections 524: all of the bead sections 524 had a width of 10 mm and a height of 5 mm. A space between the bead sections 524 which were adjacent to each other to be parallel to each other was 90 mm. The bead sections 524 included a total of six bead sections 524, i.e., two bead sections 524 with a length L1 (mm) and four bead sections 524 with a length (700−L1−30×2) mm. The bead sections 524 were arranged such that two bead sections 524 with a length (700−L1−30×2) mm, two bead sections 524 with a space of 30 mm and a length L1 (mm), and two bead sections 524 with a space of 30 mm and a length (700−L1−30×2) mm were arranged side by side when viewed from one side to the other end in the longitudinal direction of the impact absorbing member 521. Furthermore, all of the bead sections 524 on one side of the impact absorbing member 521 in the width direction thereof were arranged side by side on the same straight line. Similarly, all of the bead sections 524 on the other side of the impact absorbing member 521 in the width direction thereof were also arranged side by side on the same straight line.

TABLE 7

| Sample no. | Condition: L1 (mm) | Corresponding drawing | Absorption energy at time of 20° deformation (kJ) | Invention example/ Comparative example |
|---|---|---|---|---|
| 34 | 20 | FIG. 28 | 2.5 | Invention example |
| 35 | 40 | FIG. 28 | 3.0 | Invention example |
| 36 | 60 | FIG. 28 | 3.1 | Invention example |
| 37 | 80 | FIG. 28 | 3.2 | Invention example |
| 38 | 100 | FIG. 28 | 3.2 | Invention example |
| 39 | 150 | FIG. 28 | 2.5 | Invention example |
| 40 | 200 | FIG. 28 | 2.6 | Invention example |

It was confirmed from the results of Table 7 that the impact energy absorption performance was increased in sample nos. 35 to 38 in which the length L1 of the high strength section 525a was 40 mm to 100 mm. When this point was expressed as a ratio of the length L1 to the height H of the molded body 522 of 50 mm, it was confirmed that the impact energy absorption performance was increased when L1/H was within the range of 0.8 to 2.0. On the other hand, as can be seen from sample no. 34, it was confirmed that the impact energy absorption performance was decreased if L1/H was lower than 0.8. Similarly, as can be seen from sample nos. 39 and 40, it was confirmed that the impact energy absorption performance was decreased if L1/H was higher than 2.0.

Fifth Example

Figure 29:
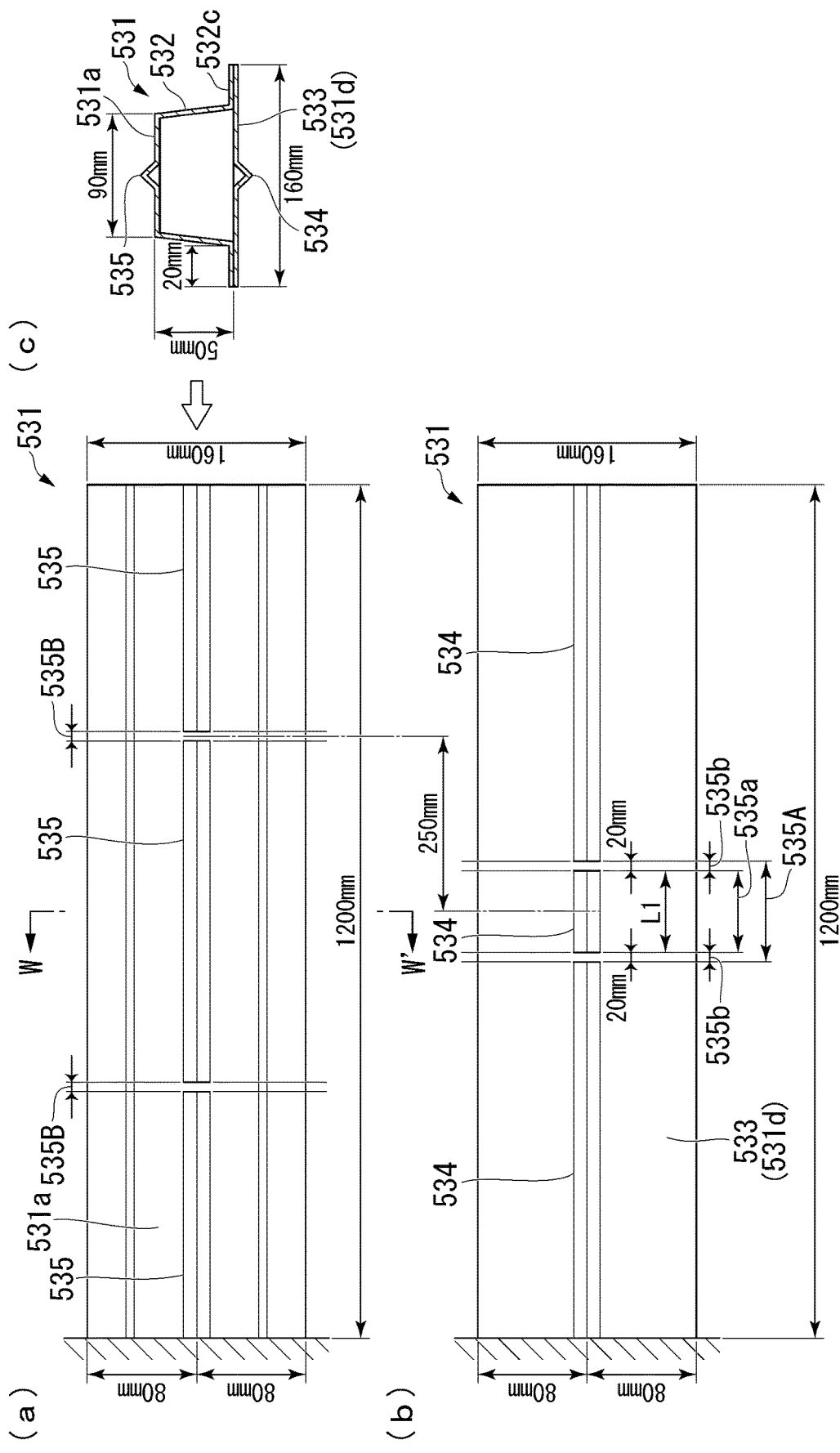
FIG. 29 is a diagram showing an invention example in the fourth example, wherein (a) of FIG. 29 is a plan view, (b) of FIG. 29 is a bottom view, and (c) of FIG. 29 is a cross-sectional view taken along a line W-W' of (a) of FIG. 29.

In the sample nos. 34 to 40 described above, a case in which two bead sections 524 were provided in the plate-shaped member 523, but a bead section was not provided in the wall section 521a was confirmed. On the other hand, as shown in FIG. 29, in the following description, numerical analysis was performed on an impact absorbing member 531 in which three bead sections 534 and 535 were provided on both a plate-shaped member 533 and a wall section 531a. At this time, The influence on the impact energy absorption performance when a length L1 of a high strength section 535a provided at a center of the plate-shaped member 533 in the longitudinal direction was changed was examined.

The impact absorbing member 531 shown in FIG. 29 included a molded body (a hat-shaped member) 532 whose cross-sectional shape perpendicular to the longitudinal direction was a hat shape and the plate-shaped member 533 joined to the molded body 532.

Also, in the plate-shaped member 533, the three bead sections 534 were formed to be arranged side by side on a straight line from one end to the other end in the longitudinal direction at a central position thereof in the width direction. A space of 20 mm was provided between the bead sections 534 which were adjacent to each other and only this portion was not reinforced and was flat (for example, a flat plate as it was). As a result, a deformation guidance section 535A in which a pair of low strength sections 535b having one high strength section 535a arranged therebetween was formed was provided at a central position of a wall section 531d in a longitudinal direction.

Furthermore, also on the wall section 531a facing the plate-shaped member 533, the three bead sections 535 were formed to be arranged side by side on a straight line from one end to the other end in the longitudinal direction at a central position thereof in the width direction thereof. A space of 20 mm was provided between the bead sections 535 which were adjacent to each other and only this portion was not reinforced and was flat (for example, a flat plate as it was).

The dimensions of each portion of the impact absorbing member 531 were as follows.

Table 8 shows the analysis results when L1 (mm) which is the longitudinal direction dimension of the high strength section 535a shown in (b) of FIG. 29 is changed under the following constitution.

Full length of impact absorbing member 531: 1200 mm

Width of each portion: a wall section 531d was 160 mm, a wall section 531a was 90 mm, and a flange section 532c was 20 mm Height H of molded body 532: 50 mm Dimensions and arrangements of bead sections 534 and 535: both bead sections 534 and 535 had a width of 10 mm and a height of 5 mm In a length of each of the bead sections 534, one bead section 534 on a center in a longitudinal direction had L1 (mm) and a length of the other two bead sections 534 had ½×(1200−L1−20×2) (mm).

On the other hand, in the bead sections 535, when viewed in the longitudinal direction of the impact absorbing member 531, deformation guidance sections 535B were arranged such that the positions of the deformation guidance sections 535B and the low strength sections 535b do not overlap. Furthermore, when viewed in the longitudinal direction of the impact absorbing member 531, central positions of the deformation guidance sections 535B were shifted by 250 mm relative to a central position of the high strength section 535a.

TABLE 8

| Sample no. | Condition: L1 (mm) | Corresponding drawing | Absorption energy at time of 100 mm deformation (kJ) | Invention example/ Comparative example |
|---|---|---|---|---|
| 41 | 20 | FIG. 29 | 6.2 | Invention example |
| 42 | 40 | FIG. 29 | 6.5 | Invention example |
| 43 | 60 | FIG. 29 | 6.9 | Invention example |
| 44 | 80 | FIG. 29 | 6.7 | Invention example |
| 45 | 100 | FIG. 29 | 6.8 | Invention example |
| 46 | 150 | FIG. 29 | 5.7 | Invention example |
| 47 | 200 | FIG. 29 | 5.5 | Invention example |

It was confirmed from the results of Table 8 that high impact energy absorption performance can be exhibited in sample nos. 42 to 45 in which the length L1 of the high strength section 535a was 40 mm to 100 mm. When this point was expressed as a ratio of the length L1 to the height H of the molded body 532 of 50 mm, it was confirmed that the impact energy absorption performance was increased when L1/H was within the range of 0.8 to 2.0. On the other hand, as can be seen from sample no. 41, it was confirmed that the impact energy absorption performance was slightly decreased when L1/H was lower than 0.8. Similarly, as can be seen from sample nos. 46 and 47, it was also confirmed that the impact energy absorption performance was slightly decreased when L1/H was higher than 2.0.

Sixth Example

Figure 30:
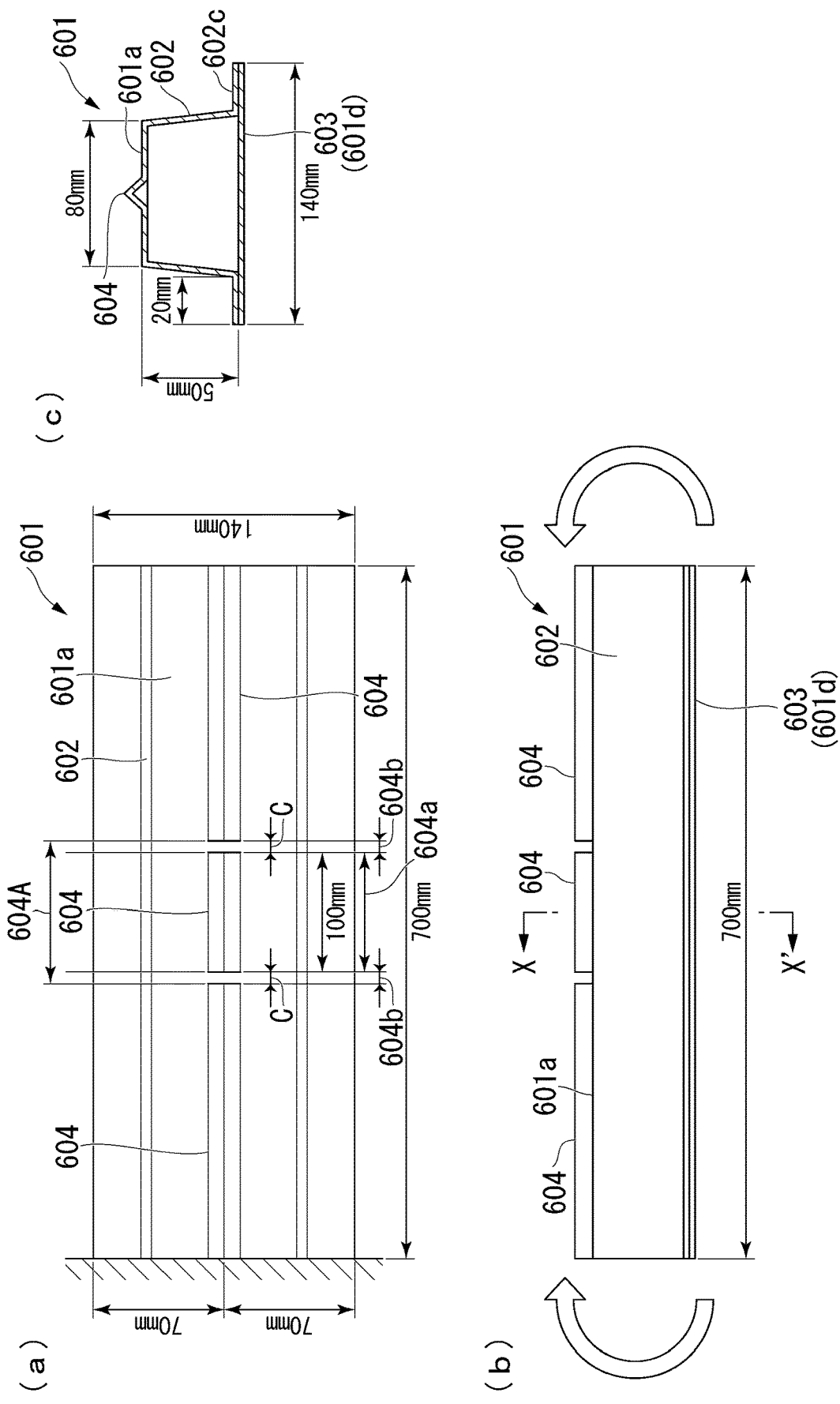
FIG. 30 is a diagram showing an invention example in a fifth example, wherein (a) of FIG. 30 is a plan view, (b) of FIG. 30 is a side view, and (c) of FIG. 30 is a cross-sectional view taken along a line X-X' of (b) of FIG. 30.

In order to investigate an influence of a length of a low strength section in a deformation guidance section on the impact energy absorption performance, numerical analysis was performed for the form shown in FIG. 30 while changing a length C of a low strength section 604b.

An impact absorbing member 601 shown in FIG. 30 included a molded body (a hat-shaped member) 602 whose cross-sectional shape perpendicular to the longitudinal direction was a hat shape and a plate-shaped member 603 joined to the molded body 602. Furthermore, three bead sections 604 were formed on a wall section 601a which was a hat top section of the molded body 602 in a longitudinal direction. The bead sections 604 were flat (for example, a flat plate as it was) while two places of central portions in the longitudinal direction were not reinforced.

The dimensions of each portion of the impact absorbing member 601 of FIG. 30 were as follows. Table 9 which will be shown later shows the analysis results when a dimension C mm of each of a pair of low strength sections 604b shown in (a) of FIG. 30 was changed.

Full length of impact absorbing member 601: 700 mm

Width of each portion: a wall section 601d was 140 mm, a wall section 601a was 80 mm, and a flange section 602c was 20 mm Height H of molded body 602: 50 mm Dimensions and arrangements of bead sections 604: all of the bead sections 604 had a width of 10 mm and a height of 5 mm. The three bead sections 604 were arranged side by side on a straight line at a center of the wall section 601a in the width direction from one end to the other end thereof. Furthermore, unprocessed portions of C (mm) in the longitudinal direction were provided between the bead sections 604 which were adjacent to each other. In addition, the intermediate bead section 604 of the bead sections 604 was arranged between the pair of unprocessed portions. Therefore, a deformation guidance section 604A which included one high strength section 604a and a pair of low strength sections 604b having the high strength section 604a arranged therebetween was provided at a central portion of the wall section 601a in the longitudinal direction. Furthermore, the two bead sections 604 adjacent to the pair of low strength sections 604h and extending to one end and the other end of the wall section 601a were provided and formed second high strength sections.

TABLE 9

| Sample no. | Condition: C (mm) | Corresponding drawing | Absorption energy at time of 20° deformation (kJ) | Invention example/ Comparative example |
|---|---|---|---|---|
| 48 | 5 | FIG. 30 | 2.8 | Invention example |
| 49 | 10 | FIG. 30 | 2.7 | Invention example |
| 50 | 30 | FIG. 30 | 2.6 | Invention example |
| 51 | 50 | FIG. 30 | 2.4 | Invention example |
| 52 | 80 | FIG. 30 | 2.2 | Comparative example |

From the results of Table 9, a particularly high impact energy absorption performance was confirmed in sample nos. 48 to 50 in which the length C was 30 mm or less. When this point was expressed as a ratio of the length C to the height H of the molded body 602 of 50 mm, it was confirmed that the impact energy absorption performance was particularly high when C/H was 0.6 or less.

Seventh Example

In order to investigate an appropriate shape dimension associated with a height d (mm) and a width w (mm) of a bead section and a plate thickness t (mm) of a wall section on which the bead section was provided, numerical analysis was performed while changing a combination of a d/t ratio and w using the constitution of the impact absorbing member 421 shown in FIG. 20 described above. That is to say, a d/t ratio obtained by dividing a height d (mm) of the three bead sections 424 of the impact absorbing member 421 by a plate thickness t (mm) of the plate-shaped member 423 was changed within the range 1.2 to 4.0 and a width w (mm) of the three bead sections 424 was changed within the range of 5 mm to 50 mm. The dimensions of each of the other portions were the same as that of the impact absorbing member 421.

Table 10 shows the analysis results under the above conditions.

TABLE 10

| Sample no. | Condition: d/t (—), w (mm) | Corresponding drawing | Absorption energy at time of 20° deformation (kJ) | Invention example/ Comparative example |
|---|---|---|---|---|
| 53 | d/t = 3.6, w = 5 (mm) | FIG. 20 | 2.4 | Comparative example |
| 54 | d/t = 3.6, w = 10 (mm) | FIG. 20 | 3.2 | Invention example |
| 55 | d/t = 3.6, w = 20 (mm) | FIG. 20 | 3.3 | Invention example |
| 56 | d/t = 3.6, w = 50 (mm) | FIG. 20 | 3.4 | Invention example |
| 57 | d/t = 1.5, w =10 (mm) | FIG. 20 | 2.3 | Comparative example |
| 58 | d/t = 2.0, w = 10 (mm) | FIG. 20 | 3.0 | Invention example |
| 59 | d/t = 6.0, w = 10 (mm) | FIG. 20 | 3.3 | Invention example |
| 60 | d/t = 10.0, w = 10 (mm) | FIG. 20 | 3.5 | Invention example |
| 61 | d/t = 1.2, w = 12 (mm) | FIG. 20 | 3.2 | Invention example |
| 62 | d/t = 4.0, w = 7 (mm) | FIG. 20 | 3.3 | Invention example |

It was confirmed from the results of Table 10 that the impact energy absorption performance was particularly high in sample nos. 54 to 56 and 58 to 62 in which the d/t ratio was 2.0 or more and w was 10 mm or more. Therefore, it was confirmed that it was desirable that the bead sections 424 satisfy at least one of d/t≥2.0 and w≥10.

Eighth Example

Also, an appropriate ratio associated with L1 and H when the distance between the length L1 (mm) of the high strength section 424a in the longitudinal direction and the plate-shaped member 423 in which the deformation guidance section 424A was provided and the wall section facing the plate-shaped member 423 was set to be H (mm) was investigated using the constitution of the impact absorbing member 421 shown in FIG. 20 described above. That is to say, numerical analysis was performed while setting H=50 mm and changing L1 within the range of 20 to 250 mm.

Table 11 shows the analysis results under the above conditions.

TABLE 11

| Sample no. | Condition: L1 (mm) | Corresponding drawing | Absorption energy at time of 20° deformation (kJ) | Invention example/ Comparative example |
|---|---|---|---|---|
| 63 | 20 | FIG. 20 | 2.8 | Invention example |
| 64 | 40 | FIG. 20 | 3.5 | Invention example |
| 65 | 50 | FIG. 20 | 3.4 | Invention example |
| 66 | 100 | FIG. 20 | 3.2 | Invention example |
| 67 | 150 | FIG. 20 | 3.1 | Invention example |
| 68 | 200 | FIG. 20 | 3.1 | Invention example |
| 69 | 250 | FIG. 20 | 2.7 | Invention example |

It was confirmed from the results of Table 11 that the impact energy absorption performance was particularly high in sample nos. 64 to 66 in which L1 was within the range from 40 mm in which L1 was 0.8 times H to 100 mm in which L1 was 2.0 times H. Therefore, it was confirmed that it was desirable to satisfy 0.8×H≤L1≤2.0×H. Furthermore, this conclusion coincides with the analysis results (Table 8) of the impact absorbing member 31 shown in FIG. 29 described above.

Although analysis was performed under the conditions of H=50 mm in the examples shown in Table 11, the following analysis was performed to confirm a case in which H (mm) described above was changed to another numerical value. That is to say, numerical analysis was performed while fixing H at 80 mm and changing L1 within the range of 30 to 350 mm in the constitution of the impact absorbing member 421 shown in FIG. 20, as in the examples of Table 1.

Table 12 shows the analysis results under the above conditions.

TABLE 12

| Sample no. | Condition: L1 (mm) | Corresponding drawing | Absorption energy at time of 20° deformation (kJ) | Invention example/ Comparative example |
|---|---|---|---|---|
| 70 | 30 | FIG. 20 | 6.7 | Invention example |
| 71 | 60 | FIG. 20 | 8.4 | Invention example |
| 72 | 80 | FIG. 20 | 8.2 | Invention example |
| 73 | 160 | FIG. 20 | 7.8 | Invention example |
| 74 | 240 | FIG. 20 | 7.4 | Invention example |
| 75 | 300 | FIG. 20 | 7.3 | Invention example |
| 76 | 350 | FIG. 20 | 6.5 | Invention example |

It was confirmed from the results of Table 12 that the impact energy absorption performance was particularly high in sample nos. 71 to 73 in which L was within the range from 60 mm in which L1 was about 0.8 times H to 160 mm in which L1 was 2.0 times H. Therefore, it was confirmed that it was desirable to satisfy $0.8 \times H \leq L1 \leq 2.0 \times H$ even when H was changed.

Although the embodiments and the examples of the present invention have been described above, the present invention is not limited to the constitutions described in the embodiments and the examples. For example, a wall section forming a deformation guidance section is not limited to a flat wall section and may be a curved wall section. Furthermore, a width of each wall section may not be constant in accordance with a longitudinal direction of a wall. In addition, an impact absorbing member itself is not limited to a member which straightly extends and may have some curvature.

Also, a constitution in which the embodiments and the examples are appropriately combined can be adopted as necessary.

INDUSTRIAL APPLICABILITY

According to the present invention, it is possible to provide the impact absorbing member having an excellent impact energy absorbing capacity. Therefore, the industrial applicability is significant.

REFERENCE SIGNS LIST

1*a*, 1*d*, 341*a*, 341*d*, 461*a*, 461*d*, 511*a*, 511*d*, 521*a*, 521*d*, 531*a*, 531*d*, 601*a*, 601*d* Wall section

4, 64A, 64B, 64C, 314A, 424A, 434A, 464A, 505A, 515A, 525A, 535A, 604A Deformation guidance section

4*a*, 7, 14*a*, 24*a*, 64*a*, 314*a*, 424*a*, 434*a*, 464*a*, 505*a*, 515*a*, 525*a*, 535*a*, 604*a* High strength section

4*b*, 14*b*, 24*b*, 64*b*, 314*b*, 424*b*, 434*b*, 464*b*, 505*b*, 515*b*, 525*b*, 535*b*, 604*b* Low strength section

1, 11, 21, 61, 311, 341, 421, 431, 461, 501, 511, 521, 531, 601 Impact absorbing member

3, 313, 423, 433, 503, 513, 523, 533, 603 Plate-shaped member

2*c*, 502*c*, 512*c*, 522*c*, 532*c*, 602*c* Flange section

2, 512, 522, 532, 602 Molded body (hat-shaped member)

5, 6, 15, 16, 17, 25, 26, 27, 65, 314, 424, 434, 464, 504, 505, 514, 515, 524, 534, 535, 604 Bead section

The invention claimed is:

1. An impact absorbing member which includes: a hat-shaped member which has a flange section and whose cross-sectional shape perpendicular to a longitudinal direction includes a hat top section; and a plate-shaped member joined to the flange section and facing the hat top section,
wherein a deformation guidance section is provided on a wall section of at least one of the hat top section and the plate-shaped member;
the deformation guidance section has a first high strength section having a relatively higher buckling resistance in the wall section and a pair of low strength sections having a relatively lower buckling resistance and arranged on both sides of the first high strength section therebetween in a view along the longitudinal direction; and
a pair of second high strength sections which are arranged on both sides of the deformation guidance section to be adjacent to the pair of low strength sections and have a relatively higher buckling strength than the low strength sections in a view along the longitudinal direction,
wherein the first high strength section has a first bead section provided in the longitudinal direction on the wall section.

2. The impact absorbing member according to claim 1, wherein, when a length of the first high strength section in the longitudinal direction is L1 (mm) and a distance between the hat top section and the plate-shaped member is H (mm), $0.8 \times H \leq L1 \leq 2.0 \times H$ is satisfied.

3. The impact absorbing member according to claim 1, wherein, when a length of the pair of low strength sections in the longitudinal direction is C (mm) and a distance between the hat top section and the plate-shaped member is H (mm),
$C \leq 0.6 \times H$ is satisfied.

4. The impact absorbing member according to claim 1, wherein the first high strength section has a pair of the first bead sections extending in the longitudinal direction and being parallel to each other; and
a region of the pair of low strength sections adjacent to one end of at least one of the pair of the first bead sections is flat and a region of the pair of low strength sections adjacent to the other end of the at least one of the pair of first bead sections is flat.

5. The impact absorbing member according to claim 4, wherein regions of the pair of low strength sections adjacent to both ends of the pair of first bead sections are flat.

6. The impact absorbing member according to claim 1, wherein the pair of second high strength sections have a pair of second bead sections which are provided on the wall section in the longitudinal direction and have one ends adjacent to the pair of low strength sections and the other ends extending to end portions of the impact absorbing member.

7. The impact absorbing member according to claim 1, wherein, when a height of the first bead section from a wall surface of the wall section on which the first bead section is provided is d (mm), a width of the first bead section is w (mm), and a plate thickness of the wall section on which the first bead section is provided is t (mm), at least one of $d/t \geq 2.0$ and $w \geq 10$ is satisfied.

8. The impact absorbing member according to claim 1, wherein the first high strength section is a bulging portion which bulges outward in a plate thickness direction of the wall section on which the deformation guidance section is provided, when a load is applied in the longitudinal direction from an outer side.

9. An impact absorbing member which includes: a hat-shaped member which has a flange section and whose cross-sectional shape perpendicular to a longitudinal direction includes a hat top section; and a plate-shaped member joined to the flange section and facing the hat top section,
- wherein a deformation guidance section is provided on a wall section of at least one of the hat top section and the plate-shaped member;
- the deformation guidance section has a first high strength section having a relatively higher buckling resistance in the wall section and a pair of low strength sections having a relatively lower buckling resistance and arranged on both sides of the first high strength section therebetween in a view along the longitudinal direction; and
- a pair of second high strength sections which are arranged on both sides of the deformation guidance section to be adjacent to the pair of low strength sections and have a relatively higher buckling strength than the low strength sections in a view along the longitudinal direction, and
- wherein the deformation guidance section and the pair of second high strength sections are provided in each of the hat top section and the plate-shaped member.

10. The impact absorbing member according to claim 9, wherein, in a view along the longitudinal direction,
- when a separation distance in the longitudinal direction between
  - a central position of the first high strength section provided in the deformation guidance section of one of the hat top section and the plate-shaped member and
  - a central position of the low strength section close to the first high strength section provided in the one deformation guidance section of the pair of low strength sections provided in the deformation guidance section of the other of the hat top section and the plate-shaped member is L2 (mm), and
- a distance between the hat top section and the plate-shaped member is H (mm), L2≤6.0×H is satisfied.

11. The impact absorbing member according to claim 9, wherein, in each of the deformation guidance sections,
- when a separation distance between intermediate positions of the pair of low strength sections in a view along the longitudinal direction is L3 (mm) and a distance between the hat top section and the plate-shaped member is H (mm), 0.8×H≤L3≤2.0×H is satisfied.

12. The impact absorbing member according to claim 9, wherein, in each of the deformation guidance sections,
- when a length of each of the pair of low strength sections in the longitudinal direction is C (mm) and a distance between the hat top section and the plate-shaped member is H (mm), C≤0.6×H is satisfied.

13. The impact absorbing member according to claim 2, wherein, when a length of the pair of low strength sections in the longitudinal direction is C (mm) and a distance between the hat top section and the plate-shaped member is H (mm), C≤0.6×H is satisfied.

14. The impact absorbing member according to claim 2, wherein the first high strength section has a first bead section provided in the longitudinal direction on the wall section.

15. The impact absorbing member according to claim 3, wherein the first high strength section has a first bead section provided in the longitudinal direction on the wall section.

16. The impact absorbing member according to claim 4, wherein the pair of second high strength sections have a pair of second bead sections which are provided on the wall section in the longitudinal direction and have one ends adjacent to the pair of low strength sections and the other ends extending to end portions of the impact absorbing member.

17. The impact absorbing member according to claim 5, wherein the pair of second high strength sections have a pair of second bead sections which are provided on the wall section in the longitudinal direction and have one ends adjacent to the pair of low strength sections and the other ends extending to end portions of the impact absorbing member.

18. The impact absorbing member according to claim 4, wherein, when a height of the first bead section from a wall surface of the wall section on which the first bead section is provided is d (mm), a width of the first bead section is w (mm), and a plate thickness of the wall section on which the first bead section is provided is t (mm), at least one of d/t≥2.0 and w≥10 is satisfied.

19. The impact absorbing member according to claim 5, wherein, when a height of the first bead section from a wall surface of the wall section on which the first bead section is provided is d (mm), a width of the first bead section is w (mm), and a plate thickness of the wall section on which the first bead section is provided is t (mm), at least one of d/t≥2.0 and w≥10 is satisfied.

\* \* \* \* \*